US012323982B2

(12) United States Patent
Park et al.

(10) Patent No.: US 12,323,982 B2
(45) Date of Patent: Jun. 3, 2025

(54) METHOD AND APPARATUS FOR UPLINK TRANSMISSION IN WIRELESS COMMUNICATION SYSTEM

(71) Applicant: Samsung Electronics Co., Ltd., Suwon-si (KR)

(72) Inventors: Sungjin Park, Suwon-si (KR); Kyeongyeon Kim, Suwon-si (KR); Sangheon Kim, Suwon-si (KR); Hyunseok Ryu, Suwon-si (KR); Seho Myung, Suwon-si (KR); Hongsil Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 499 days.

(21) Appl. No.: 17/710,811

(22) Filed: Mar. 31, 2022

(65) Prior Publication Data

US 2022/0330233 A1  Oct. 13, 2022

(30) Foreign Application Priority Data

Apr. 1, 2021 (KR) .......................... 10-2021-0042778

(51) Int. Cl.
*H04L 1/00* (2006.01)
*H04L 1/1812* (2023.01)
(Continued)

(52) U.S. Cl.
CPC ........... *H04W 72/21* (2023.01); *H04L 1/1812* (2013.01); *H04L 5/0048* (2013.01); *H04L 5/0055* (2013.01); *H04W 72/56* (2023.01)

(58) Field of Classification Search
CPC .... H04W 72/21; H04W 72/56; H04L 1/1812; H04L 5/0048; H04L 5/0055;
(Continued)

(56) References Cited

U.S. PATENT DOCUMENTS 11,910,382 B2 *  2/2024  Wang .................... H04W 72/23
12,041,648 B2 *  7/2024  Lee ........................ H04L 5/1469
(Continued)

FOREIGN PATENT DOCUMENTS

KR   10-2021-0037375 A   4/2021
WO   2019/033071 A1   2/2019
(Continued)

OTHER PUBLICATIONS

3GPP TS 38.212 V16.4.0 (Dec. 2020), Technical Specification, 3rd Generation Partnership Project; Technical Specification Group Radio Access Network; NR; Multiplexing and channel coding (Release 16), Dec. 2020, 152 pages.
(Continued)

*Primary Examiner* — John D Blanton

(57) ABSTRACT

The disclosure relates to a communication technique for convergence between an IoT technology and a 5G communication system for supporting a higher data transmission rate beyond a 4G system, and a system thereof. The disclosure may be applied to intelligence services (for example, smart homes, smart buildings, smart cities, smart cars or connected cars, healthcare, digital education, retail businesses, security and safety related services, etc.) based on a 5G communication technology and an IoT-related technology. The disclosure provides a method for transmitting uplink control information and/or uplink data by a terminal according to multiple priorities, a method for receiving uplink control information and/or uplink data by a base station according to multiple priorities, and an apparatus therefor.

20 Claims, 17 Drawing Sheets

(51) Int. Cl.
*H04L 5/00* (2006.01)
*H04W 72/21* (2023.01)
*H04W 72/56* (2023.01)

(58) Field of Classification Search
CPC ... H04L 1/0041; H04L 1/0067; H04L 1/0073; H04L 1/1671; H04L 1/1854; H04L 1/1861; H04L 5/0064; H04L 1/0013; H04L 1/1858
See application file for complete search history.

(56) References Cited

U.S. PATENT DOCUMENTS

| | | | |
|---|---|---|---|
| 2021/0068195 A1 | 3/2021 | Yang et al. | |
| 2021/0100024 A1 | 4/2021 | Bang et al. | |
| 2021/0160855 A1* | 5/2021 | Gao | H04L 1/1858 |
| 2022/0330233 A1* | 10/2022 | Park | H04L 1/1854 |
| 2023/0006776 A1* | 1/2023 | Yang | H04W 72/21 |
| 2023/0284227 A1* | 9/2023 | Choi | H04L 1/1854 370/329 |
| 2023/0354340 A1* | 11/2023 | Su | H04L 1/1854 |
| 2023/0354404 A1* | 11/2023 | Li | H04W 72/21 |
| 2023/0389010 A1* | 11/2023 | Guo | H04W 72/56 |
| 2024/0064743 A1* | 2/2024 | Si | H04L 1/1671 |
| 2024/0196403 A1* | 6/2024 | Takahashi | H04W 72/1268 |

FOREIGN PATENT DOCUMENTS

| | | |
|---|---|---|
| WO | 2020/202068 A1 | 10/2020 |
| WO | 2020/223658 A1 | 11/2020 |

OTHER PUBLICATIONS

Moderator (OPPO), "Summary#1 of email thread [104-e-NR-R17-IIoT_URLLC04]", 3GPP TSG RAN WG1 #104-e, Jan. 25-Feb. 5, 2021, R1-2101842, 76 pages.
International Search Report dated Jun. 30, 2022 in connection with International Patent Application No. PCT/KR2022/004619, 3 pages.
Written Opinion of the International Searching Authority dated Jun. 30, 2022 in connection with International Patent Application No. PCT/KR2022/004619, 4 pages.
Supplementary European Search Report dated Jun. 27, 2024, in connection with European Patent Application No. 22781655.0, 9 pages.
ITRI, "Discussion on intra-UE multiplexing," R1-2101570, 3GPP TSG RAN WG1 #104-e, e-Meeting, Jan. 25-Feb. 5, 2021, 5 pages.
Qualcomm Incorporated, "Intra-UE multiplexing and prioritization for IOT and URLLC," R1-2101462, 3GPP TSG RAN WG1 #104-e, e-Meeting, Jan. 25-Feb. 5, 2021, 22 pages.

* cited by examiner

METHOD AND APPARATUS FOR UPLINK TRANSMISSION IN WIRELESS COMMUNICATION SYSTEM

CROSS-REFERENCE TO RELATED APPLICATION

This application is based on and claims priority under 35 U.S.C. § 119 to Korean Patent Application No. 10-2021-0042778, filed on Apr. 1, 2021, in the Korean Intellectual Property Office, the disclosure of which is herein incorporated by reference in its entirety.

BACKGROUND

1. Field

The disclosure relates to operations of a terminal and a base station in a wireless communication system. More particularly, the disclosure relates to a method for reporting an uplink power headroom in a wireless communication system, and an apparatus capable of performing the same.

2. Description of Related Art

To meet the demand for wireless data traffic having increased since deployment of fourth generation (4G) communication systems, efforts have been made to develop an improved 5G or pre-5G communication system. Therefore, the fifth generation (5G) or pre-5G communication system is also called a "beyond 4G Network" communication system or a "post LTE" system. The 5G communication system is considered to be implemented in ultrahigh frequency (mm-Wave) bands (e.g., 60 GHz bands) so as to accomplish higher data rates. To decrease propagation loss of the radio waves and increase the transmission distance in the ultrahigh frequency bands, beamforming, massive multiple-input multiple-output (MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

With the advance of wireless communication systems as described above, various services can be provided, and accordingly there is a need for schemes to effectively provide these services.

SUMMARY

A disclosed embodiment may provide an apparatus and a method capable of effectively providing a service in a mobile communication system.

According to an embodiment of the disclosure, a method of a terminal in a wireless communication system may include: identifying at least one of first priority hybrid automatic repeat request-acknowledgement (HARQ-ACK) information or second priority HARQ-ACK information to be transmitted to a base station; performing rate matching regarding at least one of the identified first priority HARQ-ACK information or second priority HARQ-ACK information, based on at least one of the identified first priority HARQ-ACK information or second priority HARQ-ACK information; performing rate matching regarding uplink data, based on at least one of the identified first priority HARQ-ACK information or second priority HARQ-ACK information; mapping the uplink data and at least one of the identified first priority HARQ-ACK information or second priority HARQ-ACK information; and transmitting the uplink data and at least one of the first priority HARQ-ACK information or second priority HARQ-ACK information, which have been mapped, to the base station.

The present disclosure has been made to address the above-mentioned problems and disadvantages, and to provide at least the advantages described below.

In accordance with an aspect of the present disclosure, a method performed by a terminal in a wireless communication system is provided. The method includes receiving, from a base station, configuration information for an uplink control information (UCI) multiplexing operation with different priorities on a physical uplink shared channel (PUSCH); obtaining a UCI sequence including at least one of a high priority hybrid automatic repeat request acknowledgement (HP HARQ-ACK), a low priority HARQ-ACK (LP HAR-ACK), or channel state information (CSI) part 1; performing an encoding operation of the UCI sequence; performing a rate matching operation for the encoded UCI sequence; mapping the rate-matched UCI sequence to resources for the PUSCH; and transmitting uplink data with the UCI on the PUSCH.

In accordance with another aspect of the present disclosure, a method performed by a base station in a wireless communication system is provided, the method includes transmitting, to a terminal, configuration information for an uplink control information (UCI) multiplexing operation with different priorities on a physical uplink shared channel (PUSCH); receiving, from the terminal, uplink data with encoded UCI on a physical uplink shared channel (PUSCH); performing a demultiplexing operation for the encoded UCI; performing a rate de-matching operation for the encoded UCI; and decoding the encoded UCI to obtain the UCI received from the terminal, wherein the obtained UCI includes at least one of a high priority hybrid automatic repeat request acknowledgement (HP HARQ-ACK), a low priority HARQ-ACK (LP HAR-ACK), or channel state information (CSI) part 1.

In accordance with another aspect of the present disclosure, a terminal in a wireless communication system is provided. The terminal includes a transceiver and a controller coupled with the transceiver and configured to receive, from a base station, configuration information for an uplink control information (UCI) multiplexing operation with different priorities on a physical uplink shared channel (PUSCH); obtain a UCI sequence including at least one of a high priority hybrid automatic repeat request acknowledgement (HP HARQ-ACK), a low priority HARQ-ACK (LP HAR-ACK), or channel state information (CSI) part 1; perform an encoding operation of the UCI sequence; perform a rate matching operation for the encoded UCI sequence; map the rate-matched UCI sequence to resources for the PUSCH; and transmit uplink data with the UCI on the PUSCH.

In accordance with another aspect of the present disclosure, a base station in a wireless communication system is provided. The base station includes a transceiver and a controller coupled with the transceiver and configured to transmit, to a terminal, configuration information for an uplink control information (UCI) multiplexing operation with different priorities on a physical uplink shared channel (PUSCH); receive, from the terminal, uplink data with encoded UCI on a physical uplink shared channel (PUSCH); perform a demultiplexing operation for the encoded UCI; perform a rate de-matching operation for the encoded UCI; and decode the encoded UCI to obtain the UCI received from the terminal, wherein the obtained UCI includes at least one of a high priority hybrid automatic repeat request acknowledgement (HP HARQ-ACK), a low priority HARQ-ACK (LP HAR-ACK), or channel state information (CSI) part 1.

According to an embodiment of the disclosure, a terminal and a base station in a mobile communication system may perform efficient communication, thereby effectively providing a service.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
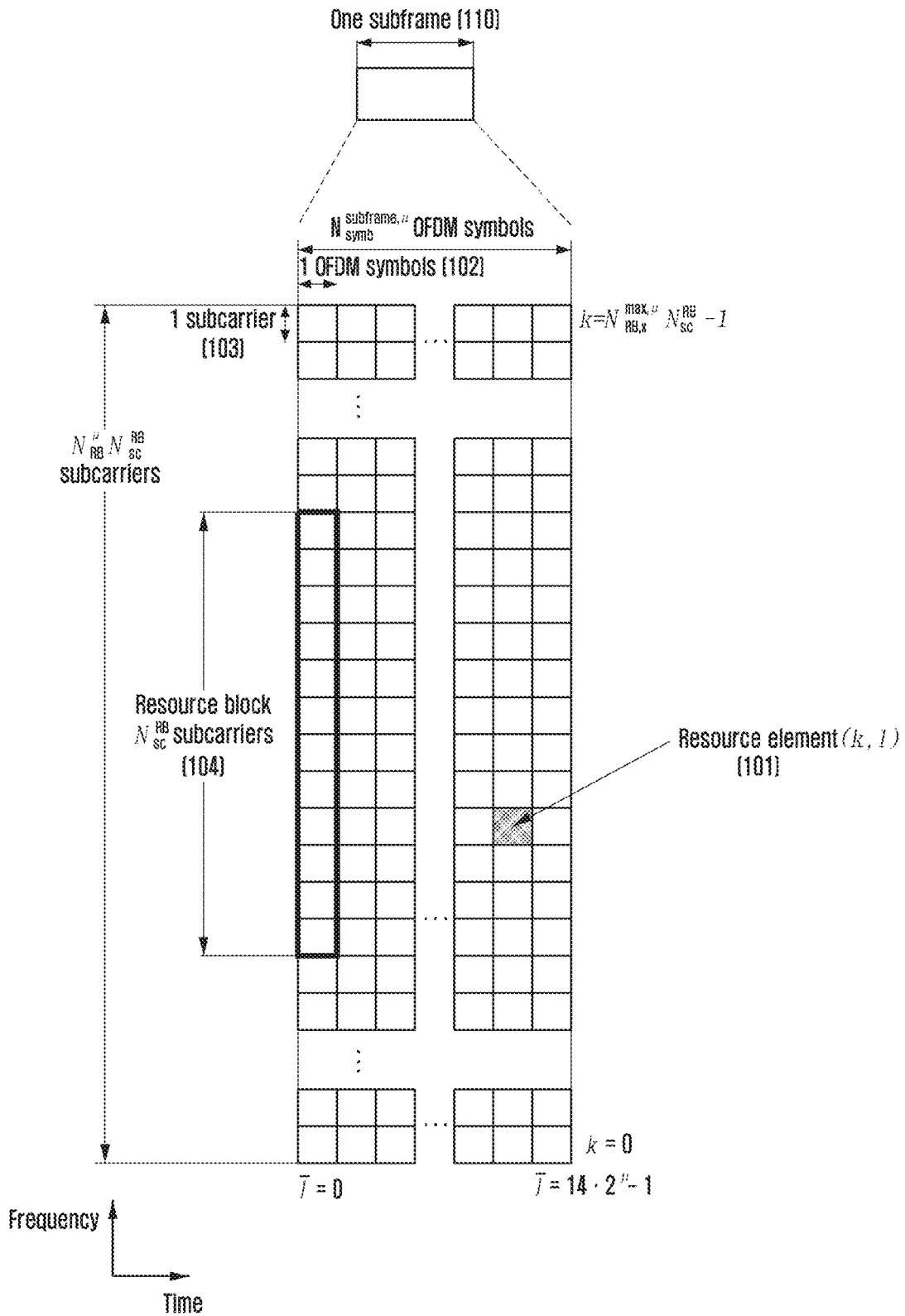
FIG. 1 illustrates a basic structure of a time-frequency domain in a wireless communication system according to an embodiment of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card. Further, the "unit" in the embodiments may include one or more processors.

A wireless communication system has evolved into a broadband wireless communication system that provides a high speed and high quality packet data service, like the communication standards, for example, high speed packet access (HSPA), long term evolution (LTE or evolved universal terrestrial radio access (E-UTRA)), LTE-advanced (LTE-A), and LTE-Pro of 3GPP, high rate packet data (HRPD) and ultra-mobile broadband (UMB) of 3GPP2, IEEE 802.16e, and the like, departing from the early stage of providing only voice-oriented services.

An LTE system, which is a representative example of the broadband wireless communication system, adopts an orthogonal frequency division multiplexing (OFDM) scheme for a downlink (DL), and adopts a single carrier frequency division multiple access (SC-FDMA) scheme for an uplink (UL). The uplink refers to a radio link through which a terminal (user equipment (UE) or a mobile station (MS) transmits data or control signals to a base station (eNode or BS) and the downlink refers to a radio link through which a base station transmits data or control signals to a terminal. In multiple access schemes as described above, time-frequency resources, on which data or control information is to be carried to each user, are usually allocated and managed to satisfy orthogonality, i.e., not to overlap each other, so that data or control information for each user is distinguished.

A future communication system after LTE, that is, a 5G communication system needs to freely apply various requirements from users, service providers, and the like, and thus, a service that satisfies various requirements at the same time needs to be supported. Services considered for the 5G communication system may include an enhanced mobile broadband (eMBB), massive machine type communication (mMTC), ultra-reliability-low latency communication (URLLC), and the like.

eMBB aims at providing a data transmission rate more enhanced than a data transmission rate supported by legacy LTE, LTE-A, or LTE-pro. For example, in the 5G communication system, eMBB needs to provide a maximum transmission rate (peak data rate) of 20 Gbps in a downlink, and a peak data rate of 10 Gbps in an uplink, from the perspective of one base station. In addition, the 5G communication system needs to provide an enhanced user perceived data rate of a UE, while providing a peak data rate. In order to satisfy the requirements, there is a desire for improvement of various transmission or reception technologies including an advanced multi input multi output (MIMO) transmission technology. In addition, current LTE transmits a signal in a 2 GHz band using a maximum of 20 MHz transmission bandwidth. However, the 5G communication system uses a frequency bandwidth wider than 20 MHz in a frequency band ranging 3 to 6 GHz or in a frequency band greater than or equal to 6 GHz, and thus, the data transmission rate required by the 5G communication system may be satisfied.

At the same time, the 5G communication system considers mMTC in order to support application services such as Internet of Thing (IoT). mMTC requires supporting access of a large number of UEs within a cell, improvement of coverage of a UE, enhanced battery lifetime, reduction of cost of a UE, and the like, in order to effectively provide IoT. IoT provides a communication function via attachment to various sensors and various devices and thus, a large number of UEs need to be supported within a cell (e.g., 1,000,000 UEs/km2). In addition, a UE that supports mMTC has a high probability of being located in a shadow area that a cell cannot cover, such as the basement of a building, in terms of the feature of the service, and thus may require coverage wider than those of other services provided in the 5G communication system. The UE that supports mMTC needs to be configured as an inexpensive UE, and the battery of the UE may not be changed frequently. Accordingly, a long battery lifetime such as 10 to 15 years may be required.

Finally, URLLC is a cellular-based wireless communication service which is used for mission critical communication. For example, URLLC may consider services used for remote control for a robot or machinery, industrial automation, an unmanned aerial vehicle service, remote heath care, an emergency alert, and the like. Therefore, communication provided by the URLLC may need to provide significantly low latency and significantly high reliability. For example, the service that supports URLLC needs to satisfy an air interface latency less than 0.5 milliseconds, and at the same time, needs to satisfy a packet error rate less than or equal to 10-5. Therefore, for the service that supports URLLC, a 5G system needs to provide a transmit time interval (TTI) smaller than those of other services, and at the same time, is required to allocate a wide resource in a frequency band in order to secure reliability of a communication link.

Three services in 5G, that is, eMBB, URLLC, and mMTC may be multiplexed and transmitted in one system. Here, in order to satisfy different requirements of the services, different transmission or reception schemes and transmission or reception parameters may be used among the services. Of course, a 5G is not limited to the three services described above.

Hereinafter, embodiments of the disclosure will be described in detail with reference to the accompanying drawings. Hereinafter, a base station, as an entity that allocates resources to a terminal, may be at least one of a gNode B, a gNB, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Hereinafter, an embodiment of the disclosure will be described using a 5G system as an example, but the embodiment of the disclosure may be applied to other communication systems having a similar technical background or channel type. For example, an LTE or LTE-A mobile communication and a mobile communication technology developed after 5G may be included therein. Accordingly, the embodiments of the disclosure can be applied to other communication systems through some modifications without significantly departing from the scope of the disclosure as determination made by a person skilled in the art. The contents of the disclosure may be applicable to FDD and TDD systems.

In the following description of the disclosure, a detailed description of related functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description of the disclosure, a higher-layer signaling may be signaling corresponding to at least one or a combination of one or more of signalings below:
Master information block (MIB);
System information block (SIB) or SIB X (X=1, 2, . . . );
Radio resource control (RRC); or
Medium access control (MAC) control element (CE).

In addition, L1 signaling may be signaling corresponding to at least one of signaling methods using the physical layer channels or signalings below or a combination of one or more of the methods:
Physical downlink control channel (PDCCH);
Downlink control information (DCI);
UE-specific DCI;
Group common DCI;
Common DCI;
Scheduling DCI (e.g., DCI used for scheduling downlink or uplink data);
Non-scheduling DCI (e.g., DCI not for scheduling downlink or uplink data);
Physical uplink control channel (PUCCH); or
Uplink control information (UCI).

In the disclosure, determining the priority between A and B may refer to selecting the one having a higher priority according to a predetermined priority rule and performing an operation corresponding thereto, or omitting or dropping an operation corresponding to the one having a lower priority, etc.

In the disclosure, the embodiments are described above through multiple embodiments, but these are not independent and it is possible that one or more embodiments may be applied simultaneously or in combination.

[NR Time-Frequency Resource]

Hereinafter, a frame structure of a 5G system will be described in detail with reference to the drawings.

FIG. 1 illustrates a basic structure of a time-frequency domain, which is a radio resource area in which a data or a control channel is transmitted in a 5G system.

In FIG. 1, a horizontal axis indicates a time domain, and a vertical axis indicates a frequency domain. A basic unit of a resource in the time-frequency domain is a resource element (RE) 101 and may be defined as one orthogonal frequency division multiplexing (OFDM) symbol 102 in the time axis and one subcarrier 103 in the frequency axis. In the frequency domain, v (for example, 12) consecutive REs may constitute one resource block (RB) 104.

Figure 2:
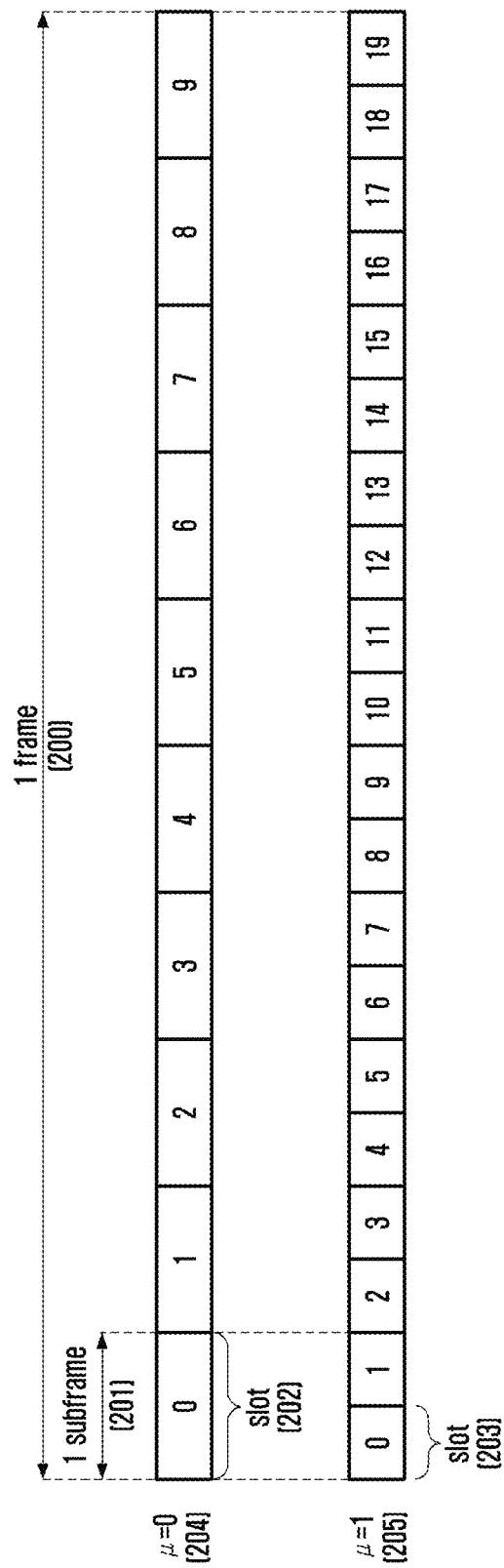
FIG. 2 illustrates a structure of a frame, a subframe, and a slot in a wireless communication system according to an embodiment of the present disclosure.

FIG. 2 illustrates a structure of a frame, a subframe, and a slot in a wireless communication system according to an embodiment of the present disclosure.

In FIG. 2, an example of a structure including a frame 200, a subframe 201, and a slot 202 is illustrated. One frame 200 may be defined as 10 ms. One subframe 201 may be defined as 1 ms, and accordingly, one frame 200 may include a total of 10 subframes 201. One slot 202 or 203 may be defined as 14 OFDM symbols (that is, the number of symbols per slot (V)=14). One subframe 201 may include one or multiple slots 202 and 203, and the number of slots 202 and 203 per subframe 201 may vary according to a configuration value (204 or 205) for subcarrier spacing. An example of FIG. 2 shows a case in which the subcarrier spacing configuration value corresponds to =0 (204) and a case in which the subcarrier spacing configuration value corresponds to =1 (205). In the case of =0 (204), one subframe 201 may include one slot 202, and, in the case of =1 (205), one subframe 201 may include two slots 203. That is, the number ($N_{slot}^{subframe,\mu}$) of slots per subframe may vary according to the configuration value for subcarrier spacing, and accordingly, the number ($N_{slot}^{frame,\mu}$) of slots per frame may also vary. $N_{slot}^{subframe,\mu}$ and $N_{slot}^{frame,\mu}$ according to each subcarrier spacing configuration may be defined as shown in Table 1 below.

TABLE 1

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

[PDCCH: In Relation to DCI]

Next, downlink control information (DCI) in a 5G system will be described in detail.

In the 5G system, scheduling information on uplink data (or a physical uplink shared channel (PUSCH)) or downlink data (or a physical downlink shared channel (PDSCH)) is transferred through DCI from a base station to a terminal. The terminal may monitor a fallback DCI format and a non-fallback DCI format for the PUSCH or the PDSCH. The fallback DCI format may be configured with a fixed field pre-defined between the base station and the terminal, and the non-fallback DCI format may include a configurable field.

DCI may go through a channel coding and modulation process, and then be transmitted through a physical downlink control channel (PDCCH). A cyclic redundancy check (CRC) may be attached to a DCI message payload, and the CRC may be scrambled by a radio network temporary identifier (RNTI) corresponding to the identity of the terminal. Different types of RNTIs may be used according to the purpose of a DCI message, for example, terminal-specific (UE-specific) data transmission, a power control command, a random access response, or the like. That is, an RNTI may not be explicitly transmitted, and may be transmitted after being included in a CRC calculation process. In case that the terminal has received a DCI message transmitted on a PDCCH, the terminal may identify a CRC by using an allocated RNTI, and in case that a CRC identification result is correct, the terminal may identify that the message has been transmitted to the terminal.

For example, a DCI scheduling the PDSCH for system information (SI) may be scrambled by a SI-RNTI. DCI scheduling the PDSCH for a random access response (RAR) message may be scrambled by an RA-RNTI. DCI scheduling the PDSCH for a paging message may be scrambled by a P-RNTI. DCI notifying of a slot format indicator (SF) may be scrambled by an SFI-RNT DCI notifying of a transmit power control (TPC) may be scrambled by a TPC-RNT DCI scheduling a terminal-specific PDSCH or PUSCH may be scrambled by a cell RNTI (C-RNTI).

DCI format 0_0 may be used for fallbackDCI scheduling a PUSCH, and in this case, a CRC may be scrambled by a C-RNTL. DCI format 0_0 having a CRC scrambled by a C-RNTI may include, for example, the information below.

TABLE 2

- Identifier for DCI formats (DCI format identifier) - [1] bit
- Frequency domain resource assignment - $\lceil \log_2(N_{RB}^{UL,BWP}(N_{RB}^{UL,BWP}+1)/2) \rceil$ bits
- Time domain resource assignment - X bits
- Frequency hopping flag - 1 bit.
- Modulation and coding scheme - 5 bits
- New data indicator - 1 bit
- Redundancy version - 2 bits
- HARQ process number - 4 bits
- TPC command for scheduled PUSCH (transmit power control command for scheduled PUSCH) - [2] bits
- UL/SUL indicator (uplink/supplementary UL indicator) - 0 or 1 bit DCI format 0_1 may be used for non-fallback DCI scheduling a PUSCH, and in this case, a CRC may be scrambled by a C-RNTL. DCI format 01 having a CRC scrambled by a C-RNTI may include, for example, the information below.

TABLE 3

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0, $\lceil N_{RB}^{UL,BWP}/P \rceil$ bits
For resource allocation type 1, $\lceil \log_2 (N_{RB}^{UL,BWP}(N_{RB}^{UL,BWP}+1)/2 \rceil$ bits
Time domain resource assignment - 0, 1, 2, 3, or 4 bits
VRB-to-PRB mapping (virtual resource block-to-physical resource block mapping) - 0 or 1 bit, only for resource allocation type 1.
0 bit if only resource allocation type 0 is configured;
1 bit otherwise.
Frequency hopping flag - 0 or 1 bit, only for resource allocation type 1.
0 bit if only resource allocation type 0 is configured;
1 bit otherwise.
Modulation and coding scheme - 5 bits
New data indicator - 1 bit
Redundancy version - 2 bits
HARQ process number - 4 bits
1$^{st}$ downlink assignment index - 1 or 2 bits:
1 bit for semi-static HARQ-ACK codebook;
2 bits for dynamic HARQ-ACK codebook with single HARQ-ACK codebook.
2$^{nd}$ downlink assignment index - 0 or 2 bits:
2 bits for dynamic HARQ-ACK codebook with two HARQ-ACK sub-codebooks;

TABLE 3-continued 0 bit otherwise.
TPC command for scheduled PUSCH - 2 bits
SRS resource indicator -

$$\left\lceil \log_2 \left( \sum_{k=1}^{\min\{L_{max}, N_{SRS}\}} \binom{N_{SRS}}{k} \right) \right\rceil \text{ or } \lceil \log_2 (N_{SRS}) \rceil \text{ bits}$$

$$\left\lceil \log_2 \left( \sum_{k=1}^{\min\{L_{max}^{PUSCH}, N_{SRS}\}} \binom{N_{SRS}}{k} \right) \right\rceil$$

bits for non-codebook based PUSCH transmission;
$\lceil \log_2 (N_{SRS}) \rceil$ bits for codebook based PUSCH transmission.
Precoding information and number of layers - to 6 bits
Antenna ports - up to 5 bits
SRS request - 2 bits
CSI request (channel state information request) - 0, 1, 2, 3, 4, 5, or 6 bits
CBG transmission information (code block group transmission information) - 0, 2, 4, 6, or 8 bits
PTRS-DMRS association (phase tracking reference signal - demodulation reference signal association) - 0 or 2 bits.
beta_offset indicator - 0 or 2 bits
DMRS sequence initialization (demodulation reference signal sequence initialization) - 0 or 1 bit DCI format 1_0 may be used for fallback DCI scheduling a PDSCH, and in this case, a CRC may be scrambled by a C-RNTI. DCI format 1_0 having a CRC scrambled by a C-RNTI may include, for example, the information below.

TABLE 4

- Identifier for DCI formats - [1] bit
- Frequency domain resource assignment - $\lceil \log_2(N_{RB}^{DL,BWP}(N_{RB}^{DL,BWP}+1)/2) \rceil$ bits
- Time domain resource assignment - X bits
- VRB-to-PRB mapping - 1 bit
- Modulation and coding scheme - 5 bits
- New data indicator - 1 bit
- Redundancy version - 2 bits
- HARQ process number - 4 bits TABLE 4-continued

- Downlink assignment index - 2 bits
- TPC command for scheduled PUCCH - [2] bits
- PUCCH resource indicator (physical uplink control channel (PUCCH) resource indicator)- 3 bits
- PDSCH-to-HARQ_feedback timing indicator - [3] bits DCI format 1_1 may be used for non-fallback DCI scheduling a PDSCH, and in this case, a CRC may be scrambled by a C-RNTI. DCI format 11 having a CRC scrambled by a C-RNTI may include, for example, the information below.

TABLE 5

- Carrier indicator - 0 or 3 bits
- Identifier for DCI formats - [1] bits
- Bandwidth part indicator - 0, 1 or 2 bits
- Frequency domain resource assignment
    • For resource allocation type 0, $\lceil N_{RB}^{DL,BWP}/P \rceil$ bits
    • For resource allocation type 1, $\lceil \log_2(N_{RB}^{DL,BWP}(N_{RB}^{DL,BWP}+1)/2) \rceil$ bits
- Time domain resource assignment - 0, 1, 2, 3, or 4 bits
- VRB-to-PRB mapping - 0 or 1 bit, only for resource allocation type 1.
    • 0 bit if only resource allocation type 0 is configured;
    • 1 bit otherwise.
- PRB bundling size indicator (physical resource block bundling size indicator) - 0 or 1 bit
- Rate matching indicator - 0, 1, or 2 bits
- ZP CSI-RS trigger (zero-power channel state information reference signal trigger) - 0, 1, or 2 bits
    For transport block 1:
- Modulation and coding scheme - 5 bits
- New data indicator - 1 bit
- Redundancy version - 2 bits
    For transport block 2:
- Modulation and coding scheme - 5 bits
- New data indicator - 1 bit
- Redundancy version - 2 bits
- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ_feedback timing indicator - 3 bits
- Antenna ports - 4, 5, or 6 bits
- Transmission configuration indication - 0 or 3 bits
- SRS request - 2 bits
- CBG transmission information - 0, 2, 4, 6, or 8 bits
- CBG flushing out information (code block group flushing out information) - 0 or 1 bit
    -DMRS sequence initialization - 1 bit.

[PDSCH: Processing Time]

Next, a PDSCH processing procedure time will be described. In case that a base station performs scheduling of PDSCH transmission to a terminal by using DCI format 10, 1_1, or 1_2, the terminal may require a PDSCH processing procedure time for receiving the PDSCH by applying a transmission method (a modulation/demodulation and coding indication index (MCS), demodulation reference signal-related information, time and frequency resource allocation information, and the like) indicated via DCI. The PDSCH processing procedure time is defined in NR in consideration of the description above. The PDSCH processing procedure time may of the terminal follow Equation 1 below:

$$T_{proc,1}=(N_1+d_{1,1}+d_2)(2048+144)\kappa 2^{-\mu}T_c+T_{ext}.$$ [Equation 1]

Each parameter of $T_{proc,1}$ in Equation 1 above may have the following meaning: In equation 1, $N_1$, this parameter indicates the number of symbols determined according to numerology μ and UE processing capability 1 or 2 according to UE capability. In a case where UE processing capability 1 is reported according to UE capability reporting, $N_1$ may have values in Table 6, and in a case where UE processing capability 2 is reported and the availability of UE processing capability 2 is configured via higher-layer signaling, $N_1$ may have values in Table 7. Numerology μ may correspond to a minimum value among $\mu_{PDCCH}$, $\mu_{PDSCH}$, and $\mu_{UL}$ so as to maximize the value of $T_{proc,1}$, and $\mu_{PDCCH}$, $\mu_{PDSCH}$, and $\mu_{UL}$ may mean numerology of a PDCCH having scheduled a PDSCH, numerology of the scheduled PDSCH, and numerology of an uplink channel through which HARQ-ACK is to be transmitted, respectively.

TABLE 6

PDSCH decoding time $N_1$ [symbols]

| $\mu$ | A case that both PDSCH mapping type A and B are dmrs-AdditionalPosition = pos0 in DMRS-DownlinkConfig, which is higher layer signaling | A case that both PDSCH mapping type A and B are not dmrs-AdditionalPosition = pos0 in DMRS-DownlinkConfig, which is higher layer signaling, or a case that the higher layer parameter is not configured |
|---|---|---|
| 0 | 8 | $N_{1,0}$ |
| 1 | 10 | 13 |
| 2 | 17 | 20 |
| 3 | 20 | 24 |

TABLE 7

PDSCH decoding time $N_1$ [symbols]
A case that both PDSCH mapping type A and B are dmrs-AdditionalPosition = pos0 in DMRS-DownlinkConfig, which is higher layer signaling

| $\mu$ | |
|---|---|
| 0 | 3 |
| 1 | 4.5 |
| 2 | 9 for frequency range 1 |

In equation 1, –κ: 64.

In equation 1, text, in case that the terminal uses a shared spectrum channel access scheme, the terminal may calculate a value of $T_{ext}$ and apply the same to the PDSCH processing procedure time. Otherwise, the value of Text is assumed as 0.

In equation, in case that $l_1$ indicating a PDSCH DMRS position value is 12, $N_{1,0}$ in Table 6 has a value of 14. Otherwise, $N_{1,0}$ has a value of 13.

In equation 1, with respect to PDSCH mapping type A, in case that the last symbol of the PDSCH corresponds to the i-th symbol in a slot in which the PDSCH is transmitted and i<7, $d_{1,1}$ is 7–i. Otherwise, $d_{1,1}$ is 0.

In equation 1, da, in case that a PUCCH having a higher priority index overlaps a PUCCH or a PUSCH having a lower priority index on the time domain, the $d_2$ of the PUCCH having the higher priority index may be configured as a value reported from the terminal. Otherwise, $d_2$ is 0.

In equation 1, in case that PDSCH mapping type B is used for UE processing capability 1, a value of $d_{1,1}$ may be determined according to the number (L) of scheduled PDSCH symbols and the number (d) of symbols overlapping between the PDCCH for scheduling the PDSCH and the scheduled PDSCH, as described below:

When L≥7, $d_{1,1}$=0;
In case that L≥4 and L≤6, $d_{1,1}$=7–L;
In case that L=3, $d_{1,1}$=min (d, 1); and
In case that L=2, $d_{1,1}$=3+d.

In equation 1, in case that PDSCH mapping type B is used for UE processing capability 2, a value of $d_{1,1}$ may be determined according to the number (L) of scheduled PDSCH symbols and the number (d) of symbols overlapping between the PDCCH for scheduling the PDSCH and the scheduled PDSCH, as described below:

In case that L≥7, $d_{1,1}$=0;
In case that L≥4 and L≤6, $d_{1,1}$=7– L; and
In case that L=2.

In equation 1, in case that a PDCCH which performs scheduling exists in a CORESET including three symbols and the corresponding CORESET and the scheduled PDSCH have the same start symbol, then $d_{1,1}$=3.

In equation 1, otherwise, $d_{1,1}$=d.

In equation 1, in a case of the terminal supporting capability 2 in a given serving cell, the PDSCH processing procedure time according to UE processing capability 2 may be applied in case that the terminal is configured with the higher-layer signaling, processingType2Enabled, as "enable" for the corresponding cell.

In case that the position (the corresponding position may consider K1-defined as HARQ-ACK transmission time point, a PUCCH resource used for HARQ-ACK transmission, and a timing advanced effect) of the first uplink transmission symbol of the PUCCH including HARQ-ACK information does not start earlier than the first uplink transmission symbol coming a $T_{proc,1}$ time later from the last symbol of the PDSCH, the terminal should transmit a valid HARQ-ACK message. That is, the terminal should transmit the PUCCH including the HARQ-ACK only in case that the PDSCH processing procedure time is enough. Otherwise, the terminal cannot provide the base station with valid HARQ-ACK information corresponding to the scheduled PDSCH. $T_{proc,1}$ may be used for both a normal CP and an expanded CP. In a case of a PDSCH including two PDSCH transmission positions in one slot, $d_{1,1}$ is calculated with reference to the first PDSCH transmission position in the corresponding slot.

[PDSCH: Reception Preparation Time for Cross-Carrier Scheduling]

Next, in a case of cross-carrier scheduling in which $\mu_{PDCCH}$ corresponding to numerology with which a PDCCH for performing scheduling is transmitted is different from $\mu_{PDSCH}$ corresponding to numerology with which a PDSCH scheduled by the corresponding PDCCH is transmitted, $N_{pdsch}$ corresponding to a terminal PDSCH reception preparation time defined for a time interval between the PDCCH and the PDSCH will be described.

In a case of $\mu_{PDCCH}<\mu_{PDSCH}$, the scheduled PDSCH cannot be transmitted earlier than the first symbol of a slot, coming $N_{pdsch}$ symbols later from the last symbol of the PDCCH which has scheduled the corresponding PDSCH. The transmission symbol of the corresponding PDSCH may include a DM-RS.

In a case of $\mu_{PDCCH}>\mu_{PDSCH}$, the scheduled PDSCH may be transmitted $N_{pdsch}$ symbols later from the last symbol of the PDCCH which has scheduled the corresponding PDSCH. The transmission symbol of the corresponding PDSCH may include a DM-RS.

TABLE 8

| $\mu_{PDCCH}$ | $N_{pdsch}$ [symbols] |
|---|---|
| 0 | 4 |
| 1 | 5 |
| 2 | 10 |
| 3 | 14 |

[PUSCH: In Relation to Transmission Scheme]

Next, a PUSCH transmission scheduling scheme will be described. PUSCH transmission may be dynamically scheduled by a UL grant in DCI, or may be operated by configured grant Type 1 or Type 2. The indication of the dynamic scheduling for the PUSCH transmission may be by DCI format 0_0 or 0_1.

Configured grant Type 1 PUSCH transmission may be semi-statically configured through reception of configuredGrantConfig including rrc-ConfiguredUplinkGrant in Table 9 via higher-layer signaling, without reception of the UL grant in the DCI. Configured grant Type 2 PUSCH transmission may be semi-persistently scheduled by the UL grant in the DCI after the reception of configuredGrantConfig not including rrc-ConfiguredUplinkGrant in Table 9, via higher-layer signaling. In case that the PUSCH transmission is operated by a configured grant, parameters to be applied to the PUSCH transmission are applied via higher-layer signaling configuredGrantConfig in Table 9, except dataScramblingIdentityPUSCH, txConfig, codebookSubset, maxRank, and scaling of UCI-OnPUSCH provided via higher-layer signaling pusch-Config in Table 10. In case that the terminal is provided with transformPrecoder in higher-layer signaling configuredGrantConfig in Table 9, the terminal applies tp-pi2BP2K in pusch-Config in Table 10 for the PUSCH transmission operated by the configured grant.

Next, a PUSCH transmission method will be described. A DMRS antenna port for PUSCH transmission is identical to an antenna port for SRS transmission. The PUSCH transmission may follow a codebook-based transmission method or a non-codebook-based transmission method according to whether a value of txConfig in higher-layer signaling pusch-Config in Table 10 is "codebook" or "nonCodebook."

As described above, the PUSCH transmission may be dynamically scheduled through DCI format 0_0 or 01, and may be semi-statically configured by the configured grant. In case that the scheduling for the PUSCH transmission is indicated to the terminal through DCI format 0_0, the terminal may perform beam configuration for PUSCH transmission by using pucch-spatialRelationInfoID corresponding to a UE-specific PUCCH resource corresponding to a minimum ID in an activated uplink BWP in a serving cell,

TABLE 9

```
ConfiguredGrantConfig ::=              SEQUENCE {
    frequencyHopping                       ENUMERATED {intraSlot, interSlot}
OPTIONAL,   -- Need S,
    cg-DMRS-Configuration               DMRS-UplinkConfig,
    mcs-Table                           ENUMERATED {qam256, qam64LowSE}
OPTIONAL,   -- Need S
    mcs-TableTransformPrecoder          ENUMERATED {qam256, qam64LowSE}
OPTIONAL,   -- Need S
    uci-OnPUSCH                         SetupRelease { CG-UCI-OnPUSCH }
OPTIONAL,   -- Need M
    resourceAllocation                  ENUMERATED { resourceAllocationType0,
resourceAllocationType1, dynamicSwitch },
    rbg-Size                                     ENUMERATED {config2}
OPTIONAL,   -- Need S
    powerControlLoopToUse               ENUMERATED {n0, n1},
    p0-PUSCH-Alpha                      P0-PUSCH-AlphaSetId,
    transformPrecoder                        ENUMERATED {enabled, disabled}
OPTIONAL,   -- Need S
    nrofHARQ-Processes                  INTEGER(1..16),
    repK                              ENUMERATED {n1, n2, n4, n8},
    repK-RV                           ENUMERATED {s1-0231, s2-0303, s3-0000}
OPTIONAL,   -- Need R
    periodicity                         ENUMERATED {
                                            sym2, sym7, sym1x14, sym2x14, sym4x14,
sym5x14, sym8x14, sym10x14, sym16x14, sym20x14,
                                            sym32x14, sym40x14, sym64x14, sym80x14,
sym128x14, sym160x14, sym256x14, sym320x14, sym512x14,
                                            sym640x14, sym1024x14, sym1280x14,
sym2560x14, sym5120x14,
                                            sym6, sym1x12, sym2x12, sym4x12, sym5x12,
sym8x12, sym10x12, sym16x12, sym20x12, sym32x12,
                                            sym40x12, sym64x12, sym80x12, sym128x12,
sym160x12, sym256x12, sym320x12, sym512x12, sym640x12,
                                            sym1280x12, sym2560x12
    },
    configuredGrantTimer                         INTEGER (1..64)
OPTIONAL,   -- Need R
    rrc-ConfiguredUplinkGrant           SEQUENCE {
        timeDomainOffset                INTEGER (0..5119),
        timeDomainAllocation            INTEGER (0..15),
        frequencyDomainAllocation         BIT STRING (SIZE(18)),
        antennaPort                     INTEGER (0..31),
        dmrs-SeqInitialization                   INTEGER (0..1)
OPTIONAL,   -- Need R
        precodingAndNumberOfLayers         INTEGER (0..63),
        srs-ResourceIndicator                    INTEGER (0..15)
OPTIONAL,   -- Need R
        mcsAndTBS                       INTEGER (0..31),
        frequencyHoppingOffset                       INTEGER (1..
maxNrofPhysicalResourceBlocks-1)    OPTIONAL,   -- Need R
        pathlossReferenceIndex                   INTEGER (0..maxNrofPUSCH-
PathlossReferenceRSs-1),
        ...
    }
OPTIONAL,   -- Need R
    ...
}
``` wherein the PUSCH transmission is based on a single antenna port. The terminal does not expect scheduling for PUSCH transmission through DCI format 0_0 in a BWP in which a PUCCH resource including pucch-spatialRelation-Info is not configured. In case that txConfig in pusch-Config in Table 10 is not configured for the terminal, the terminal does not expect to be scheduled by DCI format 0_1.

ing SRI. In addition, the TPMI and the transmission rank may be given via a precoding information and number of layers field in the DCI, or may be configured via higher-layer signaling precodingAndNumberOfLayers. The TPMI is used to indicate a precoder applied to the PUSCH transmission. In case that one SRS resource is configured for the terminal, the TPMI is used to indicate a precoder to be

TABLE 10

```
PUSCH-Config ::=                              SEQUENCE {
    dataScramblingIdentityPUSCH                           INTEGER (0..1023)
OPTIONAL, -- Need S
    txConfig                              ENUMERATED {codebook, nonCodebook}
OPTIONAL, -- Need S
    dmrs-UplinkForPUSCH-MappingTypeA                 SetupRelease { DMRS-
UplinkConfig }                            OPTIONAL, -- Need M
    dmrs-UplinkForPUSCH-MappingTypeB                 SetupRelease { DMRS-
UplinkConfig }                            OPTIONAL, -- Need M
    pusch-PowerControl                                   PUSCH-PowerControl
OPTIONAL, -- Need M
    frequencyHopping                      ENUMERATED {intraSlot, interSlot}
OPTIONAL, -- Need S
    frequencyHoppingOffsetLists                  SEQUENCE (SIZE (1..4)) OF
INTEGER (1.. maxNrofPhysicalResourceBlocks-1)
OPTIONAL, -- Need M
    resourceAllocation                    ENUMERATED { resourceAllocationType0,
resourceAllocationType1, dynamicSwitch},
    pusch-TimeDomainAllocationList                   SetupRelease { PUSCH-
TimeDomainResourceAllocationList }        OPTIONAL, -- Need M
    pusch-AggregationFactor                   ENUMERATED { n2, n4, n8 }
OPTIONAL, -- Need S
    mcs-Table                             ENUMERATED {qam256, qam64LowSE}
OPTIONAL, -- Need S
    mcs-TableTransformPrecoder                       ENUMERATED {qam256,
qam64LowSE}                               OPTIONAL, -- Need S
    transformPrecoder                        ENUMERATED {enabled, disabled}
OPTIONAL, -- Need S
    codebookSubset                                              ENUMERATED
{fullyAndPartialAndNonCoherent, partialAndNonCoherent,nonCoherent}
                                                              OPTIONAL, --
Cond codebookBased
    maxRank                                              INTEGER (1..4)
OPTIONAL, -- Cond codebookBased
    rbg-Size                              ENUMERATED { config2}
OPTIONAL, -- Need S
    uci-OnPUSCH                              SetupRelease { UCI-OnPUSCH}
OPTIONAL, -- Need M
    tp-pi2BPSK                                ENUMERATED {enabled}
OPTIONAL, -- Need S
    ...
}
```

Next, codebook-based PUSCH transmission will be described. The codebook-based PUSCH transmission may be dynamically scheduled by DCI format 0_0 or 01, and may be semi-statically operated by the configured grant. In case that the codebook-based PUSCH is dynamically scheduled by DCI format 0_1 or semi-statically configured by the configured grant, the terminal may determine a precoder for PUSCH transmission, based on an SRS resource indicator (SRI), a transmission precoding matrix indicator (TPMI), and a transmission rank (the number of PUSCH transmission layers).

In this case, the SRI may be given via an SRS resource indicator field in the DCI, or may be configured through higher-layer signaling srs-ResourceIndicator. In case that the codebook-based PUSCH transmission is performed, at least one SRS resource is configured for the terminal, and maximum two SRS resources may be configured. In case that the SRI is provided to the terminal via the DCI, the SRS resource indicated by the corresponding SRI means an SRS resource corresponding to the SRI, among SRS resources transmitted earlier than a PDCCH including the correspond-applied to the one configured SRS resource. In case that multiple SRS resources are configured for the terminal, the TPMI is used to indicate a precoder to be applied to an SRS resource indicated via the SRI.

The precoder to be used for the PUSCH transmission is selected from an uplink codebook having the number of antenna ports, which is identical to a nrofSRS-Ports value in the higher-layer signaling SRS-Config. In the codebook-based PUSCH transmission, the terminal determines a codebook subset, based on the TPMI and codebookSubset in the higher-layer signaling pusch-Config. The codebookSubset in the higher-layer signaling pusch-Config may be configured as one of "fullyAndPartialAndNonCoherent," "partialAndNonCoherent," or "nonCoherent," based on the UE capability reported to the base station by the terminal. In case that the terminal has reported "partialAndNonCoherent" as UE capability, the terminal does not expect that a value of the higher singling codebookSubset is to be configured as "fullyAndPartialAndNonCoherent." In addition, in case that the terminal has reported "nonCoherent" as UE capability, the terminal does not expect that a value of the higher-layer signaling codebookSubset is to be configured as "fullyAndPartialAndNonCoherent" or "partialAndNonCoherent." In case that nrofSRS-Ports in the higher-layer signaling SRS-ResourceSet indicates two SRS antenna ports, the terminal does not expect that a value of the higher-layer signaling codebookSubset is to be configured as "partialAndNonCoherent."

One SRS resource set having the usage value configured as "codebook" within the higher-layer signaling SRS-ResourceSet, may be configured for the terminal, and one SRS resource in the corresponding SRS resource set may be indicated via the SRI. In case that there are several SRS resources configured in the SRS resource set having the usage value configured as "codebook" within the higher-layer signaling SRS-ResourceSet, the terminal expects that, as the value of nrofSRS-Ports in the higher-layer signaling SRS-Resource, the same value is to be configured for all SRS resources.

The terminal transmits to the base station one or multiple SRS resources included in the SRS resource set having the usage value configured as "codebook" according to the higher-layer signaling, and the base station selects one of the SRS resources transmitted by the terminal, and indicates the terminal to perform PUSCH transmission, by using transmission beam information of the corresponding SRS resource. In this case, in the codebook-based PUSCH transmission, the SRI is used as information for selecting an index of one SRS resource, and is included in the DCI. Additionally, the base station includes information indicating the rank and the TPMI to be used in case that the terminal performs PUSCH transmission, in the DCI. The terminal performs the PUSCH transmission by applying a precoder indicated by the rank and the TPMI indicated based on the transmission beam of the corresponding SRS resource, by using the SRS resource indicated by the SRI.

Next, the non-codebook-based PUSCH transmission will be described. The non-codebook-based PUSCH transmission may be dynamically scheduled via DCI format 0_0 or 0_1, and may be semi-statically operated by the configured grant. In case that at least one SRS resource is configured in the SRS resource set having the usage value configured as "nonCodebook" within the higher-layer signaling SRS-ResourceSet, the non-codebook-based PUSCH transmission may be scheduled to the terminal via DCI format 0_1.

For the SRS resource set having the usage value configured as "nonCodebook" within the higher-layer signaling SRS-ResourceSet, one connected non-zero power CSI-RS (NZP CSI-RS) resource may be configured for the terminal. The terminal may calculate a precoder for SRS transmission through measurement for an NZP CSI-RS resource connected to the SRS resource set. In case that the interval between the last reception symbol of the aperiodic NZP CSI-RS resource connected to the SRS resource set and the first symbol of the aperiodic SRS transmission has a value difference greater than 42, the terminal does not expect that information on the precoder for the SRS transmission is to be updated.

In case that the value of resourceType in the higher-layer signaling SRS-ResourceSet is configured as "aperiodic," the connected NZP CSI-RS is indicated by an SRS request corresponding to a field in DCI format 0_1 or 1_1. In this case, in case that the connected NZP CSI-RS resource corresponds to an aperiodic NZP CSI-RS resource, it is indicated that the connected NZP CSI-RS exists for a case where a value of the SRS request field in DCI format 0_1 or 1_1 does not correspond to "00." In this case, the corresponding DCI should not indicate cross-carrier or cross-BWP scheduling. In addition, in case that the value of the SRS request indicates the existence of the NZP CSI-RS, the corresponding NZP CSI-RS is positioned in a slot in which a PDCCH including the SRS request field is transmitted. In this case, TCI states configured for the scheduled subcarrier are not configured as QCL-TypeD.

In case that the periodic or semi-persistent SRS resource set is configured, the connected NZP CSI-RS may be indicated through associatedCSI-RS in the higher-layer signaling SRS-ResourceSet. For the non-codebook-based transmission, the terminal does not expect that higher-layer signaling spatialRelationInfo for the SRS resource and the associatedCSI-RS in the higher-layer signaling SRS-ResourceSet are configured together.

In case that multiple SRS resources are configured for the terminal, the terminal may determine the transmission rank and the precoder to be applied for the PUSCH transmission, based on the SRI indicated by the base station. In this case, the SRI may be indicated through an SRS resource indicator field in the DCI, or may be configured via higher-layer signaling srs-ResourceIndicator. Similar to the above-described codebook-based PUSCH transmission, in case that the SRI is provided to the terminal via the DCI, the SRS resource indicated by the corresponding SRI may mean an SRS resource corresponding to the SRI, among the SRS resources transmitted earlier than the PDCCH including the corresponding SRI. The terminal may use one or multiple SRS resources for the SRS transmission, and the maximum number of SRS resources and the maximum number of SRS resources which may be simultaneously transmitted in the same symbol within one SRS resource set are determined by UE capability reported to the base station. In this case, the SRS resources simultaneously transmitted by the terminal occupy the same RB. The terminal configures one SRS port for each SRS resource. Only one SRS resource set having the usage value being configured as "nonCodebook" within the higher-layer signaling SRS-ResourceSet may be configured, and maximum four SRS resources for non-codebook-based PUSCH transmission may be configured.

The base station transmits one NZP-CSI-RS connected to the SRS resource set to the terminal, and the terminal calculates a precoder to be used during transmission of one or multiple SRS resources in the corresponding SRS resource set, based on the result of measurement during reception of the corresponding NZP-CSI-RS. The terminal applies the calculated precoder when transmitting, to the base station, one or multiple SRS resources in the SRS resource set having the usage configured as "nonCodebook," and the base station selects one or multiple SRS resources from among the received one or multiple SRS resources. In this case, the SRI in the non-codebook-based PUSCH transmission indicates an index which may represent one or a combination of multiple SRS resources, and the SRI is included in the DCI. Here, the number of SRS resources indicated by the SRI transmitted by the base station may correspond to the number of transmission layers of the PUSCH, and the terminal applies the precoder, applied to the SRS resource transmission, to each layer to transmit the PUSCH.

[PUSCH: Preparation Procedure Time]

Next, a PUSCH preparation procedure time will be described. In case that the base station performs scheduling so that the terminal transmits the PUSCH, by using DCI format 0_0, 01, or 0_2, the terminal may require a PUSCH preparation procedure time to apply a transmission method (a transmission precoding method of the SRS resource, the number of transmission layers, and a spatial domain transmission filter) indicated via the DCI and transmit the PUSCH. In NR, the PUSCH preparation procedure time is defined in consideration of the description above. The PUSCH preparation procedure time of the terminal may follow [Equation 2] below:

$$T_{proc,2} = \max((N_2+d_{2,1}+d_2)(2048+144)\kappa 2^{-\mu}T_c+T_{ext}+T_{switch}, d_{2,2}).$$  [Equation 2]

Each parameter of $T_{proc,2}$ in Equation 2 above may have the following meaning:

In equation 2, N2, this parameter indicates the number of symbols determined according to numerology and UE processing capability 1 or 2 according to UE capability. In a case where UE processing capability 1 is reported according to UE capability reporting, N2 may have values in Table 11, and in a case where UE processing capability 2 is reported and the availability of UE processing capability 2 is configured via higher-layer signaling, N2 may have values in Table 12.

TABLE 11

| µ | PUSCH preparation time $N_2$ [symbols] |
|---|---|
| 0 | 10 |
| 1 | 12 |
| 2 | 23 |
| 3 | 36 |

TABLE 12

| µ | PUSCH preparation time $N_2$ [symbols] |
|---|---|
| 0 | 5 |
| 1 | 5.5 |
| 2 | 11 for frequency range 1 |

In equation 2, $d_{2,1}$, this corresponds to the number of symbols, determined as 0 in case that resource elements of the first OFDM symbol of the PUSCH transmission is configured with only DM-RSs. Otherwise, $d_{2,1}$ is determined as 1.

In equation 2, κ: 64.

In equation 2, µ, this follows a value which makes $T_{proc,2}$ bigger, among $\mu_{DL}$ and $\mu_{UL}$. $\mu_{DL}$ indicates numerology of a downlink through which a PDCCH including DCI for scheduling a PUSCH is transmitted, and UL indicates numerology of an uplink through which a PUSCH is transmitted.

In equation 2, Tc, Tc has $1/(\Delta f_{max} \cdot N_f)$, $\Delta f_{max}=480 \cdot 10^3$ Hz, and $N_f=4096$ In equation 2, $d_{2,2}$, in case that DCI for scheduling a PUSCH indicates BWP switching, $d_{2,2}$ follows a BWP switching time. Otherwise, $d_{2,2}$ has a value of 0.

In equation 2, $d_2$, in case that OFDM symbols of a PUCCH, a PUSCH having a higher priority index, and PUCCH having a lower priority index overlap on the time domain, a $d_2$ value of the PUSCH having the higher priority index is used. Otherwise, $d_2$ is 0.

In equation 2, $T_{ext}$, in case that the terminal uses a shared spectrum channel access scheme, the terminal may calculate a value of $T_{ext}$ and apply the same to the PDSCH preparation procedure time. Otherwise, the value of $T_{ext}$ is assumed as 0.

In equation 2, $T_{switch}$, in case that an uplink switching spacing is triggered, $T_{switch}$ is assumed as a switching spacing time. Otherwise, $T_{switch}$ is assumed as 0.

Considering the time axis resource mapping information of the PUSCH scheduled via the DCI and an uplink-downlink timing advance effect, the base station and the terminal determine that a PUSCH preparation procedure time is not enough in case that the first symbol of the PUSCH starts earlier than the first uplink symbol in which a CP starts a $T_{proc,2}$ time later from the last symbol of the PDCCH including the DCI which has scheduled the PUSCH. Otherwise, the base station and the terminal determine that the PUSCH preparation procedure time is enough. The terminal may transmit the PUSCH only in case that the PUSCH preparation procedure time is enough, and may ignore the DCI for scheduling the PUSCH in case that the PUSCH preparation procedure time is not enough.

[PUSCH: In Relation to Repeated Transmission]

Hereinafter, repeated uplink data channel transmission in the 5G system will be described in detail. In the 5G system, two types of repeated uplink data channel transmission schemes, that is, PUSCH repeated transmission type A and repeated PUSCH transmission type B are supported. One of repeated PUSCH transmission type A and repeated PUSCH transmission type B may be configured for the terminal via higher-layer signaling.

Repeated PUSCH Transmission Type A

In one embodiment, as described above, in one slot, a symbol length of an uplink data channel and a position of a start symbol are determined according to a time domain resource allocation method, and the base station may notify the terminal of the number of repeated transmissions via higher-layer signaling (for example, RRC signaling) or L1 signaling (for example, DCI).

In one embodiment, the terminal repeatedly transmits, in consecutive slots, an uplink data channel having the same length and start symbol as those of the configured uplink data channel, based on the number of repeated transmission, received from the base station. Here, in case that a slot configured via downlink for the terminal by the base station or at least one of uplink data channel symbols configured for the terminal is configured via downlink, the terminal may omit uplink data channel transmission but count the number of repeated uplink data channel transmissions.

Repeated PUSCH Transmission Type B

In one embodiment, as described above, in one slot, the length and a start symbol of an uplink data channel are determined according to the time domain resource allocation method, and the base station may notify the terminal of the number of repeated transmissions (numberofrepetitions) via higher-layer signaling (for example, RRC signaling) or L1 signaling (for example, DCI).

In one embodiment, first, nominal repetition of the uplink data channel is determined based on the length and the start symbol of the configured uplink data channel as follows. A slot in which the n-th nominal repetition starts is given by $$K_s + \left\lfloor \frac{S + n \cdot L}{N_{symb}^{slot}} \right\rfloor,$$

and the symbol which starts from the slot is given by $\mathrm{mod}(S+n \cdot L, N_{symb}^{slot})$. A slot in which the n-th nominal repetition ends is given by $$K_s + \left\lfloor \frac{S + (n+1) \cdot L - 1}{N_{symb}^{slot}} \right\rfloor,$$

and a symbol which ends in the slot is given by mod(S+ (n+1)·L−1, $N_{symb}^{slot}$). Here, n=0, . . . , numberofrepetitions− 1, S indicates the start symbol of the configured uplink data, and L indicates the symbol length of the configured uplink data channel. Ks indicates a slot in which PUSCH transmission starts, and symb indicates the number of symbols per slot.

In one embodiment, the terminal determines an invalid symbol for repeated PUSCH transmission type B. A symbol configured via downlink by tdd-UL-DL-ConfigurationCommon or tdd-UL-DL-ConfigurationDedicated is determined as the invalid symbol for repeated PUSCH transmission type B. Additionally, the invalid symbol may be configured in a higher-layer parameter (for example, InvalidSymbolPattern). The higher-layer parameter (for example, InvalidSymbolPattern) may provide a symbol-level bitmap over one slot or two slots, and the invalid symbol may be configured therein. In the bitmap, 1 indicates the invalid symbol. Additionally, the periodicity and the pattern of the bitmap may be configured through the higher-layer parameter (for example, periodicityAndPattern). In case that the higher-layer parameter (for example, InvalidSymbolPattern) is configured and an InvalidSymbolPatternIndicator-ForDCIFormat0_1 or an InvalidSymbolPatternIndicator-ForDCIFormat0_2 parameter indicates 1, the terminal applies an invalid symbol pattern. In case that the parameter indicates 0, the terminal does not apply the invalid symbol pattern. In case that the higher-layer parameter (for example, InvalidSymbolPattern) is configured and an InvalidSymbolPatternIndicator-ForDCIFormat0_1 or an InvalidSymbolPatternIndicator-ForDCIFormat0_2 parameter is not configured, the terminal applies the invalid symbol pattern.

After the invalid symbol is determined, the terminal may consider symbols other than the invalid symbol, as valid symbols, for each nominal repetition. In case that one or more valid symbols are included in each nominal repetition, the nominal repetition may include one or more actual repetitions. Here, each actual repetition includes consecutive sets of valid symbols usable for repeated PUSCH transmission type B in one slot.

Figure 3:
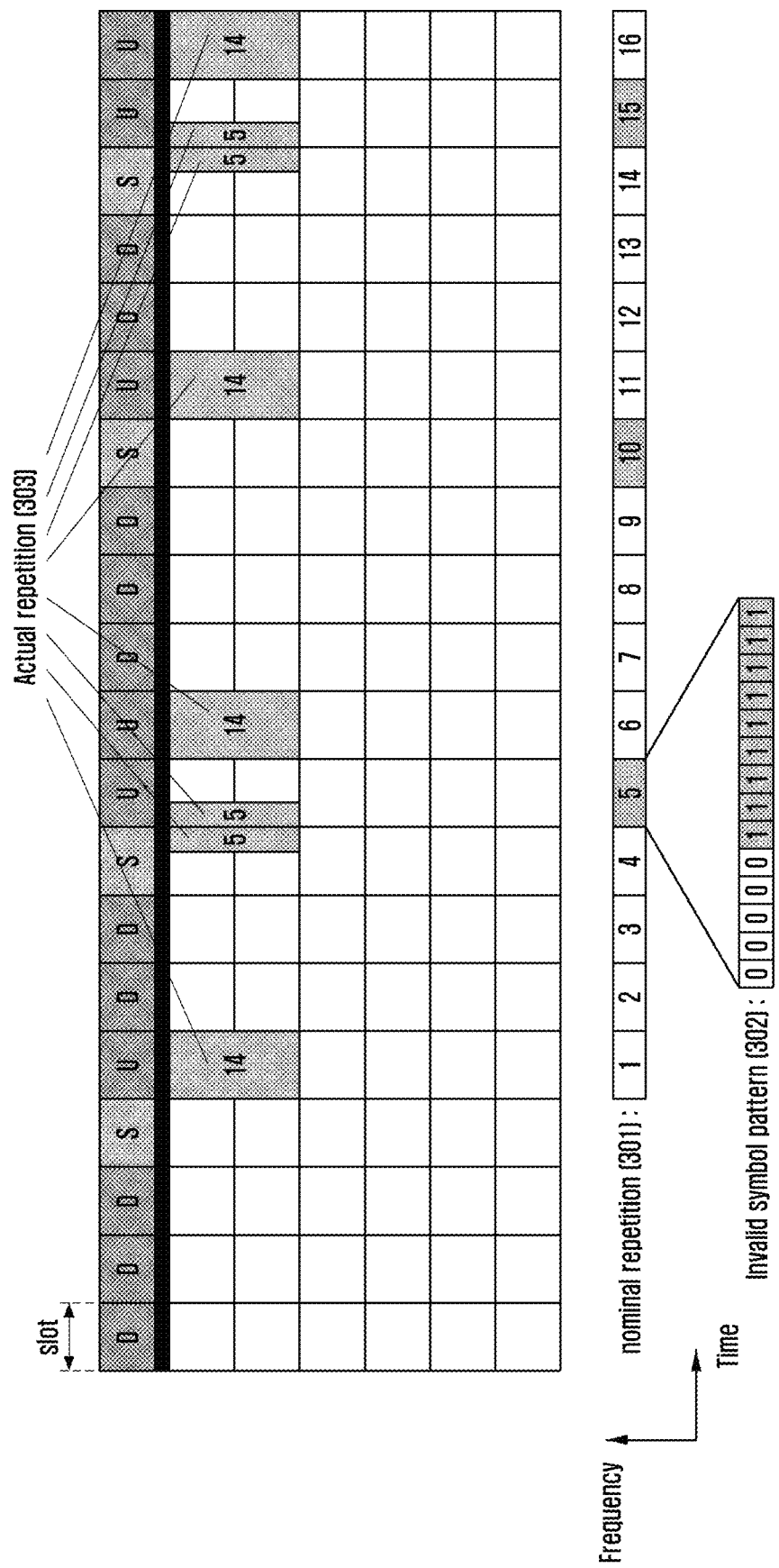
FIG. 3 illustrates an example of repetitive PUSCH transmission type-B in a wireless communication system according to an embodiment of the present disclosure.

FIG. 3 illustrates an example of repetitive PUSCH transmission type-B in a wireless communication system according to an embodiment of the present disclosure. The terminal may receive a configuration of a start symbol S of an uplink data channel as 0, the length L of the uplink data channel as 14, and the number of repeated transmissions as 16. In this case, the nominal repetition 301 is indicated in 16 consecutive slots. Thereafter, the terminal may determine a symbol configured as a downlink symbol in each nominal repetition 301 as an invalid symbol. In addition, the terminal determines symbols configured as 1 in an invalid symbol pattern 302, as invalid symbols. In case that valid symbols, other than invalid symbols, are configured as one or more consecutive symbols in one slot, in each nominal repetition, the valid symbols are configured as actual repetition 303 and transmitted.

In addition, with respect to repeated PUSCH transmission, in NR Release 16, additional methods below may be defined for UL grant-based PUSCH transmission and configured grant-based PUSCH transmission across a slot boundary.

In one embodiment of Method 1 (mini-slot level repetition), through one UL grant, two or more repeated PUSCH transmissions are scheduled in one slot or across a slot boundary in consecutive available slots. In addition, in relation to method 1, time domain resource allocation information in the DCI indicates a resource of the first repeated transmission. Furthermore, the time domain resource information of the remaining repeated transmission may be determined according to the time domain resource information of the first repeated transmission and the uplink or downlink direction determined for each symbol of each slot. Each repeated transmission occupies consecutive symbols.

In one embodiment of Method 2 (multi-segment transmission), Through one UL grant, two or more repeated PUSCH transmissions are scheduled in consecutive slots. In this case, one transmission is designated for each slot, and transmissions may have different start points or different repetition lengths, respectively. In addition, in method 2, the time domain resource allocation information in the DCI indicates start points and repetition lengths of all repeated transmissions. In addition, in case that the repeated transmission is performed in a single slot through method 2 and there are several groups of consecutive uplink symbols in the corresponding slot, each repeated transmission is performed for each uplink symbol group. In case that there is only one group of consecutive uplink symbols in the corresponding slot, one repeated PUSCH transmission is performed according to the method in NR Release 15.

In one embodiment of Method 3, through two or more UL grants, two or more repeated PUSCH transmissions are scheduled in consecutive slots. Here, one transmission is designated for each slot, and the n-th UL grant may perform reception before the PUSCH transmission scheduled by the (n−1)th UL grant ends.

In one embodiment of Method 4, through one UL grant or one configured grant, one or several repeated PUSCH transmissions may be supported in a single sot, or two or more repeated PUSCH transmissions may be supported across the boundary of consecutive slots. The number of repetitions, indicated to the terminal by the base station, is merely a nominal value, and the number of repeated PUSCH transmissions actually performed by the terminal may be greater than the nominal number of repetitions. The time domain resource allocation information in the DCI or the configured grant means a resource of the first repeated transmission indicated by the base station. The time domain resource information of the remaining repeated transmission may be determined with reference to the uplink or downlink direction of symbols and resource information of at least the first repeated transmission. In case that the time domain resource information of the repeated transmission, indicated by the base station, extends over a slot boundary or includes uplink/downlink transition point, the corresponding repeated transmission may be divided into multiple repeated transmissions. In this case, one slot may include one repeated transmission for each uplink period.

[PUSCH: Frequency Hopping Process]

Hereinafter, a frequency hopping of an uplink data channel (a physical uplink shared channel (PUSCH)) in a 5G system will be described in detail.

In 5G, as an uplink data channel frequency hopping method, two methods are supported for each repeated PUSCH transmission type. First, in repeated PUSCH transmission type A, intra-slot frequency hopping and inter-slot frequency hopping are supported, and in repeated PUSCH transmission type B, inter-repetition frequency hopping and inter-slot frequency hopping are supported.

The intra-slot frequency hopping method supported in repeated PUSCH transmission type A corresponds to a method in which the terminal changes a frequency domain allocation resource by a configured frequency offset in two hops in one slot and performs transmission. In the intra-slot frequency hopping, a start RB of each hop may be represented by Equation 3 below:

$$RB_{start} = \begin{cases} RB_{start} & i = 0 \\ (RB_{start} + RB_{offset}) \bmod N_{BWP}^{size} & i = 1 \end{cases}. \quad \text{[Equation 3]}$$

In Equation 3, i=0 and i=1 indicate the first hop and the second hop, respectively, and $RB_{start}$ indicates the start RB in the UL BWP, and is calculated from the frequency resource allocation method. $RB_{offset}$ indicates a frequency offset between two hops through a higher-layer parameter. The number of symbols of the first hop may be represented by $\lfloor N_{symb}^{PUSCH,s}/2 \rfloor$, and the number of symbols of the second hop may be represented by $N_{symb}^{PUSCH,s} - \lfloor N_{symb}^{PUSCH,s}/2 \rfloor$. $N_{symb}^{PUSCH,s}$ corresponds to the length of PUSCH transmission and is represented by the number of OFDM symbols in one slot.

Next, the inter-slot frequency hopping method supported in repeated PUSCH transmission types A and B corresponds to a method in which the terminal changes a frequency domain allocation resource for each slot by a configured frequency offset and performs transmission. In the inter-slot frequency hopping, a start RB for ns slots may be represented by Equation 4 below:

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases}. \quad \text{[Equation 4]}$$

In Equation 4, ns represents a current slot number in multi-slot PUSCH transmission, and $RB_{start}$ indicates a start RB in the UL BWP and is calculated from the frequency resource allocation method. $RB_{offset}$ presents a frequency offset between two hops through a higher-layer parameter.

Next, the inter-repetition frequency hopping method supported in repeated PUSCH transmission type B corresponds to a method for moving a frequency domain allocation resource for one or multiple actual repetitions in each nominal repetition by a configured frequency offset and performing transmission. RBstart(n) corresponding to an index of the start RB on the frequency domain for one or multiple actual repetitions in the n-th nominal repetition may follow Equation 5 below:

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases}. \quad \text{[Equation 5]}$$

In Equation 5, n represents an index of nominal repetition, and $RB_{offset}$ indicates an RB offset between two hops through a higher-layer parameter.

[PUSCH: Multiplexing Rule for AP/SP CSI Reporting]

A method for measuring and reporting a channel state in a 5G communication system will be described below in detail. Channel state information (CSI) may include a channel quality indicator (CQI), a precoding matrix indicator (PMI), a CSI-RS resource indicator (CRI), an SS/PBCH block resource indicator (SSBRI), a layer indicator (LI), a rank indicator (RI), L1-reference signal received power (RSRP), and/or the like. The base station may control time and frequency resources for the above-described CSI measurement and reporting of the terminal.

For the above-described CSI measurement and reporting, the terminal may be configured with a configuration of N (≥1) pieces of CSI report setting information (CSI-ReportConfig), M (≥1) pieces of RS transmission resource configuration information (CSI-ResourceConfig), and one or two pieces of trigger states list information (CSI-AperiodicTriggerStateList and CSI-SemiPersistentOnPUSCH-TriggerStateList), via higher-layer signaling. The configuration information of the above-described CSI measurement and reporting may be described as shown in Table 13 to Table 19 below in more detail.

[Table 13] CSI-ReportConfig

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.

TABLE 13

| CSI-ReportConfig information element |
|---|

```
-- ASN1START
-- TAG-CSI-REPORTCONFIG-START
CSI-ReportConfig ::=                    SEQUENCE {
    reportConfigId                          CSI-ReportConfigId,
    carrier                                 ServCellIndex              OPTIONAL, --
Need S
    resourcesForChannelMeasurement          CSI-ResourceConfigId,
    csi-IM-ResourcesForInterference         CSI-ResourceConfigId       OPTIONAL,
-- Need R
    nzp-CSI-RS-ResourcesForInterference     CSI-ResourceConfigId
OPTIONAL,  -- Need R
    reportConfigType                        CHOICE {
        periodic                                SEQUENCE {
            reportSlotConfig                        CSI-ReportPeriodicityAndOffset,
            pucch-CSI-ResourceList                  SEQUENCE (SIZE
(1..maxNrofBWPs)) OF PUCCH-CSI-Resource
        },
        semiPersistentOnPUCCH                   SEQUENCE {
            reportSlotConfig                        CSI-ReportPeriodicityAndOffset,
            pucch-CSI-ResourceList                  SEQUENCE (SIZE
(1..maxNrofBWPs)) OF PUCCH-CSI-Resource
```

TABLE 13-continued

| CSI-ReportConfig information element |
|---|

```
    },
    semiPersistentOnPUSCH                          SEQUENCE {
            reportSlotConfig                        ENUMERATED {sl5, sl10, sl20, sl40,
sl80, sl160, sl320},
            reportSlotOffsetList                    SEQUENCE (SIZE (1.. maxNrofUL-
Allocations)) OF INTEGER(0..32),
            p0alpha                                 P0-PUSCH-AlphaSetId
    },
    aperiodic                                      SEQUENCE {
            reportSlotOffsetList                    SEQUENCE (SIZE (1..maxNrofUL-
Allocations)) OF INTEGER(0..32)
    }
    },
    reportQuantity                                  CHOICE {
        none                                        NULL,
        cri-RI-PMI-CQI                              NULL,
        cri-RI-i1                                   NULL,
        cri-RI-i1-CQI                               SEQUENCE {
            pdsch-BundleSizeForCSI                  ENUMERATED {n2, n4}
OPTIONAL    -- Need S
        },
        cri-RI-CQI                                  NULL,
        cri-RSRP                                    NULL,
        ssb-Index-RSRP                              NULL,
        cri-RI-LI-PMI-CQI                           NULL
    },
    reportFreqConfiguration                         SEQUENCE {
        cqi-FormatIndicator                         ENUMERATED { widebandCQI,
subbandCQI }                                    OPTIONAL,   -- Need R
        pmi-FormatIndicator                         ENUMERATED { widebandPMI,
subbandPMI }                                    OPTIONAL,   -- Need R
        csi-ReportingBand                           CHOICE {
                subbands3                           BIT STRING(SIZE(3)),
                subbands4                           BIT STRING(SIZE(4)),
                subbands5                           BIT STRING(SIZE(5)),
                subbands6                           BIT STRING(SIZE(6)),
                subbands7                           BIT STRING(SIZE(7)),
                subbands8                           BIT STRING(SIZE(8)),
                subbands9                           BIT STRING(SIZE(9)),
                subbands10                          BIT STRING(SIZE(10)),
                subbands11                          BIT STRING(SIZE(11)),
                subbands12                          BIT STRING(SIZE(12)),
                subbands13                          BIT STRING(SIZE(13)),
                subbands14                          BIT STRING(SIZE(14)),
                subbands15                          BIT STRING(SIZE(15)),
                subbands16                          BIT STRING(SIZE(16)),
                subbands17                          BIT STRING(SIZE(17)),
                subbands18                          BIT STRING(SIZE(18)),
                ...,
                subbands19-v1530                    BIT STRING(SIZE(19))
        }       OPTIONAL   -- Need S
    }
OPTIONAL,   -- Need R
    timeRestrictionForChannelMeasurements           ENUMERATED {configured,
notConfigured},
    timeRestrictionForInterferenceMeasurements      ENUMERATED {configured,
notConfigured},
    codebookConfig                                  CodebookConfig
OPTIONAL,   -- Need R
    dummy                                           ENUMERATED {n1, n2}
OPTIONAL,   -- Need R
    groupBasedBeamReporting                         CHOICE {
        enabled                                     NULL,
        disabled                                    SEQUENCE {
            nrofReportedRS                          ENUMERATED {n1, n2, n3, n4}
OPTIONAL    -- Need S
        }
    },
    cqi-Table                                   ENUMERATED {table1, table2, table3, spare1}
OPTIONAL,   -- Need R
    subbandSize                                 ENUMERATED {value1, value2},
    non-PMI-PortIndication                      SEQUENCE (SIZE (1..maxNrofNZP-CSI-RS-
ResourcesPerConfig)) OF PortIndexFor8Ranks OPTIONAL,   -- Need R
    ...,
    [[
    semiPersistentOnPUSCH-v1530                     SEQUENCE {
        reportSlotConfig-v1530                      ENUMERATED {sl4, sl8, sl16}
    }
```

TABLE 13-continued

| CSI-ReportConfig information element |
|---|

```
OPTIONAL    -- Need R
    ]]
}
CSI-ReportPeriodicityAndOffset ::=       CHOICE {
    slots4                                   INTEGER(0..3),
    slots5                                   INTEGER(0..4),
    slots8                                   INTEGER(0..7),
    slots10                                  INTEGER(0..9),
    slots16                                  INTEGER(0..15),
    slots20                                  INTEGER(0..19),
    slots40                                  INTEGER(0..39),
    slots80                                  INTEGER(0..79),
    slots160                                 INTEGER(0..159),
    slots320                                 INTEGER(0..319)
}
PUCCH-CSI-Resource ::=                   SEQUENCE {
    uplinkBandwidthPartId                    BWP-Id,
    pucch-Resource                           PUCCH-ResourceId
}
PortIndexFor8Ranks ::=                   CHOICE {
    portIndex8                               SEQUENCE{
        rank1-8                                  PortIndex8
OPTIONAL,    -- Need R
        rank2-8                                  SEQUENCE(SIZE(2)) OF PortIndex8
OPTIONAL,    -- Need R
        rank3-8                                  SEQUENCE(SIZE(3)) OF PortIndex8
OPTIONAL,    -- Need R
        rank4-8                                  SEQUENCE(SIZE(4)) OF PortIndex8
OPTIONAL,    -- Need R
        rank5-8                                  SEQUENCE(SIZE(5)) OF PortIndex8
OPTIONAL,    -- Need R
        rank6-8                                  SEQUENCE(SIZE(6)) OF PortIndex8
OPTIONAL,    -- Need R
        rank7-8                                  SEQUENCE(SIZE(7)) OF PortIndex8
OPTIONAL,    -- Need R
        rank8-8                                  SEQUENCE(SIZE(8)) OF PortIndex8
OPTIONAL    -- Need R
    },
    portIndex4                               SEQUENCE{
        rank1-4                                  PortIndex4
OPTIONAL,    -- Need R
        rank2-4                                  SEQUENCE(SIZE(2)) OF PortIndex4
OPTIONAL,    -- Need R
        rank3-4                                  SEQUENCE(SIZE(3)) OF PortIndex4
OPTIONAL,    -- Need R
        rank4-4                                  SEQUENCE(SIZE(4)) OF PortIndex4
OPTIONAL    -- Need R
    },
    portIndex2                               SEQUENCE{
        rank1-2                                  PortIndex2
OPTIONAL,    -- Need R
        rank2-2                                  SEQUENCE(SIZE(2)) OF PortIndex2
OPTIONAL    -- Need R
    },
    portIndex1                               NULL
}
PortIndex8::=                            INTEGER (0..7)
PortIndex4::=                            INTEGER (0..3)
PortIndex2::=                            INTEGER (0..1)
-- TAG-CSI-REPORTCONFIG-STOP
-- ASN1STOP
```

CSI-ReportConfig Field Descriptions

<carrier>

Indicates in which serving cell the CSI-ResourceConfig indicated below are to be found. If the field is absent, the resources are on the same serving cell as this report configuration.

<codebookConfig>

Codebook configuration for Type-1 or Type-2 including codebook subset restriction. Network does not configure codebookConfig and codebookConfig-r16 simultaneously to a UE.

<cqi-FormatIndicator>

Indicates whether the UE shall report a single (wideband) or multiple (subband) CQI. (see TS 38.214 [19], clause 5.2.1.4).

<cqi-Table>

Which CQI table to use for CQI calculation (see TS 38.214 [19], clause 5.2.2.1).

<csi-IM-ResourcesForInterference>

CSI IM resources for interference measurement. csi-ResourceConfigId of a CSI-ResourceConfig included in the configuration of the serving cell indicated with the field "carrier" above. The CSI-ResourceConfig indicated here contains only CSI-IM resources. The bwp-Id in that CSI-ResourceConfig is the same value as the bwp-Id in the CSI-ResourceConfig indicated by resourcesForChannelMeasurement.

<csi-ReportingBand>

Indicates a contiguous or non-contiguous subset of subbands in the bandwidth part which CSI shall be reported for. Each bit in the bit-string represents one subband. The right-most bit in the bit string represents the lowest subband in the BWP. The choice determines the number of subbands (subbands3 for 3 subbands, subbands4 for 4 subbands, and so on) (see TS 38.214 [19], clause 5.2.1.4). This field is absent if there are less than 24 PRBs (no sub band) and present otherwise, the number of sub bands can be from 3 (24 PRBs, sub band size 8) to 18 (72 PRBs, sub band size 4).

<dummy>

This field is not used in the specification. If received the field may be ignored by the UE.

<groupBasedBeamReporting>

Turning on/off group beam based reporting (see TS 38.214 [19], clause 5.2.1.4).

<non-PMI-PortIndication>

Port indication for RI/CQI calculation. For each CSI-RS resource in the linked ResourceConfig for channel measurement, a port indication for each rank R, indicating which R ports to use. Applicable only for non-PMI feedback (see TS 38.214 [19], clause 5.2.1.4.2).

The first entry in non-PMI-PortIndication corresponds to the NZP-CSI-RS-Resource indicated by the first entry in nzp-CSI-RS-Resources in the NZP-CSI-RS-ResourceSet indicated in the first entry of nzp-CSI-RS-ResourceSetList of the CSI-ResourceConfig whose CSI-ResourceConfigId is indicated in a CSI-MeasId together with the above CSI-ReportConfigId; the second entry in non-PMI-PortIndication corresponds to the NZP-CSI-RS-Resource indicated by the second entry in nzp-CSI-RS-Resources in the NZP-CSI-RS-ResourceSet indicated in the first entry of nzp-CSI-RS-ResourceSetList of the same CSI-ResourceConfig, and so on until the NZP-CSI-RS-Resource indicated by the last entry in nzp-CSI-RS-Resources in the in the NZP-CSI-RS-ResourceSet indicated in the first entry of nzp-CSI-RS-ResourceSetList of the same CSI-ResourceConfig. Then the next entry corresponds to the NZP-CSI-RS-Resource indicated by the first entry in nzp-CSI-RS-Resources in the NZP-CSI-RS-ResourceSet indicated in the second entry of nzp-CSI-RS-ResourceSetList of the same CSI-ResourceConfig and so on.

<nrofReportedRS>

The number (N) of measured RS resources to be reported per report setting in a non-group-based report. N<=N_max, where N_max is either 2 or 4 depending on UE capability.

(see TS 38.214 [19], clause 5.2.1.4) When the field is absent the UE applies the value 1.

<nzp-CSI-RS-ResourcesForInterference>

NZP CSI RS resources for interference measurement. csi-ResourceConfigId of a CSI-ResourceConfig included in the configuration of the serving cell indicated with the field "carrier" above. The CSI-ResourceConfig indicated here contains only NZP-CSI-RS resources. The bwp-Id in that CSI-ResourceConfig is the same value as the bwp-Id in the CSI-ResourceConfig indicated by resourcesForChannelMeasurement.

<p0alpha>

Index of the p0-alpha set determining the power control for this CSI report transmission (see TS 38.214 [19], clause 6.2.1.2).

<pdsch-BundleSizeForCSI>

PRB bundling size to assume for CQI calculation when reportQuantity is CRI/RI/i1/CQI. If the field is absent, the UE assumes that no PRB bundling is applied (see TS 38.214 [19], clause 5.2.1.4.2).

<pmi-FormatIndicator>

Indicates whether the UE shall report a single (wideband) or multiple (subband) PMI. (see TS 38.214 [19], clause 5.2.1.4).

<pucch-CSI-ResourceList>

Indicates which PUCCH resource to use for reporting on PUCCH.

<reportConfigType>

Time domain behavior of reporting configuration.

<reportFreqConfiguration>

Reporting configuration in the frequency domain. (see TS 38.214 [19], clause 5.2.1.4).

<reportQuantity>

The CSI related quantities to report. see TS 38.214 [19], clause 5.2.1. If the field reportQuantity-r16 is present, UE shall ignore reportQuantity (without suffix).

<reportSlotConfig>

Periodicity and slot offset (see TS 38.214 [19], clause 5.2.1.4). If the field reportSlotConfig-v1530 is present, the UE shall ignore the value provided in reportSlotConfig (without suffix).

<reportSlotOffsetList, reportSlotOffsetListDCI-0-1, reportSlotOffsetListDCI-0-2>

Timing offset Y for semi persistent reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on. The first report is transmitted in slot n+Y, second report in n+Y+P, where P is the configured periodicity.

Timing offset Y for aperiodic reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on (see TS 38.214 [19], clause 6.1.2.1). The field reportSlotOffsetList applies to DCI format 0_0, the field reportSlotOffsetListDCI-0-1 applies to DCI format 0_1 and the field reportSlotOffsetListDCI-0-2 applies to DCI format 0_2 (see TS 38.214 [19], clause 6.1.2.1).

<resourcesForChannelMeasurement>

Resources for channel measurement. csi-ResourceConfigId of a CSI-ResourceConfig included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-Id in that CSI-ResourceConfig.

<subbandSize>

Indicates one out of two possible BWP-dependent values for the subband size as indicated in TS 38.214 [19], table 5.2.1.4-2. If csi-ReportingBand is absent, the UE shall ignore this field.

<timeRestrictionForChannelMeasurements>
Time domain measurement restriction for the channel (signal) measurements (see TS 38.214 [19], clause 5.2.1.1).
<timeRestrictionForInterferenceMeasurements>
Time domain measurement restriction for interference measurements (see TS 38.214 [19], clause 5.2.1.1).

The IE CSI-ResourceConfig defines a group of one or more NZP-CSI-RS-ResourceSet, CSI-IM-ResourceSet and/or CSI-SSB-ResourceSet.

TABLE 14

CSI-ResourceConfig information element

```
-- ASN1START
-- TAG-CSI-RESOURCECONFIG-START
CSI-ResourceConfig ::=    SEQUENCE {
   csi-ResourceConfigId        CSI-ResourceConfigId,
   csi-RS-ResourceSetList      CHOICE {
      nzp-CSI-RS-SSB              SEQUENCE {
         nzp-CSI-RS-ResourceSetList   SEQUENCE (SIZE (1..maxNrofNZP-CSI-RS-ResourceSetsPerConfig)) OF NZP-CSI-RS-ResourceSetId
OPTIONAL, -- Need R
         csi-SSB-ResourceSetList      SEQUENCE (SIZE (1..maxNrofCSI-SSB-ResourceSetsPerConfig)) OF CSI-SSB-ResourceSetId
OPTIONAL   -- Need R
      },
      csi-IM-ResourceSetList       SEQUENCE (SIZE (1..maxNrofCSI-IM-ResourceSetsPerConfig)) OF CSI-IM-ResourceSetId
   },
   bwp-Id                      BWP-Id,
   resourceType                ENUMERATED { aperiodic, semiPersistent, periodic },
   ...
}
-- TAG-CSI-RESOURCECONFIG-STOP
-- ASN1STOP
```

CSI-ResourceConfig field descriptions

<bwp-Id>

The DL BWP which the CSI-RS associated with this CSI-ResourceConfig are located in (see TS 38.214 [19], clause 5.2.1.2.

<csi-IM-ResourceSetList>

List of references to CSI-IM resources used for beam measurement and reporting in a CSI-RS resource set. Contains up to maxNrofCSI-IM-ResourceSetsPerConfig resource sets if resourceType is "aperiodic" and 1 otherwise (see TS 38.214 [19], clause 5.2.1.2).

<csi-ResourceConfigId>

Used in CSI-ReportConfig to refer to an instance of CSI-ResourceConfig.

<csi-SSB-ResourceSetList>

List of references to SSB resources used for beam measurement and reporting in a CSI-RS resource set (see TS 38.214 [19], clause 5.2.1.2).

<nzp-CSI-RS-ResourceSetList>

List of references to NZP CSI-RS resources used for beam measurement and reporting in a CSI-RS resource set. Contains up to maxNrofNZP-CSI-RS-ResourceSetsPerConfig resource sets if resourceType is "aperiodic" and 1 otherwise (see TS 38.214 [19], clause 5.2.1.2).

<resourceType>

Time domain behavior of resource configuration (see TS 38.214 [19], clause 5.2.1.2). It does not apply to resources provided in the csi-SSB-ResourceSetList.

The IE NZP-CSI-RS-ResourceSet is a set of Non-Zero-Power (NZP) CSI-RS resources (their IDs) and set-specific parameters.

TABLE 15

NZP-CSI-RS-ResourceSet information element

```
-- ASN1START
-- TAG-NZP-CSI-RS-RESOURCESET-START
NZP-CSI-RS-ResourceSet ::=       SEQUENCE {
   nzp-CSI-ResourceSetId            NZP-CSI-RS-ResourceSetId,
   nzp-CSI-RS-Resources             SEQUENCE (SIZE (1..maxNrofNZP-CSI-RS-ResourcesPerSet)) OF NZP-CSI-RS-ResourceId,
   repetition                       ENUMERATED { on, off }
OPTIONAL,   -- Need S
   aperiodicTriggeringOffset        INTEGER(0..6)
OPTIONAL,   -- Need S
   trs-Info                         ENUMERATED {true}
OPTIONAL,   -- Need R
   ...
}
-- TAG-NZP-CSI-RS-RESOURCESET-STOP
-- ASN1STOP
```

NZP-CSI-RS-ResourceSet Field Descriptions

<aperiodicTriggeringOffset, aperiodicTriggeringOffset-r16>

Offset X between the slot containing the DCI that triggers a set of aperiodic NZP CSI-RS resources and the slot in which the CSI-RS resource set is transmitted. For aperiodicTriggeringOffset, the value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. For aperiodicTriggeringOffset-r16, the value indicates the number of slots. The network configures only one of the fields. When neither field is included, the UE applies the value 0.

<nzp-CSI-RS-Resources>

NZP-CSI-RS-Resources associated with this NZP-CSI-RS resource set (see TS 38.214 [19], clause 5.2). For CSI, there are at most 8 NZP CSI RS resources per resource set.

<repetition>

Indicates whether repetition is on/off. If the field is set to off or if the field is absent, the UE may not assume that the NZP-CSI-RS resources within the resource set are transmitted with the same downlink spatial domain transmission filter (see TS 38.214 [19], clauses 5.2.2.3.1 and 5.1.6.1.2). It can only be configured for CSI-RS resource sets which are associated with CSI-ReportConfig with report of L1 RSRP or "no report."

<trs-Info>

Indicates that the antenna port for all NZP-CSI-RS resources in the CSI-RS resource set is same. If the field is absent or released the UE applies the value false (see TS 38.214 [19], clause 5.2.2.3.1).

The IE CSI-SSB-ResourceSet is used to configure one SS/PBCH block resource set which refers to SS/PBCH as indicated in ServingCellConfigCommon.

TABLE 16

| CSI-SSB-ResourceSet information element |
|---|
| -- ASN1START<br>-- TAG-CSI-SSB-RESOURCESET-START<br>CSI-SSB-ResourceSet ::=    SEQUENCE {<br>   csi-SSB-ResourceSetId         CSI-SSB-ResourceSetId,<br>   csi-SSB-ResourceList          SEQUENCE (SIZE(1..maxNrofCSI-SSB-ResourcePerSet)) OF SSB-Index,<br>   ...<br>}<br>-- TAG-CSI-SSB-RESOURCESET-STOP<br>-- ASN1STOP |

The IE CSI-IM-ResourceSet is used to configure a set of one or more CSI Interference Management (IM) resources (their IDs) and set-specific parameters.

TABLE 17

| CSI-IM-ResourceSet information element |
|---|
| -- ASN1START<br>-- TAG-CSI-IM-RESOURCESET-START<br>CSI-IM-ResourceSet ::=    SEQUENCE {<br>   csi-IM-ResourceSetId          CSI-IM-ResourceSetId,<br>   csi-IM-Resources              SEQUENCE (SIZE(1..maxNrofCSI-IM-ResourcesPerSet)) OF CSI-IM-ResourceId,<br>   ...<br>}<br>-- TAG-CSI-IM-RESOURCESET-STOP<br>-- ASN1STOP |

CSI-ITM-ResourceSet Field Descriptions

<csi-IM-Resources>

CSI-IM-Resources associated with this CSI-IM-Resource Set (see TS 38.214 [19], clause 5.2)

The CSI-AperiodicTriggerStateList IE is used to configure the UE with a list of aperiodic trigger states. Each codepoint of the DCI field "CSI request" is associated with one trigger state. Upon reception of the value associated with a trigger state, the UE will perform measurement of CSI-RS (reference signals) and aperiodic reporting on L1 according to all entries in the associatedReportConfigInfoList for that trigger state.

TABLE 18

| CSI-AperiodicTriggerStateList information element |
|---|
| -- ASN1START<br>-- TAG-CSI-APERIODICTRIGGERSTATELIST-START<br>CSI-AperiodicTriggerStateList ::=    SEQUENCE (SIZE (1..maxNrOfCSI-AperiodicTriggers)) OF CSI-AperiodicTriggerState<br>CSI-AperiodicTriggerState ::=    SEQUENCE {<br>   associatedReportConfigInfoList           SEQUENCE (SIZE(1..maxNrofReportConfigPerAperiodicTrigger)) OF CSI-AssociatedReportConfigInfo,<br>   ...<br>}<br>CSI-AssociatedReportConfigInfo ::=    SEQUENCE {<br>   reportConfigId                CSI-ReportConfigId,<br>   resourcesForChannel           CHOICE {<br>     nzp-CSI-RS                    SEQUENCE {<br>       resourceSet                   INTEGER (1..maxNrofNZP-CSI-RS-ResourceSetsPerConfig),<br>       qcl-info                      SEQUENCE (SIZE(1..maxNrofAP-CSI-RS-ResourcesPerSet)) OF TCI-StateId<br>       OPTIONAL   -- Cond Aperiodic<br>     },<br>     csi-SSB-ResourceSet           INTEGER (1..maxNrofCSI-SSB-ResourceSetsPerConfig)<br>   },<br>   csi-IM-ResourcesForInterference     INTEGER(1..maxNrofCSI-IM-ResourceSetsPerConfig)<br>   OPTIONAL, -- Cond CSI-IM-ForInterference<br>   nzp-CSI-RS-ResourcesForInterference INTEGER (1..maxNrofNZP-CSI-RS- |

TABLE 18-continued

CSI-AperiodicTriggerStateList information element

```
ResourceSetsPerConfig)
OPTIONAL, -- Cond NZP-CSI-RS-ForInterference
    ...
}
-- TAG-CSI-APERIODICTRIGGERSTATELIST-STOP
-- ASN1STOP
```

CSI-AssociatedReportConfigInfo Field Descriptions
<csi-IM-ResourcesForInterference>
CSI-IM-ResourceSet for interference measurement. Entry number in csi-IM-ResourceSetList in the CSI-ResourceConfig indicated by csi-IM-ResourcesForInterference in the CSI-ReportConfig indicated by reportConfigId above (1 corresponds to the first entry, 2 to the second entry, and so on). The indicated CSI-IM-ResourceSet should have exactly the same number of resources like the NZP-CSI-RS-Resource Set indicated in nzp-CSI-RS-ResourcesforChannel.
<csi-SSB-ResourceSet>
CSI-SSB-ResourceSet for channel measurements. Entry number in csi-SSB-ResourceSetList in the CSI-ResourceConfig indicated by resourcesForChannelMeasurement in the CSI-ReportConfig indicated by reportConfigId above (1 corresponds to the first entry, 2 to the second entry, and so on).
<nzp-CSI-RS-ResourcesForInterference>
NZP-CSI-RS-ResourceSet for interference measurement. Entry number in nzp-CSI-RS-ResourceSetList in the CSI-ResourceConfig indicated by nzp-CSI-RS-ResourcesForInterference in the CSI-ReportConfig indicated by reportConfigId above (1 corresponds to the first entry, 2 to the second entry, and so on).
<qcl-info>
List of references to TCI-States for providing the QCL source and QCL type for each NZP-CSI-RS-Resource listed in nzp-CSI-RS-Resources of the NZP-CSI-RS-ResourceSet indicated by nzp-CSI-RS-ResourcesforChannel. Each TCI-StateId refers to the TCI-State which has this value for tci-StateId and is defined in tci-StatesToAddModList in the PDSCH-Config included in the BWP-Downlink corresponding to the serving cell and to the DL BWP to which the resourcesForChannelMeasurement (in the CSI-ReportConfig indicated by reportConfigId above) belong to. First entry in qcl-info-forChannel corresponds to first entry in nzp-CSI-RS-Resources of that NZP-CSI-RS-ResourceSet, second entry in qcl-info-forChannel corresponds to second entry in nzp-CSI-RS-Resources, and so on (see TS 38.214 [19], clause 5.2.1.5.1)

<reportConfigId>
The reportConfigId of one of the CSI-ReportConfigToAddMod configured in CSI-MeasConfig
<resourceSet>
NZP-CSI-RS-ResourceSet for channel measurements. Entry number in nzp-CSI-RS-ResourceSetList in the CSI-ResourceConfig indicated by resourcesForChannelMeasurement in the CSI-ReportConfig indicated by reportConfigId above (1 corresponds to the first entry, 2 to the second entry, and so on).

| Conditional Presence | Explanation |
| --- | --- |
| Aperiodic | The field is mandatory present if the NZP-CSI-RS-Resources in the associated resourceSet have the resourceType aperiodic. The field is absent otherwise. |
| CSI-IM-ForInterference | This field is mandatory present if the CSI-ReportConfig identified by reportConfigId is configured with csi-IM-ResourcesForInterference; otherwise it is absent. |
| NZP-CSI-RS-ForInterference | This field is mandatory present if the CSI-ReportConfig identified by reportConfigId is configured with nzp-CSI-RS-ResourcesForInterference; otherwise it is absent. |

The CSI-SemiPersistentOnPUSCH-TriggerStateList IE is used to configure the UE with list of trigger states for semi-persistent reporting of channel state information on Lil. See also TS 38.214 [19], clause 5.2.

TABLE 19

CSI-SemiPersistentOnPUSCH-TriggerStateList information element

```
-- ASN1START
-- TAG-CSI-SEMIPERSISTENTONPUSCHTRIGGERSTATELIST-START
CSI-SemiPersistentOnPUSCH-TriggerStateList ::=
                    SEQUENCE(SIZE (1..maxNrOfSemiPersistentPUSCH-
Triggers)) OF CSI-SemiPersistentOnPUSCH-TriggerState
CSI-SemiPersistentOnPUSCH-TriggerState ::          SEQUENCE {
    associatedReportConfigInfo                     CSI-ReportConfigId,
    ...
}
-- TAG-CSI-SEMIPERSISTENTONPUSCHTRIGGERSTATELIST-STOP
-- ASN1STOP
```

In relation to the above-described CSI report setting (CSI-ReportConfig), each report setting, CSI-ReportConfig, may be associated with one downlink (DL) bandwidth part identified by a higher-layer parameter bandwidth part identifier (bwp-id) provided via CSI resource configuration (CSI-ResourceConfig) associated with the corresponding CSI report setting. "Aperiodic," "semi-persistent," and "periodic" types are supported for a time domain reporting operation regarding each reporting setting CSI-ReportConfig, and may be configured by the base station to the terminal via a reportConfigType parameter configured from a higher-layer. A semi-persistent CSI reporting method supports "PUCCH-based semi-persistent (semi-PersistentOnPUCCH)" and "PUSCH-based semi-persistent (semi-PersistentOnPUSCH)" reporting methods. In a periodic or semi-persistent CSI reporting method, the terminal may be configured with a PUCCH or PUSCH resource for transmitting the CSI from the base station via higher-layer signaling. A period and a slot offset of the PUCCH or PUSCH resource for transmitting the CSI may be provided via numerology of an uplink (UL) bandwidth part configured to transmit CSI reporting. In an aperiodic CSI reporting method, the PUSCH resource for transmitting the CSI may be scheduled to the terminal via L1 signaling (DCI format 0_1 described above) by the base station.

With respect to the CSI resource configuration (CSI-ResourceConfig), each CSI resource configuration (CSI-ResourceConfig) may include S (≥1) CSI resource sets (provided as a higher-layer parameter csi-RS-Resource-SetList). A CSI resource set list may include a non-zero power (NZP) CSI-RS resource set and a SS/PBCH block set or may include a CSI-interference measurement (CSI-IM) resource set. Each CSI resource configuration may be positioned at a downlink (DL) bandwidth part identified by the higher-layer parameter bwp-id, and the CSI resource configuration may be connected to the CSI report setting at the same downlink bandwidth part. A time domain operation of a CSI-RS resource in the CSI resource configuration may be configured, by a higher-layer parameter resourceType to be one of "aperiodic," "periodic," or "semi-persistent." With respect to the periodic or semi-persistent CSI resource setting, the number of CSI-RS resource sets may be limited to S=1, and a configured period and a slot offset may be provided via numerology of the downlink bandwidth part identified by bwp-id.

The terminal may be configured with, by the base station, one or more CSI resource settings for channel or interference measurement via higher-layer signaling, and for example, may include the following CSI resources.

CSI-IM resource for IM;

NZP CSI-RS resource for IM; and/or

NZP CSI-RS resource for channel measurement.

With respect to the CSI-RS resource sets associated with resource setting in which the higher-layer parameter resourceType is configured to be "aperiodic," "periodic," or "semi-persistent," a trigger state for the CSI report setting in which the reportType is configured to be "aperiodic" and a resource setting for channel or interference measurement for one or multiple component cells (CCs) may be configured through higher-layer parameter CSI-AperiodicTriggerStateList.

The aperiodic CSI reporting of the terminal may use a PUSCH, the periodic CSI reporting may use a PUCCH, and the semi-persistent CSI reporting may use a PUSCH when triggered or activated by DCI and may use a PUCCH after being activated by an MAC control element (MAC CE). As described above, the CSI resource setting may also be configured to be aperiodic, periodic, or semi-persistent. Combinations of the CSI report setting and the CSI resource configuration may be supported based on Table 20 below.

TABLE 20

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command, as described in clause 6.1.3.16 of [10, TS 38.321]; for reporting on PUSCH, the UE receives triggering on DCI | Triggered by DCI; additionally, activation command as described in clause 6.1.3.13 of [10, TS 38.321] possible as defined in Clause 5.2.1.5.1. |
| Semi-Persistent CSI-RS | Not Supported | For reporting on PUCCH, the UE receives an activation command, as described in clause 6.1.3.16 of [10, TS 38.321]; for reporting on PUSCH, the UE receives triggering on DCI | Triggered by DCI; additionally, activation command as described in clause 6.1.3.13 of [10, TS 38.321] possible as defined in Clause 5.2.1.5.1. |
| Aperiodic CSI-RS | Not Supported | Not Supported | Triggered by DCI; additionally, activation command as described in clause 6.1.3.13 of [10, TS 38.321] possible as defined in Clause 5.2.1.5.1. |

The aperiodic CSI reporting may be triggered by a "CSI request" field of aforementioned DCI format 0_1 corresponding to scheduling DCI for a PUSCH. The terminal may monitor a PDCCH, obtain DCI format 01, and obtain scheduling information for the PUSCH and a CSI request indicator. The CSI request indicator may be configured in NTS (=0, 1, 2, 3, 4, 5, or 6) bits and may be determined by a higher-layer signaling reportTriggerSize.

From among one or multiple aperiodic CSI reporting trigger states that may be configured via the higher-layer signaling (CSI-AperiodicTriggerStateList), one trigger state may be triggered by the CSI request indicator.

In case that all bits of a CSI request field is 0, it may mean that the CSI reporting is not requested;

In case that the number M of CSI trigger states within the configured CSI-AperiodicTriggerStateList is greater than 2NTs−1, the M CSI trigger states may be mapped to 2NTs−1 according to a pre-defined mapping relationship, and one of 2NTs−1 trigger states may be indicated via the CSI request field; and/or In case that the number M of CSI trigger states in the configured CSI-AperiodicTriggerStateList is equal to or less than 2NTs−1, one of M CSI trigger states may be indicated via the CSI request field.

Table 21 below shows an example of the relationship between a CSI request indicator and a CSI trigger state which may be indicated by the corresponding indicator.

TABLE 21

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1 | CSI resource#1, |

TABLE 21-continued

| CSI request field | CSI trigger state | CSI-ReportConfigId | CSI-ResourceConfigId |
|---|---|---|---|
| | | CSI report#2 | CSI resource#2 |
| 10 | CSI trigger state#2 | CSI report#3 | CSI resource#3 |
| 11 | CSI trigger state#3 | CSI report#4 | CSI resource#4 |

The terminal may perform measurement on a CSI resource in the CSI trigger state triggered by the CSI request field, and produce CSI (including at least one of CQI, PMI, CRI, SSBRI, LI, RI, or L1-RSRP described above) therefrom. The terminal may transmit the obtained CSI by using the PUSCH scheduled by the corresponding DCI format 0_1. In case that 1 bit corresponding to an UL data indicator (UL-SCH indicator) in DCI format 0_1 indicates "1," uplink data (UL-SCH) and the obtained CSI may be multiplexed on the PUSCH resource scheduled by DCI format 0_1 and transmitted. In case that the 1 bit corresponding to the uplink data indicator (UL-SCH indicator) in DCI format 0_1 indicates "0," only the CSI may be mapped on the PUSCH resource scheduled by DCI format 0_1 without the uplink data (UL-SCH) and transmitted.

Figure 4:
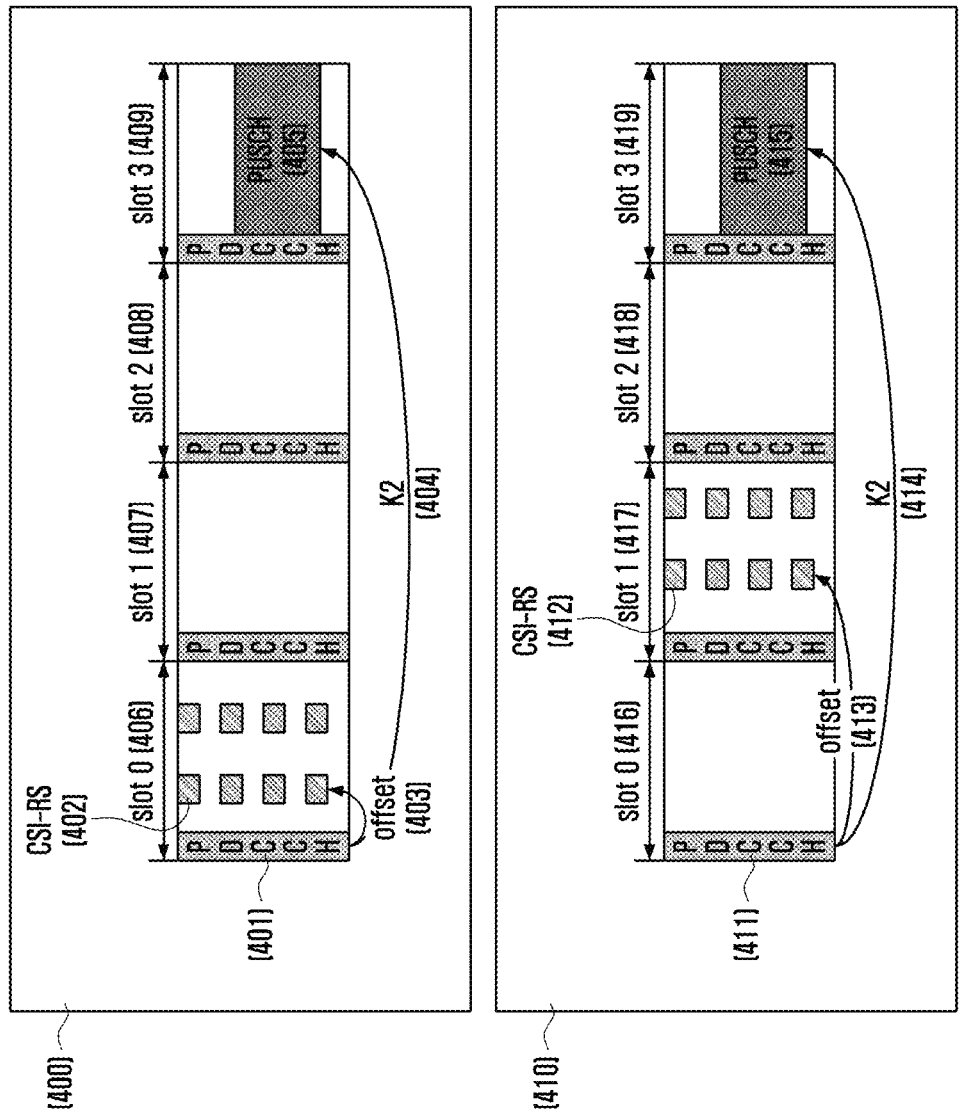
FIG. 4 illustrates an example of an aperiodic CSI report method according to an embodiment of the present disclosure.

FIG. 4 illustrates an example of an aperiodic CSI report method according to various embodiments of the present disclosure.

In an example 400 of FIG. 4, the terminal may obtain DCI format 0_1 by monitoring a PDCCH 401 and obtain CSI request information and scheduling information for a PUSCH 405 therefrom. The terminal may obtain resource information for a CSI-RS 402 to be measured from the received CSI request indicator. The terminal may determine a time point at which resources of the transmitted CSI-RS 402 are measured, based on a time point at which DCI format 0_1 is received and a parameter for an offset (aperiodicTriggeringOffset) within an CSI-RS resource set configuration (for example, NZP-CSI-RS-ResourceSet). More specifically, the terminal may be configured with, by the base station via higher-layer signaling, an offset value X of the parameter (aperiodicTriggeringOffset) in the NZP-CSI-RS resource set configuration, and the configured offset value X may denote an offset between a slot where a CSI-RS resource is transmitted and a slot where DCI for triggering aperiodic CSI reporting is received. For example, a parameter value of the aperiodicTriggeringOffset and the offset value X may have a mapping relationship shown in Table 22 below.

TABLE 22

| aperiodicTriggeringOffset | Offset X |
|---|---|
| 0 | 0 slot |
| 1 | 1 slot |

TABLE 22-continued

| aperiodicTriggeringOffset | Offset X |
|---|---|
| 2 | 2 slots |
| 3 | 3 slots |
| 4 | 4 slots |
| 5 | 16 slots |
| 6 | 24 slots |

The example 400 of FIG. 4 shows an example in which the offset value is configured as X=0. In this case, the terminal may receive the CSI-RS 402 in the slot (corresponding to slot #0 406 in FIG. 4) having received DCI format 0_1 for triggering the aperiodic CSI reporting and report CSI information measured by the received CSI-RS to the base station through the PUSCH 405. The terminal may obtain scheduling information (information corresponding to each field of DCI format 0_1) for the PUSCH 405 for the CSI reporting from DCI format 0_1. For example, the terminal may obtain information on a slot for transmitting the PUSCH 405, based on the time domain resource allocation information for the PUSCH 405 from DCI format 0_1. In the example 400 of FIG. 4, the terminal may obtain 3 as a K2 value corresponding to a slot offset value for PDCCH-to-PUSCH, and accordingly, the PUSCH 405 may be transmitted at a time point at which the PDCCH 401 is received in slot #3 409 spaced apart from slot #0 406 by 3 slots.

In an example 410 of FIG. 4, the terminal may obtain DCI format 0_1 by monitoring a PDCCH 411 and obtain CSI request information and scheduling information for a PUSCH 415 therefrom. The terminal may obtain resource information for a CSI-RS 412 to be measured from the received CSI request indicator. The example 410 of FIG. 4 shows an example in which the offset value for the CSI-RS is configured as X=1. In this case, the terminal may receive the CSI-RS 412 in the slot (corresponding to slot #0 416 in FIG. 4) having received DCI format 0_1 for triggering the aperiodic CSI reporting and report CSI information measured by the received CSI-RS to the base station through the PUSCH 415.

The aperiodic CSI reporting may include at least one or all of CSI part 1 and CSI part 2, and in case that the aperiodic CSI reporting is transmitted through a PUSCH, the aperiodic CSI reporting may be multiplexed to a transport block. After CRC is inserted into an input bit of the aperiodic CSI for multiplexing, encoding and rate matching may be performed, and then mapping to resource elements within the PUSCH in a specific pattern may be performed for transmission. The CRC insertion may be omitted according to a coding method or the length of input bit. The number of modulation symbols, calculated for rate matching for multiplexing CSI Part 1 and CSI part 2 included in the aperiodic CSI reporting may be calculated as follows:

For CSI part 1 transmission on PUSCH not using repetition type B with UL-SCH, the number of coded modulation symbols per layer for CSI part 1 transmission, denoted as $Q_{CSI-part1}'$, is determined as follows:

[Equation 6]

$$Q'_{CSI-1} = \min\left\{\left\lceil\frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil, \left\lceil\alpha \cdot \sum_{l=0}^{N_{symb,all}^{PUSCH}-1} M_{sc}^{UCI}(l)\right\rceil - Q'_{ACK/CG-UCI}\right\}\cdots$$

For CSI part 1 transmission on an actual repetition of a PUSCH with repetition Type B with UL-SCH, the number of coded modulation symbols per layer for CSI part 1 transmission, denoted as $Q_{CSI\text{-}part1}'$, is determined as follows:
[Equation 7]

$$Q'_{CSI-1} = \min\left\{\left\lceil \frac{(O_{CSI-1} + L_{CSI-1}) \cdot \beta^{PUSCH}_{offset} \cdot \sum_{l=0}^{N^{PUSCH}_{symb,nominal}-1} M^{UCI}_{sc,nominal}(l)}{\sum_{r=0}^{C_{UL-SCH}-1} K_r} \right\rceil,\right.$$

$$\left\lceil \alpha \cdot \sum_{l=0}^{N^{PUSCH}_{symb,nominal}-1} M^{UCI}_{sc,nominal}(l) \right\rceil - Q'_{ACK/CG-UCI},$$

$$\left.\sum_{l=0}^{N^{PUSCH}_{symb,actual}-1} M^{UCI}_{sc,actual}(l) - Q'_{ACK/CG-UCI}\right\}$$

. . .

For CSI part 1 transmission on PUSCH without UL-SCH, the number of coded modulation symbols per layer for CSI part 1 transmission, denoted as $(Q_{CSI\text{-}part1}'$, is determined as follows:
if there is CSI part 2 to be transmitted on the PUSCH,
[Equation 8]

$$Q'_{CSI-1} = \min\left\{\left\lceil \frac{(O_{CSI-1} + L_{CSI-1}) \cdot \beta^{PUSCH}_{offset}}{R \cdot Q_m} \right\rceil, \sum_{l=0}^{N^{PUSCH}_{symb,all}-1} M^{UCI}_{sc}(l) - Q'_{ACK}\right\}$$

else $$Q'_{CSI-1} = \sum_{l=0}^{N^{PUSCH}_{symb,all}-1} M^{UCI}_{sc}(l) - Q'_{ACK}\cdots$$

For CSI part 2 transmission on PUSCH not using repetition type B with UL-SCH, the number of coded modulation symbols per layer for CSI part 2 transmission, denoted as $Q_{CSI\text{-}part2}'$, is determined as follows:
[Equation 9]

$$Q'_{CSI-2} = \min\left\{\left\lceil \frac{(O_{CSI-2} + L_{CSI-2}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil,\right.$$

$$\left.\left\lceil \alpha \cdot \sum_{l=0}^{N^{PUSCH}_{symb,all}-1} M^{USI}_{sc}(l) \right\rceil - Q'_{ACK/CG-UCI} - Q'_{CSI-1}\right\}$$

For CSI part 2 transmission on an actual repetition of a PUSCH with repetition Type B with UL-SCH, the number of coded modulation symbols per layer for CSI part 2 transmission, denoted as $Q_{CSI\text{-}part2}'$, is determined as follows:
[Equation 10]

$$Q'_{CSI-2} = \min\left\{\left\lceil \frac{(O_{CSI-2} + L_{CSI-2}) \cdot \beta^{PUSCH}_{offset} \cdot \sum_{l=0}^{N^{PUSCH}_{symb,nominal}-1} M^{UCI}_{sc,nominal}(l)}{\sum_{r=0}^{C_{UL-SCH}-1} K_r} \right\rceil,\right.$$

$$\left\lceil \alpha \cdot \sum_{l=0}^{N^{PUSCH}_{symb,nominal}-1} M^{UCI}_{sc,nominal}(l) \right\rceil - Q'_{ACK/CG-UCI} - Q'_{CSI-1},$$

$$\left.\sum_{l=0}^{N^{PUSCH}_{symb,actual}-1} M^{UCI}_{sc,actual}(l) - Q'_{ACK/CG-UCI} - Q'_{CSI-1}\right\}$$

. . .

For CSI part 2 transmission on PUSCH without UL-SCH, the number of coded modulation symbols per layer for CSI part 2 transmission, denoted as $Q_{CSI\text{-}part2}'$, is determined as follows:
[Equation 11]

$$Q'_{CSI-2} = \sum_{l=0}^{N^{PUSCH}_{symb,all}-1} M^{UCI}_{sc}(l) - Q'_{ACK} - Q'_{CSI-1}$$

Specifically, in the case of repeated PUSCH transmission types A and B, the terminal may multiplex the aperiodic CSI reporting only to the first repeated transmission among the repeated PUSCH transmissions, and transmit the same. This is because the multiplexed aperiodic CSI reporting information is encoded in a polar code scheme, and in this case, to perform multiplexing to several PUSCH repetitions, each PUSCH repetition needs to have the same frequency and time resource allocation, and respective actual repetitions may have different OFDM symbol lengths particularly in the case of PUSCH repetition type B, and thus the aperiodic CSI reporting may be multiplexed to only the first PUSCH repetition and transmitted.

In addition, for repeated PUSCH transmission type B, in case that the terminal schedules the aperiodic CSI reporting without scheduling for a transport block or receives DCI for activating the semi-persistent CSI reporting, a value of nominal repetition may be assumed as 1 even in case that the number of repeated PUSCH transmissions, configured via higher-layer signaling, is greater than 1. In addition, in case that the aperiodic or semi-persistent CSI reporting is scheduled or activated without scheduling for the transport block, based on repeated PUSCH transmission type B, the terminal may expect that the first nominal repetition is identical to the first actual repetition. For the PUSCH transmitted while including the semi-persistent CSI, based on repeated PUSCH transmission type B, without scheduling for DCI after the semi-persistent CSI reporting has been activated via the DCI, in case that the first nominal repetition is different from the first actual repetition, the transmission for the first nominal repetition may be ignored.

[PUCCH: UCI on PUSCH]

In NR communication system, in case that uplink control channel overlaps with uplink data channel and transmission time condition is satisfied, or uplink control information is indicated to be transmitted on uplink data channel via L1 signaling or higher-layer signaling, the uplink control information may be transmitted while being included in the uplink data channel. Here, three pieces of uplink control information, that is HARQ-ACK, CSI part 1, and CSI part 2 may be transmitted via the uplink data channel, and each piece of uplink control information may be mapped to PUSCH according to a predetermined multiplexing rule.

More specifically, in a first operation, in case that the number of bits of HARQ-ACK information required to be included in the PUSCH is 2 bits or less, the terminal may reserve an RE for transmitting HARQ-ACK in advance. Here, a method of determining a resource to be reserved is the same as that of a second operation. However, the number and position of the RE to be reserved is determined on the assumption that the number of bits of HARQ-ACK is 2. That is, in Equation 12 below, the calculation is performed based on that Qack=2. In the second operation, in case that the number of bits of HARQ-ACK information to be transmitted by the terminal is more than 2, the terminal may map HARQ-ACK from a first OFDM symbol excluding a DMRS after the first DMRS symbol. In a third operation, the terminal may map CSI part 1 to the PUSCH. Here, CSI part 1 may be mapped to the first OFDM symbol other than the DMRS and may not be mapped to the RE reserved in the first operation and the RE to which HARQ-ACK is mapped in the second operation.

In a fourth operation, the terminal may map CSI part 2 to the PUSCH. Here, CSI part 2 may be mapped to the first OFDM symbol other than the DMRS and may not be mapped to the RE in which CSI part 1 is located and the RE in which the HARQ-ACK mapped to the RE in the second operation is located. However, CSI part 2 may be mapped to the RE reserved in the first operation. In case that UL-SCH exists, the terminal may map the UL-SCH to the PUSCH. Here, UL-SCH may be mapped to the first OFDM symbol other than the DMRS and may not be mapped to the RE in which CSI part 1 is located, the RE in which the HARQ-ACK mapped to the RE in the second operation is located, and the RE in which CSI part 2 is located. However, UL-SCH may be mapped to the RE reserved in the first operation.

In a fifth operation, in case that the HARQ-ACK is smaller than 2 bits, the terminal may map the HARQ-ACK to the RE reserved in the first operation by puncturing. The actual number of the RE to which the HARQ-ACK is mapped is calculated based on the actual number of the HARQ-ACK. That is, the number of the reserved RE in Step 1 may be greater than the number of the RE to which the HARQ-ACK is actually mapped. The "puncturing" means that ACK is mapped to the RE instead of CSI part 2 or a UL-SCH even if, in the fourth operation, CSI part 2 or the UL-SCH is mapped earlier to the RE to which the HARZ-ACK is to be mapped. CSI part 1 is not mapped to the reserved RE and thus the puncturing by the HARQ-ACK is avoided. This is to ensure that CSI part 1 has higher priority and is decoded better than CSI part 2.

In case that the number of bits of uplink control information (or the number of modulated symbols) to be mapped to PUSCH is greater than the number of bits (or REs) which enable uplink control information mapping in the corresponding OFDM symbol to be mapped, the frequency axis RE interval d between modulated symbols of the uplink control information to be mapped may be configured so that d=1. In case that the number of bits of uplink control information (or the number of modulated symbols) to be mapped to PUSCH by the terminal is less than the number of bits (or REs) which enable uplink control information mapping in the corresponding OFDM symbol to be mapped, the frequency axis RE interval d between modulated symbols of the uplink control information to be mapped may be configured so that d=floor(# of available bits on 1-OFDM symbol/# of unmapped UCI bits at the beginning of 1-OFDM symbol).

Figure 5:
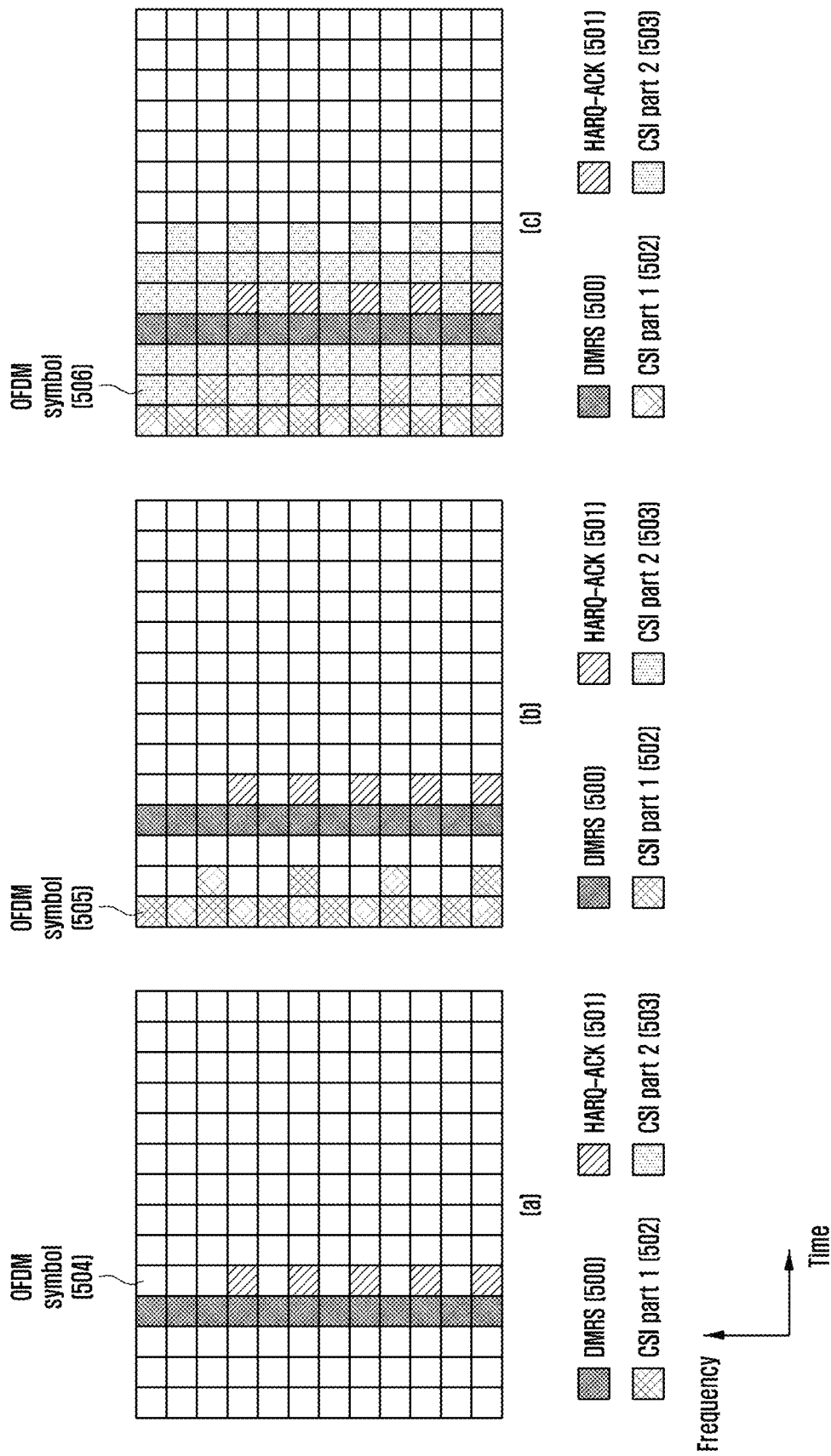
FIG. 5 illustrates examples of mapping uplink control information to a PUSCH according to an embodiment of the disclosure.

FIG. 5 illustrate an example of mapping uplink control information to a PUSCH. Referring to FIG. 5, it is assumed that the number of HARQ-ACK symbols to be mapped to a PUSCH is 5, and one resource block is configured or scheduled to the PUSCH. First, as shown in (a), the terminal may map an HARQ-ACK 501 with five symbols from a lowest RE index (or a highest RE index) of a first OFDM symbol 504 not including a DMRS after a first DMRS at RE intervals of d=floor(12/5)=2 on the frequency axis. Next, as shown in (b), the terminal may map CSI part 1 (502) from a first OFDM symbol 505 other than the DMRS. Lastly, as shown in (c), the terminal may map CSI part 2 (503) to an RE to which CSI part 1 and an HARQ-ACK are not mapped from a first OFDM symbol not including the DMRS.

Meanwhile, in case that an HARQ-ACK is transmitted via a PUSCH (or CG-PUSCH), the number of coded modulation symbols may be determined according to Equation 12 below.

$$Q'_{ACK} = \min\left\{ \left\lceil \frac{(O_{ACK} + L_{ACK}) \cdot \beta_{offset}^{PUSCH} \cdot \sum_{l=0}^{N_{symb,all}^{PUSCH}-1} M_{SC}^{UCI}(l)}{\sum_{r=0}^{C_{UL-SCH}-1} K_r} \right\rceil, \right.$$  [Equation 12]

-continued $$\left[\alpha \cdot \sum_{l=l_0}^{N_{symb,all}^{PUSCH}-1} M_{sc}^{UCI}(l)\right]\right\}$$

Here, e represents the number of bits of HARQ-ACK payload, and $L_{ACK}$ represents the number of bits of CRC. More specifically, $O_{ACK} \geq 360$, $L_{ACK}=11$. Otherwise, $360 > O_{ACK} \geq 20$, $L_{ACK}=11$, $20 > O_{ACK} \geq 12$, $L_{ACK}=6$, and $12 > O_{ACK}$, $L_{ACK}=0$. $K_r$ represents the size of an r-th code block of a UL-SCH, and $M_{sc}^{UCI}$ represents the number of subcarriers per OFDM symbol usable for UCI transmission in a PUSCH configured or scheduled to the base station. In addition, $\alpha$ and $\beta_{offset}^{PUSCH}$ are values configured to the base station and determined via higher-layer signaling or L1 signaling. More specifically, $\beta_{offset}^{PUSCH}$, that is, a value of beta_offset is a value defined to determine the number of resources in case that HARQ-ACK information is multiplexed together with other UCI information to be transmitted via a PUSCH (or CG-PUSCH). In case that fallback DCI (or DCI format 0_0) or non-fallback DCI (or DCI format 01) not including a beta_offset indicator field indicates PUSCH transmission and the terminal configures the beta_offset value configuration as "semi-static" via higher configuration, the terminal may have one beta_offset value configured via higher configuration. Here, the beta_offset has values such as those shown in Table 23, an index of corresponding value may be indicated via higher configuration, and each of index $I_{offset,0}^{HARQ-ACK}$, $I_{offset,1}^{HARQ-ACK}$, and $I_{offset,2}^{HARQ-ACK}$ may have beta_offset values corresponding to cases where the number of bits of HARQ-ACK information is 2 or less, greater than 2 and equal to or less than 11, and 11 or greater, respectively. Furthermore, the beta_offset values for CSI part 1 and CSI part 2 may be configured by using the same method. There is an effect of regulating a code rate of UCI compared to an effective code rate of a UL-SCH by the beta_offset value. That is, in case that the value of beta_offset is 2, the code rate of (index=1) UCI may be configured to be transmitted at a lower encoding rate by ½ than an effective code rate of the UL-SCH.

TABLE 23

| $I_{offset,0}^{HARQ-ACK}$ or $I_{offset,1}^{HARQ-ACK}$ or $I_{offset,2}^{HARQ-ACK}$ | $\beta_{offset}^{HARQ-ACK}$ |
|---|---|
| 0 | 1.000 |
| 1 | 2.000 |
| 2 | 2.500 |
| 3 | 3.125 |
| 4 | 4.000 |
| 5 | 5.000 |
| 6 | 6.250 |
| 7 | 8.000 |
| 8 | 10.000 |
| 9 | 12.625 |
| 10 | 15.875 |
| 11 | 20.000 |
| 12 | 31.000 |
| 13 | 50.000 |
| 14 | 80.000 |
| 15 | 126.000 |
| 16 | Reserved |
| 17 | Reserved |
| 18 | Reserved |
| 19 | Reserved |
| 20 | Reserved |

TABLE 23-continued

| $I_{offset,0}^{HARQ-ACK}$ or $I_{offset,1}^{HARQ-ACK}$ or $I_{offset,2}^{HARQ-ACK}$ | $\beta_{offset}^{HARQ-ACK}$ |
|---|---|
| 21 | Reserved |
| 22 | Reserved |
| 23 | Reserved |
| 24 | Reserved |
| 25 | Reserved |
| 26 | Reserved |
| 27 | Reserved |
| 28 | Reserved |
| 29 | Reserved |
| 30 | Reserved |
| 31 | Reserved |

In case that the base station schedules PUSCH transmission to the terminal by using non-fallback DCI (or DCI format 01) and the non-fallback DCI has a beta_offset indicator field, that is, the beta-offset value is configured as "dynamic" via higher configuration, the base station may configure to the terminal beta_offset values for four sets having $I_{offset,0}^{HARQ-ACK}$ or $I_{offset,1}^{HARQ-ACK}$ or $I_{offset,2}^{HARQ-ACK}$ for the HARQ-ACK as shown in Table 24, the terminal may indicate beta_offset values to be used for HARQ-ACK multiplexing by using the beta_offset indicator field, and each index may be determined according to the number of bits of HARQ-ACK information in the same way as the method described above. By using the same method, sets of and may be indicated.

TABLE 24

| beta_offset indicator | $(I_{offset,0}^{HARQ-ACK}$ or $I_{offset,1}^{HARQ-ACK}$ or $I_{offset,2}^{HARQ-ACK})$, $(I_{offset,0}^{CSI-1}$ or $I_{offset,0}^{CSI-2})$, $(I_{offset,1}^{CSI-1}$ or $I_{offset,1}^{CSI-2})$ |
|---|---|
| '00' | $1^{st}$ offset index provided by higher layers |
| '01' | $2^{nd}$ offset index provided by higher layers |
| '10' | $3^{rd}$ offset index provided by higher layers |
| '11' | $4^{th}$ offset index provided by higher layers |

For HARQ-ACK transmission on an actual repetition of a PUSCH with repetition Type B with UL-SCH, the number of coded modulation symbols per layer for HARQ-ACK transmission, denoted as $Q_{ACK}'$, is determined as follows:

[Equation 13]

$$Q_{ACK}' = \min\left\{\left\lceil\frac{(O_{ACK}+L_{ACK}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r}\right\rceil,\right.$$

$$\left\lceil\alpha \cdot \sum_{l=0}^{N_{symb,nominal}^{PUSCH}-1} M_{sc,nominal}^{UCI}(l)\right\rceil,$$

$$\left.\sum_{l=0}^{N_{symb,actual}^{PUSCH}-1} M_{sc,actual}^{UCI}(l)\right\}$$

Where:

$M_{sc,nominal}^{UCI}(l)$ is the number of resource elements that can be used for transmission of UCI in OFDM symbol l, for l=0, 1, 2, . . . , $N_{symb,nominal}^{PUSCH}-1$, in the PUSCH transmission assuming a nominal repetition without segmentation, and $N_{symb,nominal}^{PUSCH}$ is the total number of OFDM symbols in a nominal repetition of the PUSCH, including all OFDM symbols used for DMRS;

for any OFDM symbol that carries DMRS of the PUSCH assuming a nominal repetition without segmentation, $M_{sc,nominal}^{UCI}=0$;

for any OFDM symbol that does not carry DMRS of the PUSCH assuming a nominal repetition without segmentation, $M_{sc,nominal}^{UCI}(l) = M_{sc}^{PUSCH} - M_{sc,nominal}^{PT-RS}(l)$ where $M_{sc,nominal}^{PT-RS}$ is the number of subcarriers in OFDM symbol that carries PTRS, in the PUSCH transmission assuming a nominal repetition without segmentation;

$M_{sc,nominal}^{UCI}(l)$ is the number of resource elements that can be used for transmission of UCI in OFDM symbol l, for l=0, 1, 2, . . . , $N_{symb,actual}^{PUSCH}-1$, in the actual repetition of the PUSCH transmission, and $N_{symb,actual}^{PUSCH}$ is the total number of OFDM symbols in the actual repetition of the PUSCH transmission, including all OFDM symbols used for DMRS;

for any OFDM symbol that carries DMRS of the actual repetition of the PUSCH transmission, $M_{sc,actual}^{UCI}(l)=0$;

for any OFDM symbol that does not carry DMRS of the actual repetition of the PUSCH transmission, $M_{sc,actual}^{UCI}(l) = mM_{sc}^{PUSCH} - M_{sc,actual}^{PT-RS}(l)$ where $M_{sc,actual}^{PT-RS}(l)$ is the number of subcarriers in OFDM symbol that carries PTRS, in the actual repetition of the PUSCH transmission;

and all the other notations in the formula are defined the same as for PUSCH not using repetition type B.

Meanwhile, in case that an HARQ-ACK is transmitted via a PUSCH (or CG-PUSCH) and a UL-SCH does not exist, the number of coded modulation symbols may be determined according to Equation 14 below:

[Equation 14]

$$Q'_{ACK} = \min\left\{\left\lceil\frac{(O_{ACK}+L_{ACK})\cdot\beta_{offset}^{PUSCH}}{R\cdot Q_m}\right\rceil, \left\lceil\alpha\cdot\sum_{l=l_0}^{N_{symb,all}^{PUSCH}-1} M_{sc}^{UCI}(l)\right\rceil\right\}$$

In Equation 14, R is a value configured to the base station as a code rate of a PUSCH, and determined via higher-layer signaling or L1 signaling. In addition, Qm represents an order of modulation schemes of a PUSCH.

The number $E_{ACK}=N_L\cdot Q_{ACK}'\cdot Q_m$ of code word bits of ACK may be obtained based on mic determined in Equation 12 and Equation 13.

Figure 6:
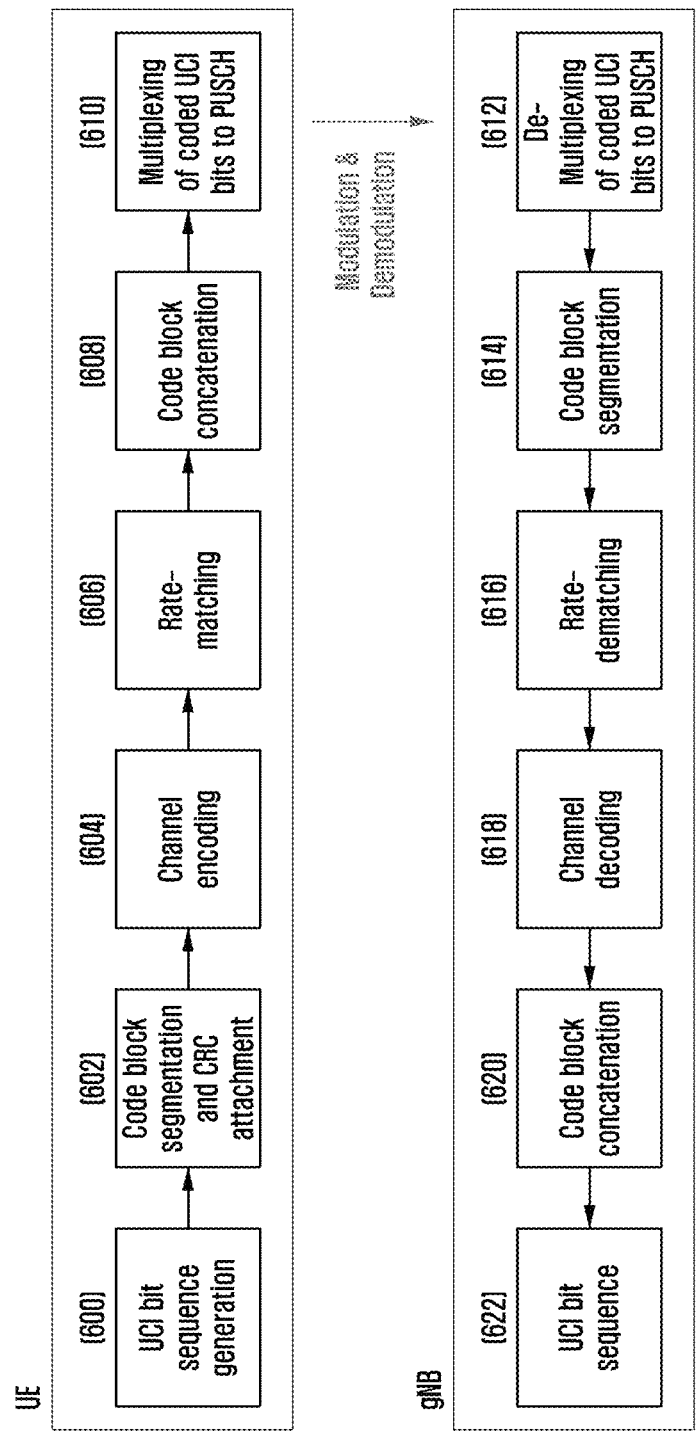
FIG. 6 is a diagram illustrating a processing procedure for transmitting or receiving UCI information between a terminal and a base station through a PUSCH according to an embodiment of the present disclosure.

FIG. 6 is a diagram illustrating a processing procedure for transmitting or receiving UCI information between a terminal and a base station through a PUSCH according to an embodiment of the present disclosure. The terminal produces UCI information in 600 according to the procedure in FIG. 6. In 602, the terminal decides the size of UCI information, and in case that the size is 11 bits or less, the terminal does not include CRC and in case that the size is larger than 12, the terminal additionally performs code block segmentation according to the size of the UCI information or includes CRC. In 604, the terminal performs channel coding of small block lengths in case that the size of the UCI information is 11 bits or less, and performs polar coding in case that the size is 12 bits or greater. In 606, the terminal performs rate matching according to Equation 6 to Equation 12 depending on the types of the UCI information and calculates the number of symbols of coded modulation. The terminal combines code blocks in 608 and multiplexes coded UCI bit information in the PUSCH.

After the terminal transmits a modulated PUSCH to the base station, the base station demodulates corresponding PUSCH and performs demultiplexing on the coded UCI bits in the PUSCH in 612. The base station segments the received information into units of code block in 614 and performs rate de-matching in 616. In 618, the base station performs decoding in a coded channel coding scheme according to the size of UCI information. The base station combines decoded code blocks and obtains UCI information in 620. UCI information is included in a PUSCH to be transmitted or received through a series of the operations described above.

The flowchart described in FIG. 6 is merely an example and it may be possible that at least one block from among 600 to 622 is omitted under certain conditions. In addition, other blocks other than 600 to 622 included in the flowchart shown in FIG. 6 may be also added and performed.

The rate matching of the disclosure may refer to a method in which, in case that there is a resource to which second control or second data information has been previously mapped, first control or first data information is mapped to a physical resource to which no information has ever mapped, excluding (or avoiding) the previously mapped resource. In the disclosure, the puncturing may refer to a method in which, even in case that there is a resource to which second control or second data information is previously mapped, first control or first data information is mapped to the resource to which second control or second data information has been previously mapped, and a physical resource to which no information has ever mapped. Therefore, in case that first control or first data information is actually mapped by puncturing to a resource to which second control or second data information has been previously mapped, the first control or first data information not the second control or second data information is transmitted or received via the resource.

Hereinafter, a procedure for multiplexing uplink data and control information will be described with reference to Procedure 1.

[Procedure 1]

Step 1:

In case that HARQ-ACK information to be transmitted to a PUSCH has a size of 0 or 1 or 2 bits, reservation resources for latent HARQ-ACK transmission are determined. The reservation resources are determined by a frequency-first scheme from a first symbol immediately after a symbol in which a first DMRS exists among resources to which a PUSCH has been allocated. The frequency-first scheme refers to a method of sequentially mapping frequency resources for each symbol and then moving to a next symbol to perform mapping. Here, an amount of reservation resources may be calculated on the assumption that HARQ-ACK information has a size of 2 bits; and It is determined whether coded bits for latent HARQ-ACK transmission are separated for each hop by using reservation resources according to the presence or absence of PUSCH hopping.

Step 2:
 In case that HARQ-ACK information to be transmitted to a PUSCH has a size larger than 2 bits, rate matching is performed. That is, the coded bits of HARQ-ACK information is mapped in the frequency-first scheme from a first symbol immediately after a symbol in which a first DMRS exists among resources to which a PUSCH has been allocated.

Step 2A:
 In case that there in CG-UCI information to be transmitted to a PUSCH, rate matching is performed. That is, the coded bits of CG-UCI information is mapped in the frequency-first scheme from a first symbol immediately after a symbol in which a first DMRS exists among resources to which a PUSCH has been allocated.

Step 3:
 In case that there is CSI part 1 information to be transmitted to a PUSCH, rate matching is performed. In the case of CSI part 1, mapping is performed in the frequency-first manner from the first symbol in resources to which a PUSCH has been allocated, immediately after excluding resources to which DMRS and HARQ-ACK reserved allocated in Step 1, Step 2, or Step 2A or HARQ-ACK or CG-UCI have been allocated. Thereafter, in the case of CSI part 2, mapping is performed in the frequency-first manner from a first symbol excluding resources to which DMRS and HARQ-ACK or CG-UCI or CSI part 1 allocated in Step 2 or 2A have been allocated, among resources to which a PUSCH has been allocated. CSI part 2 may be allocated to reserved RE allocated in Step 1.

Step 4:
 Data information (UL-SCH) rate matching is performed. UL-SCH performs frequency-first mapping to a resource allocated with PUSCH except the resource to which UCI information is mapped in Step 2 to Step 3. UL-SCH may be allocated to reserved RE allocated in Step 1.

Step 5:
 In case that HARQ-ACK information to be transmitted to a PUSCH has a size not larger than 2 bits, mapping is performed to the resource reserved in Step 1. Here, an amount of reservation resources is calculated on the assumption that HARQ-ACK information has a size of 2 bits, and thus actual mapped resource may be less than the number of reserved RE. In case that there is a UCI resource or UL-SCH already mapped to the resource in Step 2 to Step 4, the information is punctured and the HARQ-ACK information is mapped.

In the steps described above, in case that the number of bits of uplink control information (or the number of modulated symbols) to be mapped to a PUSCH has a size greater than the number of bits (or REs) which enable uplink control information mapping in the corresponding OFDM symbol to be mapped, the frequency axis RE interval d between modulated symbols of the uplink control information to be mapped may be configured so that d=1. In case that the number of bits of uplink control information (or the number of modulated symbols) to be mapped to PUSCH by the terminal has a size less than the number of bits (or REs) which enable uplink control information mapping in the corresponding OFDM symbol to be mapped, the frequency axis RE interval d between modulated symbols of the uplink control information to be mapped may be configured so that d=floor(# of available bits on 1-OFDM symbol/# of unmapped UCI bits at the beginning of 1-OFDM symbol).

Figure 7:
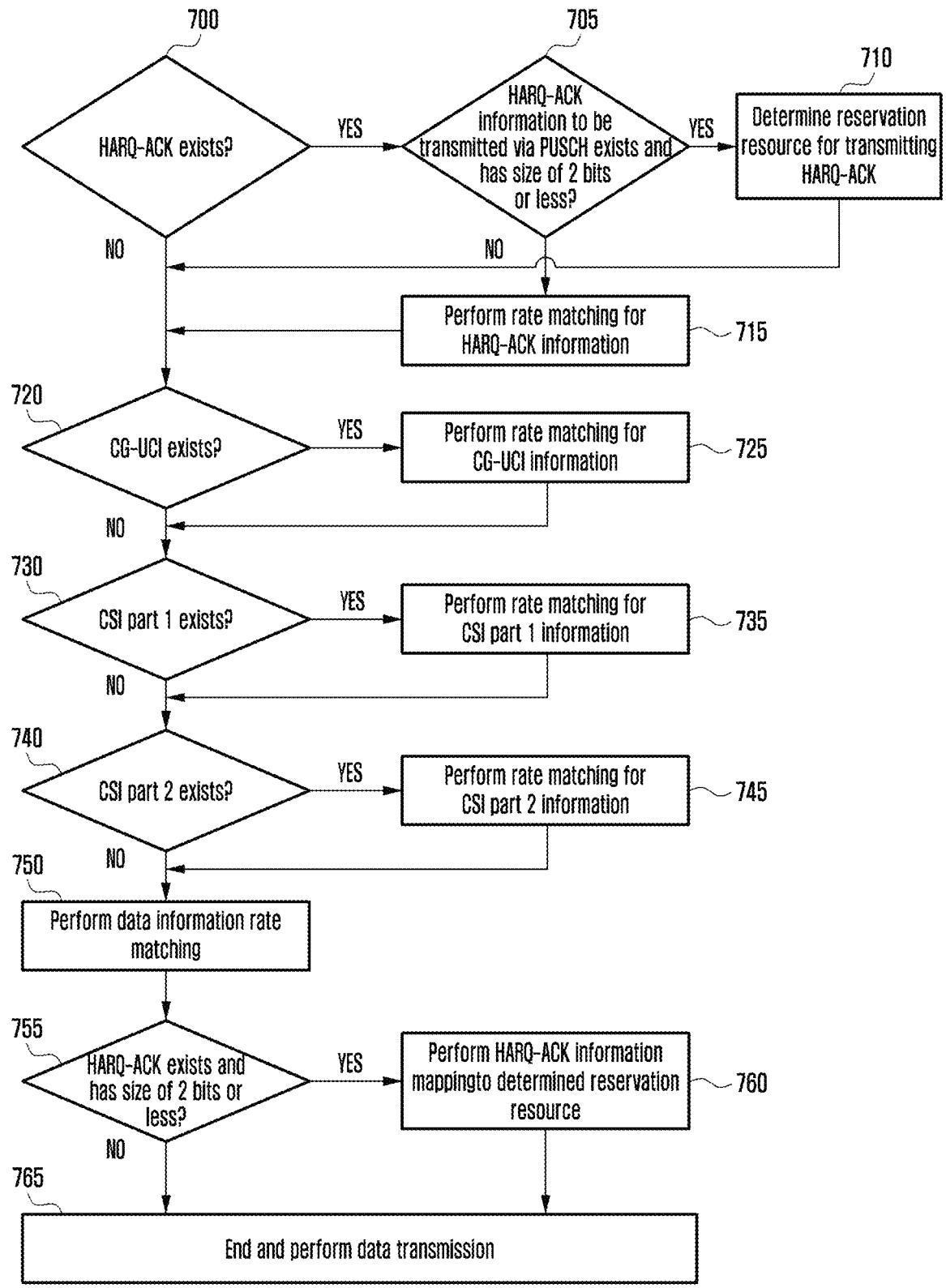
FIG. 7 is a diagram illustrating a method in which HP HARQ-ACK, LP HARQ-ACK, CSI part 1 are multiplexed to a PUSCH according to an embodiment of the present disclosure.

FIG. 7 is a flowchart illustrating a procedure in which uplink information and control information are multiplexed according to an embodiment of the present disclosure; The steps of Procedure 1 described above may be configured as a flowchart from the perspective of a terminal as shown in FIG. 7. Referring to FIG. 7, the terminal determines whether HARQ-ACK to be transmitted exists (700). In case that HARQ-ACK exists, the terminal determine whether HARQ-ACK information to be transmitted via a PUSCH exists and the information has a size of 2 bits or less (705). In case that HARQ-ACK information to be transmitted via a PUSCH exists and the information has a size of 2 bits or less, the terminal determines a reservation resource for HARQ-ACK transmission (710). In case that the result of the determination in operation 705 is no, the terminal performs rate matching for HARQ-ACK information (725). Thereafter, the terminal determines whether CG-UCI exists (702), and in case that CG-UCI exists, performs rate matching for CG-UCI (725). Thereafter, the terminal determines whether CSI part 1 exists (730), and in case that CSI part 1 exists, performs rate matching for CSI part 1 (735). Thereafter, the terminal determines whether CSI part 2 exists (740), and in case that CSI part 2 exists, performs rate matching for CSI part 2 (745). Thereafter, the terminal performs rate matching for data (750), and in case that HARQ-ACK exists and has a size of 2 bits or less, the terminal maps HARQ-ACK information to a determined reservation resource and, otherwise, performs data and uplink control information transmission (765).

FIG. 7 is merely an example for performing multiplexing uplink information and control information, a specific block diagram of FIG. 7 may be omitted or replaced with other block, and it is also possible to operate in a different configuration without limitation thereto.

In FIG. 7, the terminal determines whether HARQ-ACK exists and performs reservation resource determination or rate matching according thereto. Thereafter, the terminal determines whether CG-UCI exists, CSI part 1 exists, and CSI part 2 exists. The determination of existence is performed by the terminal based on information indicating that there is a PUCCH having at least one symbol overlapping a resource allocated with a PUSCH or information included DCI for scheduling a PUSCH includes specific UCI information. Thereafter, the terminal maps data resources and in case that HARQ-ACK has a size of 2 bits or less, maps control information to the pre-reserved resource.

Each operation of FIG. 7 is merely an example and each operation may be omitted or added and performed in a changed order.

[PUCCH/PUSCH: Priority Level]

A transmission method of a terminal according to priority information of PUCCH and PUSCH will be described below.

In case that one terminal concurrently supports eMBB and URLLC, eMbb data or control information may be transmitted via a PUSCH or PUCCH and URLLC data or control information may be transmitted via a PUSCH or PUCCH. Requirements for two services are different and generally URLLC service is prioritized over eMBB, and thus in case that at least one symbol among channels allocated with eMBB overlaps a channel allocated with URLLC, the terminal selects at least one of URLLC or eMBB channel to transmit. More specifically, the priority information may be indicated by higher-layer signaling or L1 signaling and priority information value may be 0 or 1. The PUCCH or PUSCH indicated by 0 may be considered for eMBB and the PUCCH or PUSCH indicated by 1 may be considered for URLLC.

As for a PUSCH, in case that there is a field capable of indicating priority information in DCI, the priority of the PUSCH may be determined by a value indicated by the field. Even in case that a PUSCH scheduled by DCI, in case that there is no field capable of indicating priority in DCI, the terminal considers that the PUSCH has a priority value of 0. The PUSCH is applicable for both cases of including and not including aperiodic CSI or semi-persistent CSI. In a case of a configured grant PUSCH periodically transmitted or received without DCI, the priority is determined by higher-layer signaling.

As for PUCCH, in case that the priority of a PUCCH for transmitting or receiving SR information and a PUCCH including HARQ-ACK information on SPS PDSCH may be determined by higher-layer signaling. In a case of a PUCCH including HARQ-ACK information on a PDSCH scheduled by DCI, in case that there is a priority field in the corresponding DCI, a priority value indicated by the corresponding field is applied, and in case that there is no corresponding field, the priority is considered to have a value of 0. Other PUCCHs having semi-persistent CSI or periodic CSI are always considered to have a priority value of 0.

In case that resources of a PUSCH or PUCCH indicated by a higher-layer signal or L1 signal such as DCI overlap each other and priority information of PUCCHs is different from that of PUSCHs in at least a portion thereof, the terminal may first resolve the overlapping between the PUCCH and PUSCH having a priority information value of 0. By way of example, a series of processes to include UCI information included in a PUCCH in a PUSCH may be included. Thereafter, assuming that a resource of PUCCH or PUSCH finally determined through a PUCCH or PUSCH overlapping and having a low priority refers to a second PUCCH or second PUSCH and a PUCCH or PUSCH having higher priority refers to a first PUCCH or first PUSCH, the terminal cancels the transmission of the second PUCCH and second PUSCH in case that the second PUCCH or second PUSCH overlap the first PUCCH or first PUSCH from the perspective of time resource. The terminal expects the transmission of the first PUCCH or first PUSCH to start at Tproc,2+d1 later, at least after the last symbol of PDCCH reception including DCI scheduling the transmission. Otherwise, the terminal considers the same as an error case. The value of Tproc,2+d1 may use a value suggested by Equation 2.

According to the description above, the PUCCH including HARQ-ACK information for a PDSCH including eMBB data has a low priority value of 0, and the PUCCH including HARQ-ACK information for a PDSCH including URLLC data has a high priority value of 1. Therefore, in case that a PUCCH having a priority value of 0 overlap a PUCCH having a priority value of 1 from the perspective of a time resource, the terminal will drop the PUCCH having the priority value of 0 and transmit the PUCCH having the priority value of 1. Therefore, from the perspective of the base station, HARQ-ACK information for a PDSCH including eMBB data has not been received, and thus it may not be known whether the terminal has received the eMBB data properly, so the base station has no alternative way but to retransmit. Accordingly, there is a possibility of deterioration of eMBB data transmission and reception efficiency.

For convenience of description, HARQ-ACK information for a PDSCH including eMBB data is referred to as low priority (LP) HARQ-ACK, and HARQ-ACK information for a PDSCH including URLLC data is referred to as high priority (HP) HARQ-ACK. Low priority (LP) HARQ-ACK may indicate HARQ-ACK information having a priority value of 0 and high priority (HP) HARQ-ACK may indicate HARQ-ACK information having a priority value of 1.

As an available method for preventing the deterioration of eMBB data transmission and reception efficiency, there is a method in which HP HARQ-ACK and LP HARQ-ACK are concurrently multiplexed in one PUCCH or PUSCH. Accordingly, in case that multiplexed in a PUCCH or PUSCH, HP HARQ-ACK and LP HARQ-ACK are possible to be multiplexed together with existing CSI part 1 and CSI part 2. In case that the base station or the terminal is capable of multiplexing a PUCCH or PUSCH by multiplexing only up to three pieces of UCI information, a method for dropping which information among four pieces of information and selecting the rest may be required for this purpose.

In an embodiment below, a method for multiplexing UCI information in a PUSCH in an environment where HP HARQ-ACK and LP HARQ-ACK exist will be described. In addition, even HP HARQ-ACK and LP HARQ-ACK are the same HARQ-ACK information, the HP HARQ-ACK and LP HARQ-ACK have different requirements and thus there may be necessity for HP HARQ-ACK to be transmitted more reliably than LP HARQ-ACK, and accordingly different encoding and rate matching methods may be applied. By way of example, in case that the number of coded modulation symbols for HP HARQ-ACK and LP HARQ-ACK is determined in Equation 9, different values may be applied for at least $\beta_{offset}^{PUSCH}$ or $\alpha$ value.

In addition, in case that HP HARQ-ACK and LP HARQ-ACK are multiplexed in one PUSCH, Equation 12 or 13 or 14 is adopted for HP HARQ-ACK while the number $Q'_{LP,ACK}$ of coded modulation symbols may be determined by Equation 15 in case that LP HARQ-ACK is transmitted to a PUSCH (or CG-PUSCH:

[Equation 15]
$$Q'_{LP\_ACK} = \min\left\{\left\lceil\frac{(O_{LP\_ACK}+L_{LP\_ACK})\cdot \beta_{offset}^{PUSCH}\cdot \sum_{l=0}^{N_{symb,all}^{PUSCH}-1} M_{sc}^{UCI}(l)}{\sum_{r=0}^{C_{UL-SCH}-1} K_r}\right\rceil, \left\lceil\alpha \cdot \sum_{l=l_0}^{N_{symb,all}^{PUSCH}-1} M_{sc}^{UCI}(l)\right\rceil - Q'_{ACK/CG-UCI}\right\}$$

For HARQ-ACK LP transmission on an actual repetition of a PUSCH with repetition Type B with UL-SCH, the number of coded modulation symbols per layer for HARQ-ACK LP transmission, denoted as GE is determined as follows:

$$Q'_{ACK} = \min\left\{\left\lceil\frac{(O_{LP\_ACK}+L_{LP\_ACK})\cdot \beta_{offset}^{PUSCH}\cdot \sum_{l=0}^{N_{symb,nominal}^{PUSCH}-1} M_{sc,nominal}^{UCI}(l)}{\sum_{r=0}^{C_{UL-SCH}-1} K_r}\right\rceil, \left\lceil\alpha\right.\right.$$

-continued $$\left. \begin{array}{l} \cdot \sum_{l=0}^{N_{symb,nominal}^{PUSCH}-1} M_{sc,nominal}^{UCI}(l) \right] - Q'_{ACK/CG-UCI}, \\ \\ \left. M_{sc,actual}^{UCI}(l) - Q'_{ACK/CG-UCI} \right\} \end{array} \right.$$

In addition, in case that there is CSI part 1 with no UL-SCH, the number $Q_{LP\_ACK}'$ of coded modulation symbols may be determined by Equation 16 below:

$$Q'_{LP\_ACK} = \min\left\{ \left\lceil \frac{(O_{LP\_ACK} + L_{LP\_ACK}) \cdot \beta_{offset}^{PUSCH}}{R \cdot Q_m} \right\rceil, \right.$$ [Equation 16]

$$\left. \left[ \alpha \sum_{l=l_0}^{N_{symb,all}^{PUSCH}-1} M_{sc}^{UCI}(l) \right] \right.$$

$$\left. - Q'_{ACK/CG-UCI} \right\}$$

In addition, in case that there is CSI part 1 with no UL-SCH, the number 9 of coded modulation symbols may be determined by Equation 17 below.

$$Q'_{LP\_ACK} = \sum_{l=l_0}^{N_{symb,all}^{PUSCH}-1} M_{sc}^{UCI}(l) - Q'_{ACK/CG-UCI}.$$ [Equation 17]

$Q_{ACK/CG-UCI}'$ is a value determined based on Equation 12 or Equation 13 or Equation 14 and means the number of coded modulation symbols per layer for HARQ_ACK or CG-UCI or HARQ_ACK/CG-UCI transmission.

Embodiment 1

According to the description above, in case that HP HARQ-ACK or LP HARQ-ACK is possible and these two pieces of UCI information are mapped to one PUSCH, CSI part 1 and CSI part 2 are indicated to be multiplexed in addition to HP HARQ-ACK and LP HARQ-ACK so as to be transmitted via one PUSCH. In case that at least one of the base station and the terminal is capable of processing only a PUSCH including three types of UCI, it is possible that UCI having a lowest priority is dropped and the rest three pieces are mapped to the PUSCH so as to be transmitted or received. By way of example, in case that the four types of UCI are multiplexed to one PUSCH, it may be possible that the terminal drops CSI part 2, and HP HARQ-ACK, LP HARQ-ACK, and CSI part 1 are mapped to the PUSCH.

Figure 8:
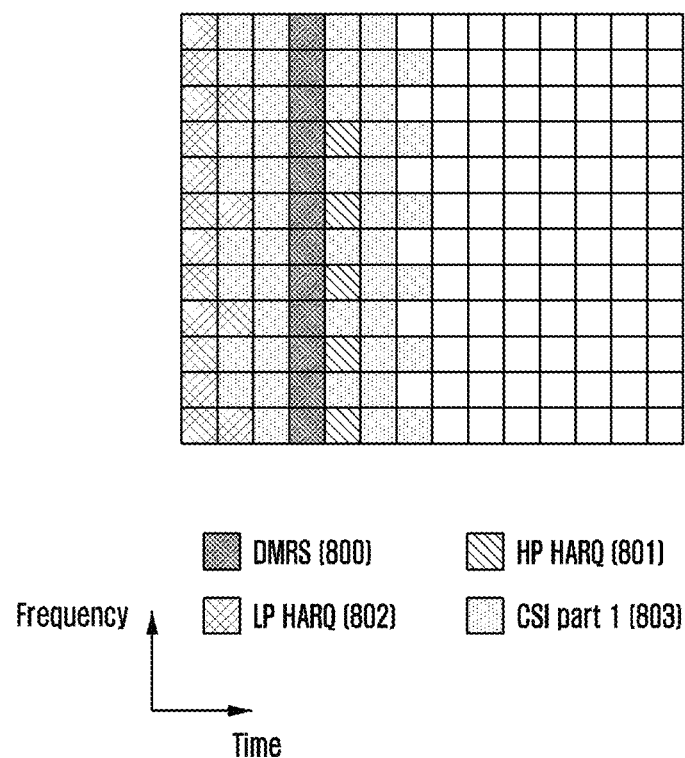
FIG. 8 is a diagram illustrating a method in which HP HARQ-ACK, LP HARQ-ACK, an CSI part 1 are multiplexed to a PUSCH according to an embodiment of the present disclosure.

FIG. 8 is a diagram illustrating a method in which HP HARQ-ACK, LP HARQ-ACK, and CSI part 1 are multiplexed to a PUSCH according to an embodiment of the present disclosure. In FIG. 8, for HP HARQ-ACK 801, corresponding coded information bits thereof are mapped, by the terminal in a frequency-first manner, to resources to which a PUSCH has been allocated from a symbol immediately after a symbol in which DMRS exists. In addition, in case that HP HARQ-ACK has a size of 2 bits or less, HP HARQ-ACK information is coded and reserved to a reserved resource so as to be mapped. In FIG. 8, LP HARQ-ACK 802 is mapped in a frequency-first manner from a first symbol excluding resources to which DMRS and HP HARQ-ACK information are coded and an allocated resource is mapped among resources to which a PUSCH has been allocated. CSI part 1 (803) is mapped in a frequency-first manner from a first symbol excluding resources in which DMRS, HP HARQ-ACK, and LP HARQ-ACK information are coded and allocated among resources to which a PUSCH has been allocated.

For another example, a procedure in which UCI information of HP HARQ-ACK, LP HARQ-ACK, CSI part 1, and CSI part 2 is multiplexed to a PUSCH will be described in Procedure 2.

[Procedure 2]

Step 1:

In case that HP HARQ-ACK information to be transmitted to a PUSCH exists and the HP HARQ-ACK information has a size of 2 bits or less, reservation resources for latent HP HARQ-ACK transmission are determined (by the terminal). The reservation resources are determined by a frequency-first scheme from a first symbol immediately after a symbol in which a first DMRS exists among resources to which a PUSCH has been allocated. The frequency-first scheme refers to a method of sequentially mapping frequency resources for each symbol and then moving to a next symbol to perform mapping. Here, an amount of reservation resources may be calculated on the assumption that HP HARQ-ACK information has a size of 2 bits; and It is determined whether coded bits for latent HP HARQ-ACK transmission are separated for each hop by using reservation resources according to the presence or absence of PUSCH hopping.

Step 1A:

In case that there is no HP HARQ-ACK information to be transmitted to a PUSCH and only LP HARQ-ACK information exists, in case that the LP HARQ-ACK information has a size of 2 bits or less, reservation resources for latent LP HARQ-ACK transmission are determined (by the terminal). The reservation resources are determined by a frequency-first scheme from a first symbol immediately after a symbol in which a first DMRS exists among resources to which a PUSCH has been allocated. The frequency-first scheme refers to a method of sequentially mapping frequency resources for each symbol and then moving to a next symbol to perform mapping. Here, an amount of reservation resources may be calculated on the assumption that LP HARQ-ACK information is 2 bits; and It is determined whether coded bits for latent LP HARQ-ACK transmission are separated for each hop by using reservation resources according to the presence or absence of PUSCH hopping.

Step 2:

In case that there is HP HARQ-ACK information to be transmitted to a PUSCH and the HP HARQ-ACK information has a size larger than 2 bits, rate matching is performed (by the terminal). That is, the coded bits of HP HARQ-ACK information are mapped in the frequency-first scheme from a first symbol immediately after a symbol in which a first DMRS exists among resources to which a PUSCH has been allocated.

Step 2A:
  In case that there is no HP HARQ-ACK information to be transmitted to a PUSCH and only LP HARQ-ACK exists, in case that the LP HARQ-ACK information has a size larger than 2 bits, rate matching is performed (by the terminal). That is, the coded bits of LP HARQ-ACK information are mapped from a first symbol immediately after a symbol in which a first DMRS exists among resources allocated with PUSCH in a frequency-first scheme.
Step 3:
  In case that there are HP HARQ-ACK information and LP HARQ-ACK information to be transmitted to a PUSCH, rate matching is performed (by the terminal) for the LP HARQ-ACK. That is, coded bits of LP HARQ-ACK information are mapped in the frequency-first scheme from a first symbol excluding resources to which DMRS or HP HARQ-ACK information-coded bits have been allocated among resources to which a PUSCH has been allocated.
Step 4:
  In case that there is CSI part information to be transmitted to a PUSCH, rate matching is performed (by the terminal). CSI part 1 is mapped in the frequency-first manner from a first symbol immediately after excluding resources to which DMRS and HP HARQ-ACK information allocated in the previous steps have been allocated, among resources to which a PUSCH has been allocated;
  CSI part 2 is mapped in the frequency-first manner from a first symbol excluding resources to which DMRS and HP HARQ-ACK or CG-UCI or CSI part 1 allocated in the previous steps have been allocated, among resources to which a PUSCH has been allocated; and
  CSI part 2 may be always mapped regardless of the presence or absence of HP HARQ-ACK or LP HARQ-ACK or may or may not be mapped according to base station configuration. For example, in case that both HP HARQ-ACK and LP HARQ-ACK are multiplexed to a corresponding PUSCH, the terminal may or may not perform CSI part 2 mapping according to a higher-layer signal configuration value indicated to the base station.
Step 5:
  Data information (UL-SCH) rate matching is performed. UL-SCH is mapped in the frequency-first manner to a resource to which a PUSCH has been allocated excluding resources to which UCI information mapped in the previous steps is mapped.
Step 6:
  In case that HP HARQ-ACK information to be transmitted to a PUSCH has a size not larger than 2 bits, mapping is performed to the resource reserved in Step 1. In case that there is a UCI resource or UL-SCH already mapped to the resource in the previous steps, the information is punctured and the HP HARQ-ACK information is mapped.
Step 6A:
  In case that LP HARQ-ACK information to be transmitted to a PUSCH has a size not larger than 2 bits and HP HARQ-ACK information is not multiplexed, mapping is performed (by the terminal) to the resource reserved in Step 1A. In case that there is a UCI resource or UL-SCH already mapped to the resource in the previous steps, the information is punctured and the LP HARQ-ACK information is mapped.
  In the steps described above, in case that the number of bits of uplink control information (or the number of modulated symbols) to be mapped to a PUSCH is greater than the number of bits (or REs) which enable uplink control information mapping in the corresponding OFDM symbol to be mapped, the frequency axis RE interval d between modulated symbols of the uplink control information to be mapped may be configured so that d=1. In case that the number of bits of uplink control information (or the number of modulated symbols) to be mapped to a PUSCH has a size less than the number of bits (or REs) which enable uplink control information mapping in the corresponding OFDM symbol to be mapped, the frequency axis RE interval d between modulated symbols of the uplink control information to be mapped may be configured so that d=floor(# of available bits on 1-OFDM symbol/# of unmapped UCI bits at the beginning of 1-OFDM symbol).

For another example, a procedure in which UCI information of HP HARQ-ACK, LP HARQ-ACK, CSI part 1, and CSI part 2 is multiplexed to a PUSCH will be described in Procedure 3. Procedure 2 supports the operation of reserving a certain resource regardless of the mapping of UL-SCH (data) information or UCI information different according to the size of HARQ-ACK information, whereas, according to Procedure 3, an operation of rate matching may be always possible under an environment where HP HARQ-ACK and LP HARQ-ACK may be multiplexed.

[Procedure 3]
Step 1:
  In case that there is HP HARQ-ACK information to be transmitted to a PUSCH, rate matching is performed. That is, the coded bits of HP HARQ-ACK information are mapped in the frequency-first scheme from a first symbol immediately after a symbol in which a first DMRS exists among resources to which a PUSCH has been allocated.
Step 2:
  In case that there is only LP HARQ-ACK with no HP HARQ-ACK information to be transmitted to a PUSCH, rate matching is performed. That is, the coded bits of LP HARQ-ACK information are mapped from a first symbol immediately after a symbol in which a first DMRS exists among resources allocated with PUSCH in a frequency-first scheme.
Step 2A:
  In case that there are HP HARQ-ACK information and LP HARQ-ACK information to be transmitted to a PUSCH, rate matching is performed for the LP HARQ-ACK. That is, coded bits of LP HARQ-ACK information are mapped in the frequency-first scheme from a first symbol excluding resources to which DMRS or HP HARQ-ACK information-coded bits have been allocated among resources to which a PUSCH has been allocated.
Step 3:
  In case that there is CSI part information to be transmitted to a PUSCH, rate matching is performed. CSI part 1 is mapped in the frequency-first manner from a first symbol immediately after excluding resources to which DMRS and HP HARQ-ACK information allocated in the previous steps have been allocated, among resources to which a PUSCH has been allocated;
  CSI part 2 is mapped in the frequency-first manner from a first symbol excluding resources to which DMRS and HP HARQ-ACK or CG-UCI or CSI part 1 allocated in the previous steps have been allocated, among resources to which a PUSCH has been allocated; and
  CSI part 2 may be always mapped regardless of the presence or absence of HP HARQ-ACK or LP HARQ- ACK or may or may not be mapped according to base station configuration. For example, in case that both HP HARQ-ACK and LP HARQ-ACK are multiplexed to a corresponding PUSCH, the terminal may or may not perform CSI part 2 mapping according to a higher-layer signal configuration value indicated to the base station.

Step 4:
  Data information (UL-SCH) rate matching is performed. UL-SCH is mapped in the frequency-first manner to a resource to which a PUSCH has been allocated excluding resources to which UCI information mapped in the previous steps is mapped.

In the steps described above, in case that the number of bits of uplink control information (or the number of modulated symbols) to be mapped to a PUSCH is greater than the number of bits (or REs) which enable uplink control information mapping in the corresponding OFDM symbol to be mapped, the frequency axis RE interval d between modulated symbols of the uplink control information to be mapped may be configured so that d=1. In case that the number of bits of uplink control information (or the number of modulated symbols) to be mapped to a PUSCH by the terminal has a size less than the number of bits (or REs) which enable uplink control information mapping in the corresponding OFDM symbol to be mapped, the frequency axis RE interval d between modulated symbols of the uplink control information to be mapped may be configured so that d=floor(# of available bits on 1-OFDM symbol/# of unmapped UCI bits at the beginning of 1-OFDM symbol).

For another example, a procedure in which UCI information of HP HARQ-ACK, LP HARQ-ACK, CSI part 1, and CSI part 2 is multiplexed to a PUSCH will be described in Procedure 4. In Procedure 4, a procedure of reserving a resource in consideration of only the size of HP HARQ-ACK information may be considered.

[Procedure 4]
Step 1:
  In case that HP HARQ-ACK information to be transmitted to a PUSCH exists and the HP HARQ-ACK information has a size of 2 bits or less, reservation resources for latent HP HARQ-ACK transmission are determined. The reservation resources are determined by a frequency-first scheme from a first symbol immediately after a symbol in which a first DMRS exists among resources to which a PUSCH has been allocated. The frequency-first scheme refers to a method of sequentially mapping frequency resources for each symbol and then moving to a next symbol to perform mapping. Here, an amount of reservation resources may be calculated on the assumption that HARQ-ACK information has a size of 2 bits; and
  It is determined whether coded bits for latent HP HARQ-ACK transmission are separated for each hop by using reservation resources according to the presence or absence of PUSCH hopping.

Step 2:
  In case that there is HP HARQ-ACK information to be transmitted to a PUSCH and the HP HARQ-ACK information has a size larger than 2 bits, rate matching is performed. That is, the coded bits of HP HARQ-ACK information are mapped in the frequency-first scheme from a first symbol immediately after a symbol in which a first DMRS exists among resources to which a PUSCH has been allocated.

Step 2A:
  In case that there is no HP HARQ-ACK information to be transmitted to a PUSCH and only LP HARQ-ACK exists, rate matching is performed for the LP HARQ-ACK information. That is, the coded bits of LP HARQ-ACK information are mapped in the frequency-first scheme from a first symbol immediately after a symbol in which a first DMRS exists among resources allocated with PUSCH.

Step 3:
  In case that there are HP HARQ-ACK information and LP HARQ-ACK information to be transmitted to a PUSCH, rate matching is performed for the LP HARQ-ACK. That is, coded bits of LP HARQ-ACK information are mapped in the frequency-first scheme from a first symbol excluding resources to which DMRS or HP HARQ-ACK information-coded bits have been allocated among resources to which a PUSCH has been allocated.

Step 4:
  In case that there is CSI part information to be transmitted to a PUSCH, rate matching is performed. CSI part 1 is mapped in the frequency-first manner from a first symbol immediately after excluding resources to which DMRS and HP HARQ-ACK information allocated in the previous steps have been allocated, among resources to which a PUSCH has been allocated;
  CSI part 2 is mapped in the frequency-first manner from a first symbol excluding resources to which DMRS and HP HARQ-ACK or CG-UCI or CSI part 1 allocated in Step 2 or 2A have been allocated, among resources to which a PUSCH has been allocated; and
  CSI part 2 may be always mapped regardless of the presence or absence of HP HARQ-ACK or LP HARQ-ACK, or may or may not be mapped according to base station configuration. For example, in case that both HP HARQ-ACK and LP HARQ-ACK are multiplexed to a corresponding PUSCH, the terminal may or may not perform CSI part 2 mapping according to a higher-layer signal configuration value indicated to the base station.

Step 5:
  Data information (UL-SCH) rate matching is performed. UL-SCH is mapped in the frequency-first manner to a resource to which a PUSCH has been allocated excluding resources to which UCI information mapped in the previous steps is mapped.

Step 6:
  In case that HP HARQ-ACK information to be transmitted to a PUSCH has a size not larger than 2 bits, mapping is performed to the resource reserved in Step 1. In case that there is a UCI resource or UL-SCH already mapped to the resource in the previous steps, the information is punctured and the HP HARQ-ACK information is mapped.

In the steps described above, in case that the number of bits of uplink control information (or the number of modulated symbols) to be mapped to a PUSCH is greater than the number of bits (or REs) which enable uplink control information mapping in the corresponding OFDM symbol to be mapped, the frequency axis RE interval d between modulated symbols of the uplink control information to be mapped may be configured so that d=1. In case that the number of bits of uplink control information (or the number of modulated symbols) to be mapped to a PUSCH by the terminal has a size less than the number of bits (or REs) which enable uplink control information mapping in the corresponding OFDM symbol to be mapped, the frequency axis RE interval d between modulated symbols of the uplink control information to be mapped may be configured so that d=floor(# of available bits on 1-OFDM symbol/# of unmapped UCI bits at the beginning of 1-OFDM symbol).

For another example, a procedure in which UCI information of HP HARQ-ACK, LP HARQ-ACK, CSI part 1, and CSI part 2 is multiplexed to a PUSCH will be described in Procedure 5. In Procedure 5, a procedure of reserving a resource in consideration of only the size of LP HARQ-ACK information is considered.

[Procedure 5]

Step 1:
In case that there is no HP HARQ-ACK information to be transmitted to a PUSCH and only LP HARQ-ACK information exist, and the LP HARQ-ACK information has a size of 2 bits or less, reservation resources for latent LP HARQ-ACK transmission are determined. The reservation resources are determined by a frequency-first scheme from a first symbol immediately after a symbol in which a first DMRS exists among resources to which a PUSCH has been allocated. The frequency-first scheme refers to a method of sequentially mapping frequency resources for each symbol and then moving to a next symbol to perform mapping. Here, an amount of reservation resources may be calculated on the assumption that HARQ-ACK information has a size of 2 bits; and It is determined whether coded bits for latent LP HARQ-ACK transmission are separated for each hop by using reservation resources according to the presence or absence of PUSCH hopping.

Step 2:
In case that there is HP HARQ-ACK information to be transmitted to a PUSCH, rate matching is performed for the HP HARQ-ACK information. That is, the coded bits of HP HARQ-ACK information are mapped in the frequency-first scheme from a first symbol immediately after a symbol in which a first DMRS exists among resources to which a PUSCH has been allocated.

Step 2A:
In case that there is no HP HARQ-ACK information to be transmitted to a PUSCH and only LP HARQ-ACK exists, and the LP HARQ-ACK information has a size larger than 2 bits, rate matching is performed. That is, the coded bits of LP HARQ-ACK information are mapped in the frequency-first scheme from a first symbol immediately after a symbol in which a first DMRS exists among resources allocated with PUSCH.

Step 3:
In case that there are HP HARQ-ACK information and LP HARQ-ACK information to be transmitted to a PUSCH, and the LP HARQ-ACK information has a size of 2 bits or less, reservation resources for latent LP HARQ-ACK transmission are determined. The reservation resources are determined by the frequency-first scheme from a first symbol to which a PUSCH has been allocated excluding resources to which DMRS information-coded bits have been allocated. The frequency-first scheme refers to a method of sequentially mapping frequency resources for each symbol and then moving to a next symbol to perform mapping; and It is determined whether coded bits for latent HARQ-ACK transmission are separated for each hop by using reservation resources according to the presence or absence of PUSCH hopping.

Step 3A:
In case that there are HP HARQ-ACK information and LP HARQ-ACK information to be transmitted to a PUSCH, and the LP HARQ-ACK information has a size larger than 2 bits, rate matching is performed for the LP HARQ-ACK. That is, coded bits of LP HARQ-ACK information are mapped in the frequency-first scheme from a first symbol excluding resources to which DMRS or HP HARQ-ACK information-coded bits have been allocated among resources to which a PUSCH has been allocated.

Step 4:
In case that there is CSI part information to be transmitted to a PUSCH, rate matching is performed. CSI part 1 is mapped in the frequency-first manner from a first symbol immediately after excluding resources to which DMRS and HARQ-ACK information allocated in the previous steps have been allocated, among resources to which a PUSCH has been allocated;

CSI part 2 is mapped in the frequency-first manner from a first symbol excluding resources to which DMRS and HARQ-ACK or CG-UCI or CSI part 1 allocated in the previous steps have been allocated, among resources to which a PUSCH has been allocated; and CSI part 2 may be always mapped regardless of the presence or absence of HP HARQ-ACK or LP HARQ-ACK or may or may not be mapped according to base station configuration. For example, in case that both HP HARQ-ACK and LP HARQ-ACK are multiplexed to a corresponding PUSCH, the terminal may or may not perform CSI part 2 mapping according to a higher-layer signal configuration value indicated to the base station.

Step 5:
Data information (UL-SCH) rate matching is performed. UL-SCH is mapped in the frequency-first manner to a resource to which a PUSCH has been allocated excluding resources to which UCI information mapped in the previous steps is mapped.

Step 6:
In case that LP HARQ-ACK information to be transmitted to a PUSCH has a size not larger than 2 bits and HP HARQ-ACK information is not multiplexed, mapping is performed to the resource reserved in Step 1. In case that there is a UCI resource or UL-SCH already mapped to the resource in Step 2 to Step 4, the information is punctured and the LP HARQ-ACK information is mapped.

Step 6A:
In case that LP HARQ-ACK information to be transmitted to a PUSCH has a size not larger than 2 bits and HP HARQ-ACK information is multiplexed, mapping is performed to the resource reserved in Step 3. In case that there is a UCI resource or UL-SCH already mapped to the resource in the previous steps, the information is punctured and the LP HARQ-ACK information is mapped.

In the steps described above, in case that the number of bits of uplink control information (or the number of modulated symbols) to be mapped to a PUSCH is greater than the number of bits (or REs) which enable uplink control information mapping in the corresponding OFDM symbol to be mapped, the frequency axis RE interval d between modulated symbols of the uplink control information to be mapped may be configured so that d=1. In case that the number of bits of uplink control information (or the number of modulated symbols) to be mapped to a PUSCH by the terminal has a size less than the number of bits (or REs) which enable uplink control information mapping in the corresponding OFDM symbol to be mapped, the frequency axis RE interval d between modulated symbols of the uplink control information to be mapped may be configured so that d=floor(# of available bits on 1-OFDM symbol/# of unmapped UCI bits at the beginning of 1-OFDM symbol).

Figure 9:
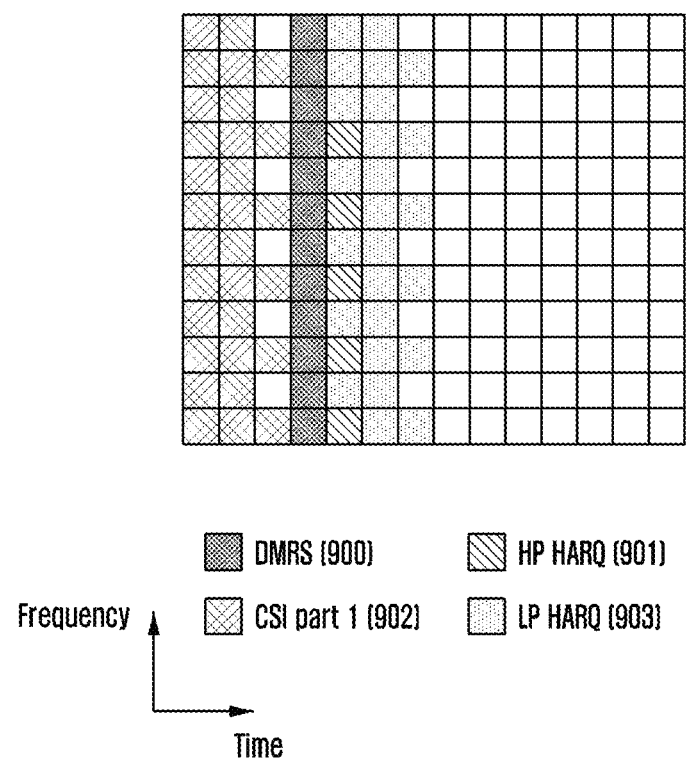
FIG. 9 is a diagram illustrating a method in which HP HARQ-ACK, LP HARQ-ACK, CSI part 1 are multiplexed to a PUSCH according to an embodiment of the present disclosure.

For another example, as shown in FIG. 9, it is possible to map LP HARQ-ACK after HP HARQ-ACK. FIG. 9 is a diagram illustrating a method in which HP HARQ-ACK, LP HARQ-ACK, and CSI part 1 are multiplexed to a PUSCH according to an embodiment of the disclosure. In FIG. 8, LP HARQ-ACK supports different mapping methods according to the presence or absence of HP HARQ-ACK, whereas in FIG. 9, LP HARQ-ACK supports to be mapped like HARQ-ACK information regardless of the presence or absence of HP HARQ-ACK. For another example, a procedure in which UCI information of HP HARQ-ACK, LP HARQ-ACK, CSI part 1, and CSI part 2 is multiplexed to a PUSCH will be described in Procedure 6. Specifically, it is considered whether to execute reservation resources according to the total size of HP HARQ-ACK information and LP HARQ-ACK information in Procedure 6. That is, whether or not to match or puncture is determined according to the total size of HP HARQ-ACK+LP HARQ-ACK information.

[Procedure 6]

Figure 10:
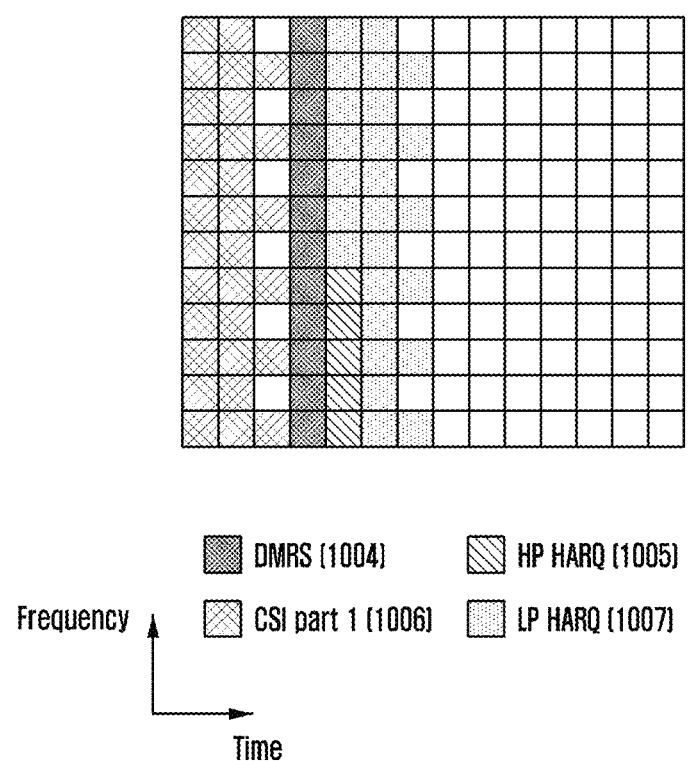
FIG. 10 is a diagram illustrating a method in which HP HARQ-ACK, LP HARQ-ACK, CSI part 1 are multiplexed to a PUSCH according to an embodiment of the present disclosure.

Step 1:
- In case that there is at least one piece of HP HARQ-ACK information of LP HARQ-ACK to be transmitted to a PUSCH, and the total information of the HP HARQ-ACK and the LP HARQ-ACK has a size of 2 bits or less, reservation resources for latent HP HARQ-ACK or LP HARQ-ACK transmission are sequentially determined. The reservation resources are determined by a frequency-first scheme from a first symbol immediately after a symbol in which a first DMRS exists among resources to which a PUSCH has been allocated. The frequency-first scheme refers to a method of sequentially mapping frequency resources for each symbol and then moving to a next symbol to perform mapping. Here, an amount of reservation resources may be calculated on the assumption that the total information of the HP HARQ-ACK and LP HARQ-ACK has a size of 2 bits;
- Resources for HP HARQ-ACK are determined and the resources for LP HARQ-ACK are determined; and
- A first embodiment and a second embodiment of a method for determining the resources are as follows:
- As specified in FIG. 8 as the first embodiment, in the case of the amount of resources, the resources for HP HARQ-ACK are determined based on the HP HARQ-ACK rate matching size, and LP HARQ-ACK is mapped, based on the LP HARQ-ACK rate matching size, from a first resource immediately after a symbol in which DMRS is exists excluding resources to which HP HARQ-ACK is mapped,
- FIG. 10 is a diagram illustrating a method in which HP HARQ-ACK, LP HARQ-ACK, and CSI part 1 are multiplexed to a PUSCH according to an embodiment of the disclosure. As shown in FIG. 10 as the second embodiment, the amount of resources is determined as the sum of an HP HARQ-ACK resource amount and an LP HARQ-ACK resource amount to which HP HARQ-ACK and LP HARQ-ACK are mapped, and reserved REs for HP HARQ-ACK and LP HARQ-ACK are determined by the same method as that of determining reserved RE for HARQ-ACK described in Procedure 1. As for the determined reserved REs, reserved REs for HP HARQ-ACK are sequentially determined for each symbol with respect to frequency resources and then reserved REs for LP HARQ-ACK are sequentially determined for each symbol with respect to frequency resources; and
- It is determined whether coded bits for latent HP HARQ-ACK transmission or LP HARQ-ACK transmission are separated for each hop by using reservation resources according to the presence or absence of PUSCH hopping.

Step 2:
- In case that there is at least HP HARQ-ACK information or LP HARQ-ACK information to be transmitted to a PUSCH and the total information of HP HARQ-ACK and LP HARQ-ACK has a size larger than 2 bits, rate matching is performed; and
- A first embodiment and a second embodiment for performing the rate matching are as follows.
- As shown in FIG. 8 as the first embodiment, in case that HP HARQ-ACK information exists, the coded bits of HP HARQ-ACK information are mapped in the frequency-first scheme from a first symbol immediately after a symbol in which a first DMRS exists among resources to which a PUSCH has been allocated. In case that LP HARQ-ACK information exists, rate matching is performed for the LP HARQ-ACK. That is, coded bits of LP HARQ-ACK information are mapped in the frequency-first scheme from a first symbol immediately after a symbol in which a first DMRS exists excluding resources to which DMRS or HP HARQ-ACK information-coded bits have been allocated among resources to which a PUSCH has been allocated,
- As shown in FIG. 10 as the second embodiment, the amount of resources to which HP HARQ-ACK and LP HARQ-ACK are mapped is determined as the sum of an HP HARQ-ACK resource amount and an LP HARQ-ACK resource amount, and reserved REs to which HP HARQ-ACK and LP HARQ-ACK are mapped determined by the same method as that of determining reserved REs to which HARQ-ACK is mapped described in Procedure 1 based on the determined amount of resources. HP HARQ-ACK and LP HARQ-ACK are sequentially mapped to the determined HP HARQ-ACK and LP HARQ-ACK REs for each symbol with respect to frequency resources.

Step 3:
- In case that there is CSI part information to be transmitted to a PUSCH, rate matching is performed. CSI part 1 is mapped in the frequency-first manner from a first symbol immediately after excluding resources to which DMRS and HP HARQ-ACK information allocated in the previous steps have been allocated, among resources to which a PUSCH has been allocated;
- CSI part 2 is mapped in the frequency-first manner from a first symbol excluding resources to which DMRS and HARQ-ACK or CG-UCI or CSI part 1 allocated in the previous steps have been allocated, among resources to which a PUSCH has been allocated; and
- CSI part 2 may be always mapped regardless of the presence or absence of HP HARQ-ACK or LP HARQ-ACK or may or may not be mapped according to base station configuration. For example, in case that both HP HARQ-ACK and LP HARQ-ACK are multiplexed to a corresponding PUSCH, the terminal may or may not perform CSI part 2 mapping according to a higher-layer signal configuration value indicated to the base station.

Step 4:
Data information (UL-SCH) rate matching is performed. UL-SCH is mapped in the frequency-first manner to a resource to which a PUSCH has been allocated excluding resources to which UCI information mapped in the previous steps is mapped.

Step 5:
In case that there is at least one of HP HARQ-ACK information or LP HARQ-ACK information to be transmitted to a PUSCH and the total information of HP HARQ-ACK and LP HARQ-ACK has a size not larger than 2 bits, mapping is performed to the resources reserved in Step 1. In case that there is a UCI resource or UL-SCH already mapped to the resource in the previous steps, the information is punctured and the HP HARQ-ACK information or LP HARQ-ACK information is sequentially mapped.

In the steps described above, in case that the number of bits of uplink control information (or the number of modulated symbols) to be mapped to a PUSCH is greater than the number of bits (or REs) which enable uplink control information mapping in the corresponding OFDM symbol to be mapped, the frequency axis RE interval d between modulated symbols of the uplink control information to be mapped may be configured so that d=1. In case that the number of bits of uplink control information (or the number of modulated symbols) to be mapped to a PUSCH by the terminal has a size less than the number of bits (or REs) which enable uplink control information mapping in the corresponding OFDM symbol to be mapped, the frequency axis RE interval d between modulated symbols of the uplink control information to be mapped may be configured so that d=floor(# of available bits on 1-OFDM symbol/# of unmapped UCI bits at the beginning of 1-OFDM symbol).

By way of example, in case that PUSCH hopping is performed in Step 1 of Procedure 6, it is possible to determine an HP HARQ-ACK resource for a first PUSCH hop and to determine an LP HARQ-ACK resource for a second PUSCH hop. Procedure 7 below shows an example for applying different mapping methods according to the size of HP HARQ-ACK information.

[Procedure 7]
Step 1:
In case that HP HARQ-ACK information to be transmitted to a PUSCH exist and the HP HARQ-ACK information has a size of 2 bits or less, reservation resources for latent HP HARQ-ACK transmission are determined. The reservation resources are determined by a frequency-first scheme from a first symbol immediately after a symbol in which a first DMRS exists among resources to which a PUSCH has been allocated. The frequency-first scheme refers to a method of sequentially mapping frequency resources for each symbol and then moving to a next symbol to perform mapping; and
It is determined whether coded bits for latent HP HARQ-ACK transmission are separated for each hop by using reservation resources according to the presence or absence of PUSCH hopping.

Step 2:
In case that there is HP HARQ-ACK information to be transmitted to a PUSCH and the HP HARQ-ACK information has a size larger than 2 bits, rate matching is performed. That is, the coded bits of HP HARQ-ACK information are mapped in the frequency-first scheme from a first symbol immediately after a symbol in which a first DMRS exists among resources to which a PUSCH has been allocated.

Step 3:
In case that there is only LP HARQ-ACK with no HP HARQ-ACK information to be transmitted to a PUSCH, rate matching is performed. That is, the coded bits of LP HARQ-ACK information are mapped in the frequency-first scheme from a first symbol immediately after a symbol in which a first DMRS exists among resources allocated with PUSCH.

Step 3A:
In case that there are HP HARQ-ACK information and LP HARQ-ACK information to be transmitted to a PUSCH, rate matching is performed for the LP HARQ-ACK. That is, coded bits of LP HARQ-ACK information are mapped in the frequency-first scheme from a first symbol immediately after a symbol in which a first DMRS exists excluding resources to which HP HARQ-ACK information-coded bits have been allocated among resources to which a PUSCH has been allocated.

Step 4:
In case that there is CSI part information to be transmitted to a PUSCH, rate matching is performed. CSI part 1 is mapped in the frequency-first manner from a first symbol immediately after excluding resources to which DMRS and HARQ-ACK information allocated in the previous steps have been allocated, among resources to which a PUSCH has been allocated;
CSI part 2 is mapped in the frequency-first manner from a first symbol excluding resources to which DMRS and HARQ-ACK or CG-UCI or CSI part 1 allocated in the previous steps have been allocated, among resources to which a PUSCH has been allocated; and
CSI part 2 may be always mapped regardless of the presence or absence of HP HARQ-ACK or LP HARQ-ACK or may or may not be mapped according to base station configuration. For example, in case that both HP HARQ-ACK and LP HARQ-ACK are multiplexed to a corresponding PUSCH, the terminal may or may not perform CSI part 2 mapping according to a higher-layer signal configuration value indicated to the base station.

Step 5:
Data information (UL-SCH) rate matching is performed. UL-SCH is mapped in the frequency-first manner to a resource to which a PUSCH has been allocated excluding resources to which UCI information mapped in the previous steps is mapped.

Step 6:
In case that HP HARQ-ACK information to be transmitted to a PUSCH has a size not larger than 2 bits, mapping is performed to the resource reserved in Step 1. In case that there is a UCI resource or UL-SCH already mapped to the resource in the previous steps, the information is punctured and the HP HARQ-ACK information is mapped.

In the steps described above, in case that the number of bits of uplink control information (or the number of modulated symbols) to be mapped to a PUSCH is greater than the number of bits (or REs) which enable uplink control information mapping in the corresponding OFDM symbol to be mapped, the frequency axis RE interval d between modulated symbols of the uplink control information to be mapped may be configured so that d=1. In case that the number of bits of uplink control information (or the number of modulated symbols) to be mapped to a PUSCH has a size less than the number of bits (or REs) which enable uplink control information mapping in the corresponding OFDM symbol to be mapped, the frequency axis RE interval d between modulated symbols of the uplink control information to be mapped may be configured so that d=floor(# of available bits on 1-OFDM symbol/# of unmapped UCI bits at the beginning of 1-OFDM symbol).

Procedure 8 below shows an example for applying different mapping methods according to the size of LP HARQ-ACK information. By way of example, in case that LP HARQ-ACK has a size larger than 2 bits, rate matching may be performed and in case that LP HARQ-ACK has a size of 2 bits or less, puncturing may be performed.

[Procedure 8]

Step 1:
In case that LP HARQ-ACK information to be transmitted to a PUSCH exists and the LP HARQ-ACK information has a size of 2 bits or less, reservation resources for latent LP HARQ-ACK transmission are determined. The reservation resources are determined by a frequency-first scheme from a first symbol immediately after a symbol in which a first DMRS exists among resources to which a PUSCH has been allocated. The frequency-first scheme refers to a method of sequentially mapping frequency resources for each symbol and then moving to a next symbol to perform mapping; and It is determined whether coded bits for latent LP HARQ-ACK transmission are separated for each hop by using reservation resources according to the presence or absence of PUSCH hopping.

Step 2:
In case that there is HP HARQ-ACK information to be transmitted on a PUSCH, rate matching is performed. That is, the coded bits of HP HARQ-ACK information are mapped in the frequency-first scheme from a first symbol immediately after a symbol in which a first DMRS exists among resources to which a PUSCH has been allocated.

Step 3:
In case that there is LP HARQ-ACK information to be transmitted to a PUSCH and the LP HARQ-ACK information has a size larger than 2 bits, rate matching is performed. That is, coded bits of LP HARQ-ACK information are mapped in the frequency-first scheme from a first symbol immediately after a symbol in which a first DMRS exists excluding resources to which HP HARQ-ACK information-coded bits have been allocated among resources to which a PUSCH has been allocated.

Step 4:
In case that there is CSI part information to be transmitted to a PUSCH, rate matching is performed. CSI part 1 is mapped in the frequency-first manner from a first symbol immediately after excluding resources to which DMRS and HARQ-ACK information allocated in the previous steps have been allocated, among resources to which a PUSCH has been allocated;

CSI part 2 is mapped in the frequency-first manner from a first symbol excluding resources to which DMRS and HARQ-ACK or CG-UCI or CSI part 1 allocated in the previous steps have been allocated, among resources to which a PUSCH has been allocated; and CSI part 2 may be always mapped regardless of the presence or absence of HP HARQ-ACK or LP HARQ-ACK or may or may not be mapped according to base station configuration. For example, in case that both HP HARQ-ACK and LP HARQ-ACK are multiplexed to a corresponding PUSCH, the terminal may or may not perform CSI part 2 mapping according to a higher-layer signal configuration value indicated to the base station.

Step 5:
Data information (UL-SCH) rate matching is performed. UL-SCH is mapped in the frequency-first manner to a resource to which a PUSCH has been allocated excluding resources to which UCI information mapped in the previous steps is mapped.

Step 6:
In case that LP HARQ-ACK information to be transmitted to a PUSCH has a size not larger than 2 bits, mapping is performed to the resource reserved in Step 1. In case that there is a UCI resource or UL-SCH already mapped to the resource in the previous steps, the information is punctured and the LP HARQ-ACK information is mapped.

In the steps described above, in case that the number of bits of uplink control information (or the number of modulated symbols) to be mapped to a PUSCH is greater than the number of bits (or REs) which enable uplink control information mapping in the corresponding OFDM symbol to be mapped, the frequency axis RE interval d between modulated symbols of the uplink control information to be mapped may be configured so that d=1. In case that the number of bits of uplink control information (or the number of modulated symbols) to be mapped to a PUSCH has a size less than the number of bits (or REs) which enable uplink control information mapping in the corresponding OFDM symbol to be mapped, the frequency axis RE interval d between modulated symbols of the uplink control information to be mapped may be configured so that d=floor(# of available bits on 1-OFDM symbol/# of unmapped UCI bits at the beginning of 1-OFDM symbol).

Procedure 9 below shows to an example for applying the same mapping method to both HP HARQ-ACK and LP HARQ-ACK regardless of the size thereof.

[Procedure 9]

Step 1:
In case that there is HP HARQ-ACK information to be transmitted to a PUSCH, rate matching is performed. That is, the coded bits of HP HARQ-ACK information are mapped in the frequency-first scheme from a first symbol immediately after a symbol in which a first DMRS exists among resources to which a PUSCH has been allocated.

Step 2:
In case that there is only LP HARQ-ACK with no HP HARQ-ACK information to be transmitted to a PUSCH, rate matching is performed. That is, the coded bits of LP HARQ-ACK information are mapped in the frequency-first scheme from a first symbol immediately after a symbol in which a first DMRS exists among resources allocated with PUSCH.

Step 2A:
In case that there are HP HARQ-ACK information and LP HARQ-ACK information to be transmitted to a PUSCH, rate matching is performed for the LP HARQ-ACK. That is, coded bits of LP HARQ-ACK information are mapped in the frequency-first scheme from a first symbol immediately after a symbol in which a first DMRS exists excluding resources to which HP HARQ-ACK information-coded bits have been allocated among resources to which a PUSCH has been allocated.

Step 3:
  In case that there is CSI part information to be transmitted to a PUSCH, rate matching is performed. CSI part 1 is mapped in the frequency-first manner from a first symbol immediately after excluding resources to which DMRS and HARQ-ACK information allocated in the previous steps have been allocated, among resources to which a PUSCH has been allocated;
  CSI part 2 is mapped in the frequency-first manner from a first symbol excluding resources to which DMRS and HARQ-ACK or CG-UCI or CSI part 1 allocated in the previous steps have been allocated, among resources to which a PUSCH has been allocated; and/or
  CSI part 2 may be always mapped regardless of the presence or absence of HP HARQ-ACK or LP HARQ-ACK or may or may not be mapped according to base station configuration. For example, in case that both HP HARQ-ACK and LP HARQ-ACK are multiplexed to a corresponding PUSCH, the terminal may or may not perform CSI part 2 mapping according to a higher-layer signal configuration value indicated to the base station.

Step 4:
  Data information (UL-SCH) rate matching is performed. UL-SCH is mapped in the frequency-first manner to a resource to which a PUSCH has been allocated excluding resources to which UCI information mapped in the previous steps is mapped.

In the steps described above, in case that the number of bits of uplink control information (or the number of modulated symbols) to be mapped to a PUSCH is greater than the number of bits (or REs) which enable uplink control information mapping in the corresponding OFDM symbol to be mapped, the frequency axis RE interval d between modulated symbols of the uplink control information to be mapped may be configured so that d=1. In case that the number of bits of uplink control information (or the number of modulated symbols) to be mapped to a PUSCH has a size less than the number of bits (or REs) which enable uplink control information mapping in the corresponding OFDM symbol to be mapped, the frequency axis RE interval d between modulated symbols of the uplink control information to be mapped may be configured so that d=floor(# of available bits on 1-OFDM symbol/# of unmapped UCI bits at the beginning of 1-OFDM symbol).

Figure 11:
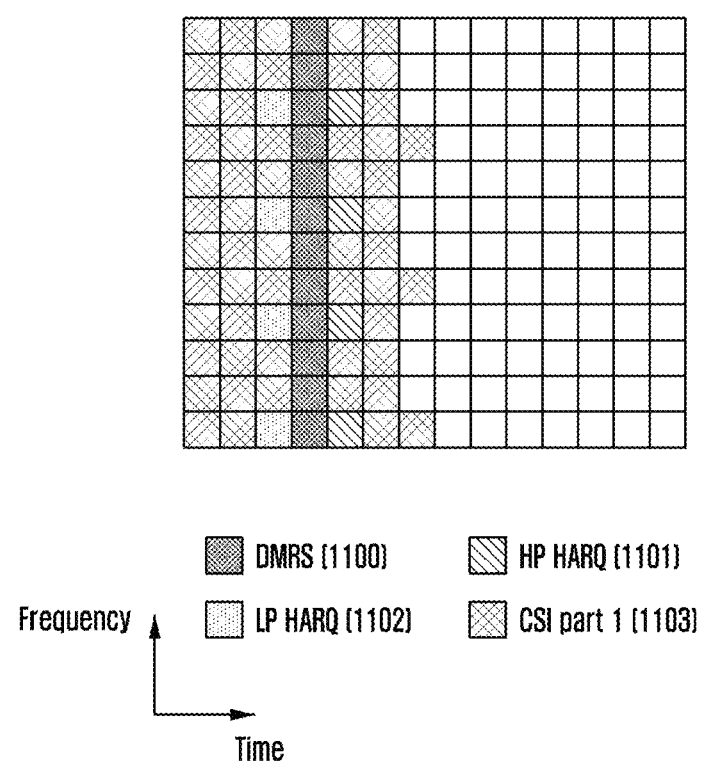
FIG. 11 is a diagram illustrating a method in which HP HARQ-ACK, LP HARQ-ACK, and CSI part 1 are multiplexed to a PUSCH according to an embodiment of the present disclosure.

For another example, as shown in FIG. 11, it is possible to map LP HARQ-ACK, unlike HP HARQ-ACK, in an opposite direction with reference to a DMRS symbol. FIG. 11 is a diagram illustrating a method in which HP HARQ-ACK, LP HARQ-ACK, and CSI part 1 are multiplexed to a PUSCH according to an embodiment and may be a method applicable for the case where a symbol in which a first DMRS is located is not a first symbol of PUSCH transmission resources. For example, Procedure 10 shows a procedure in which UCI information of HP HARQ-ACK, LP HARQ-ACK, CSI part 1, and CSI part 2 is multiplexed to a PUSCH. In the case of FIG. 11, unlike FIG. 7 to FIG. 9, the transmission reliability may be improved by ensuring that LP HARQ-ACK information may always be transmitted/received to and from a symbol adjacent to DMRS.

[Procedure 10]
Step 1:
  In case that HP HARQ-ACK information to be transmitted to a PUSCH exist and the HP HARQ-ACK information has a size of 2 bits or less, reservation resources for latent HP HARQ-ACK transmission are determined. The reservation resources are determined by a frequency-first scheme from a first symbol immediately after a symbol in which a first DMRS exists among resources to which a PUSCH has been allocated. The frequency-first scheme refers to a method of sequentially mapping frequency resources for each symbol and then moving to a next symbol to perform mapping; and
  It is determined whether coded bits for latent HP HARQ-ACK transmission are separated for each hop by using reservation resources according to the presence or absence of PUSCH hopping.

Step 1A:
  In case that only LP HARQ-ACK information to be transmitted to a PUSCH exists and the LP HARQ-ACK information has a size of 2 bits or less, reservation resources for latent LP HARQ-ACK transmission are determined. The reservation resources are determined by an inverse frequency-first scheme from a first symbol immediately before a symbol in which a first DMRS exists among resources to which a PUSCH has been allocated. The inverse frequency-first scheme refers to a method of sequentially mapping frequency resources for each symbol and then moving to a previous symbol to perform mapping; and
  It is determined whether coded bits for latent LP HARQ-ACK transmission are separated for each hop by using reservation resources according to the presence or absence of PUSCH hopping.

Step 2:
  In case that there is HP HARQ-ACK information to be transmitted to a PUSCH and the HP HARQ-ACK information has a size larger than 2 bits, rate matching is performed. That is, the coded bits of HP HARQ-ACK information are mapped in the frequency-first scheme from a first symbol immediately after a symbol in which a first DMRS exists among resources to which a PUSCH has been allocated.

Step 2A:
  In case that there is LP HARQ-ACK information to be transmitted to a PUSCH and the LP HARQ-ACK information has a size larger than 2 bits, rate matching is performed. That is, the coded bits of LP HARQ-ACK information are mapped by the inverse frequency-first scheme from a first symbol immediately before a symbol in which a first DMRS exists among resources allocated with PUSCH.

Step 3:
  In case that there is CSI part information to be transmitted to a PUSCH, rate matching is performed. CSI part 1 is mapped in the frequency-first manner from a first symbol after excluding resources to which DMRS and HARQ-ACK information allocated in the previous steps have been allocated, among resources to which a PUSCH has been allocated;
  CSI part 2 is mapped in the frequency-first manner from a first symbol excluding resources to which DMRS and HARQ-ACK or CG-UCI or CSI part 1 allocated in the previous steps have been allocated, among resources to which a PUSCH has been allocated; and
  CSI part 2 may be always mapped regardless of the presence or absence of HP HARQ-ACK or LP HARQ-ACK or may or may not be mapped according to base station configuration. For example, in case that both HP HARQ-ACK and LP HARQ-ACK are multiplexed to a corresponding PUSCH, the terminal may or may not perform CSI part 2 mapping according to a higher-layer signal configuration value indicated to the base station.

Step 4:
Data information (UL-SCH) rate matching is performed. UL-SCH is mapped in the frequency-first manner to a resource to which a PUSCH has been allocated excluding resources to which UCI information mapped in the previous steps is mapped.

Step 5:
In case that HP HARQ-ACK information to be transmitted to a PUSCH has a size not larger than 2 bits, mapping is performed to the resource reserved in Step 1. In case that there is a UCI resource or UL-SCH already mapped to the resource in the previous steps, the information is punctured and the HP HARQ-ACK information is mapped.

Step 5A:
In case that LP HARQ-ACK information to be transmitted to a PUSCH has a size not larger than 2 bits and HP HARQ-ACK information is not multiplexed, mapping is performed to the resource reserved in Step 1A. In case that there is a UCI resource or UL-SCH having already mapped to the resource in the previous steps, the information is punctured and the LP HARQ-ACK information is mapped.

In the steps described above, in case that the number of bits of uplink control information (or the number of modulated symbols) to be mapped to a PUSCH is greater than the number of bits (or REs) which enable uplink control information mapping in the corresponding OFDM symbol to be mapped, the frequency axis RE interval d between modulated symbols of the uplink control information to be mapped may be configured so that d=1. In case that the number of bits of uplink control information (or the number of modulated symbols) to be mapped to a PUSCH has a size less than the number of bits (or REs) which enable uplink control information mapping in the corresponding OFDM symbol to be mapped, the frequency axis RE interval d between modulated symbols of the uplink control information to be mapped may be configured so that d=floor(# of available bits on 1-OFDM symbol/# of unmapped UCI bits at the beginning of 1-OFDM symbol).

Above-described Procedure 1 to Procedure 10 are not limited to individual operations, and at least some of above-described Procedure 1 to Procedure 10 may be operated in combination. "Combining" means that a set is configured with respect to at least a portion of Procedure 1 to Procedure 10 and methods operated in one of these tables may be operated by being indicated by an higher-layer signal, an L1 signal, or a combination thereof. In addition, in case that a reservation resource is configured for a specific UCI information with reference to a size of 2 bits in Procedure 1 to Procedure 10, the size of 2 bits is merely an example and may be replaced with another value to be applied. Furthermore, in case that rate matching is performed in Procedure 1 to Procedure 10, it is possible to consider information calculated by at least one of Equation 7 to Equation 17 for the determination of the number of coded modulation bit symbols.

Figure 12A:
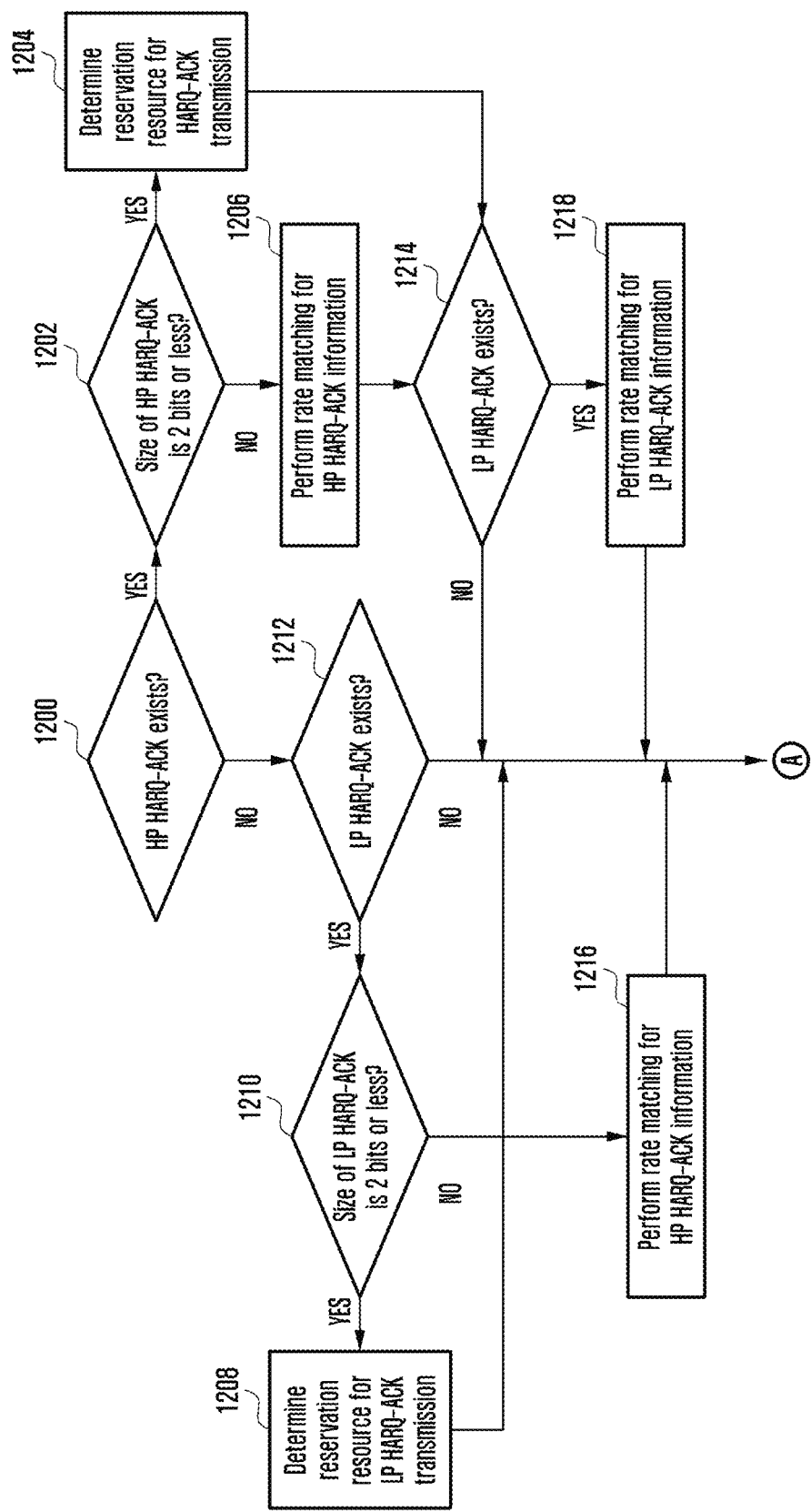
FIG. 12*a* is a flowchart illustrating a part of a procedure in which uplink information and control information are multiplexed according to an embodiment of the present disclosure.
Figure 12B:
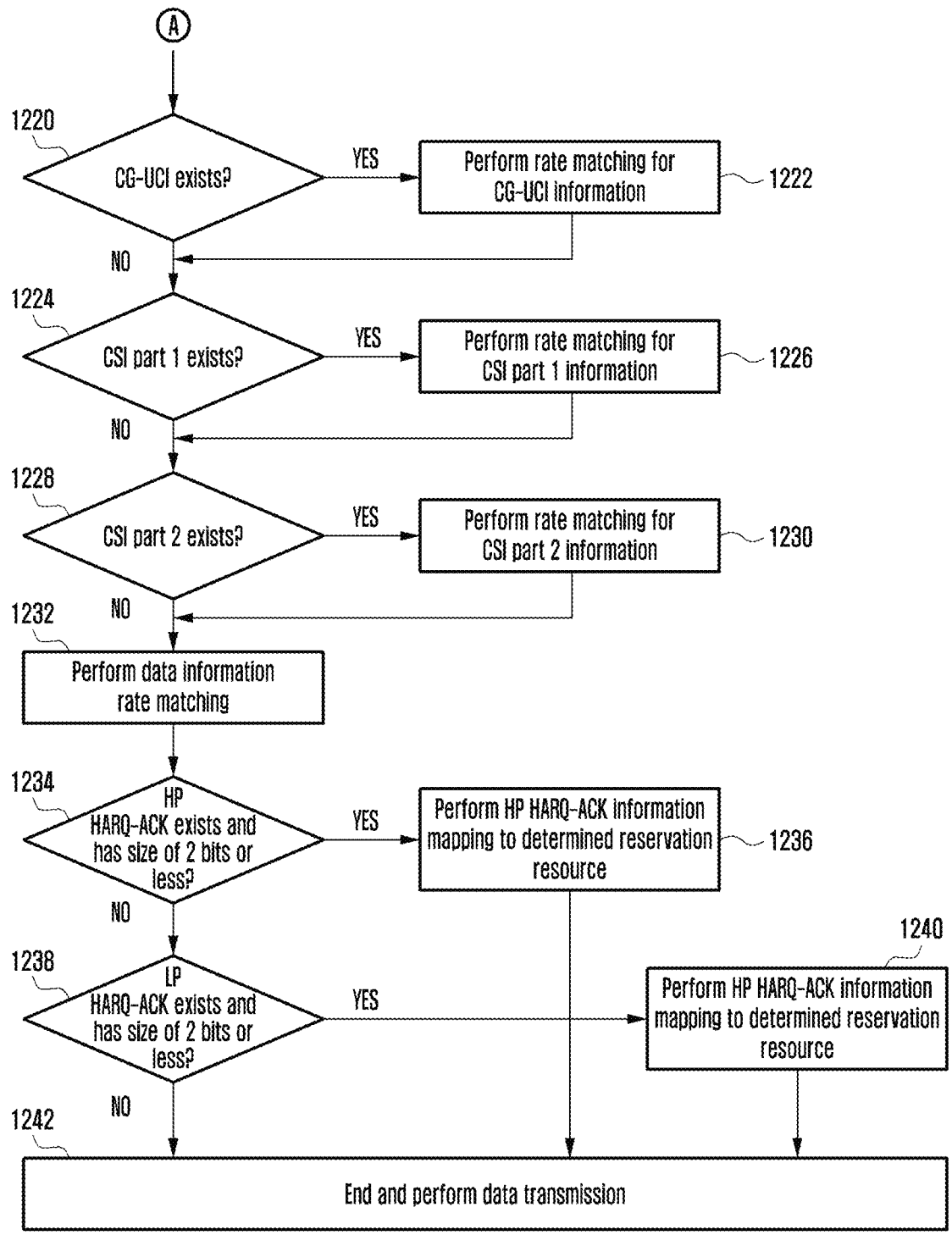
FIG. 12*b* is a flowchart illustrating a part of the procedure in which uplink information and control information are multiplexed according to the embodiment of the present disclosure.

FIG. 12a and FIG. 12b are a flowchart illustrating a procedure in which uplink information and control information are multiplexed according to an embodiment of the disclosure. Referring to FIG. 12a and FIG. 12b, the terminal determines whether HP HARQ-ACK to be transmitted exists (1200). In case that HP HARQ-ACK exists, the terminal determines whether the HP HARQ-ACK has a size of 2 bits or less (1202). In case that the size is 2 bits or less, the terminal determines reservation resource for the HP HARQ-ACK (1204). In case that the HP HARQ-ACK does not have a size of 2 bits or less, the terminal performs rate matching for HP HARQ-ACK information (1206). Thereafter, the terminal determines whether LP HARQ-ACK exists (1214), and in case that LP HARQ-ACK exists, performs rate matching for LP HARQ-ACK.

The terminal which has determined that the HP HARQ-ACK does not exist in operation 1200 determines whether LP HARQ-ACK exists (1212). In case that LP HARQ-ACK exists, the terminal determines whether the LP HARQ-ACK has a size of 2 bits or less, and in case that the size is 2 bits or less, determines a reservation resource for LP HARQ-ACK transmission (1208). In case that the LP HARQ-ACK does not have a size of 2 bits or less, the terminal performs rate matching for LP HARQ-ACK information (1216).

Thereafter, the terminal determines whether CG-UCI exists (1220), and in case that CG-UCI exists, performs rate matching for CG-UCI (1222). Thereafter, the terminal determines whether CSI part 1 exists (1224), and in case that CSI part 1 exists, performs rate matching for CSI part 1 (1226). Thereafter, the terminal determines whether CSI part 2 exists (1228), and in case that CSI part 2 exists, performs rate matching for CSI part 2 (1230). Thereafter, the terminal performs rate matching for data (1232).

Thereafter, the terminal determines whether HP HARQ-ACK exists and has a size of 2 bits or less, in case that HP HARQ-ACK exists and has a size of 2 bits or less, maps HP HARQ-ACK information to a determined reservation resource (1236) and, otherwise, performs data and uplink control information transmission (1242). In case that HP HARQ-ACK exists and does not have a size of 2 bits or less, the terminal determine whether LP HARQ-ACK exists and has a size of 2 bits or less (1238), in case that LP HARQ-ACK exists and has a size of 2 bits or less, maps LP HARQ-ACK information to a determined reservation resource 1240 and, otherwise, performs data and uplink control information transmission (1242).

Particularly, in FIG. 12a and FIG. 12b, the case in which the terminal may multiplex HP HARQ-ACK and LP HARQ-ACK to one channel is considered. The terminal determine the existence of HP HARQ-ACK, LP HARQ-ACK, CG-UCI, CSI part 1, and CSI part 2 in this order, and in case that the existence is confirmed, performs rate matching according thereto or determines a reservation resource for the case of HARQ-ACK according to the number of bits. The determination of the existence may be performed based on the existence of a PUCCH resource of which at least one symbol overlaps a resource to which the PUSCH has been allocated or the inclusion of specific control information indicated by DCI having scheduled the PUSCH. At least one or a combination of portions of operations in Procedure 2 to Procedure 10 described above may be shown in FIG. 12a and FIG. 12b. In addition, FIG. 12a and FIG. 12b are merely an example without limitation thereto, a specific flowchart may be omitted or replaced with another one, or a portion of a flowchart is added to be operated in at least one of Procedure 2 to Procedure 10. Each operation of FIG. 12a and FIG. 12b are merely an example and each operation may be omitted or added and performed in a changed order.

Figure 13:
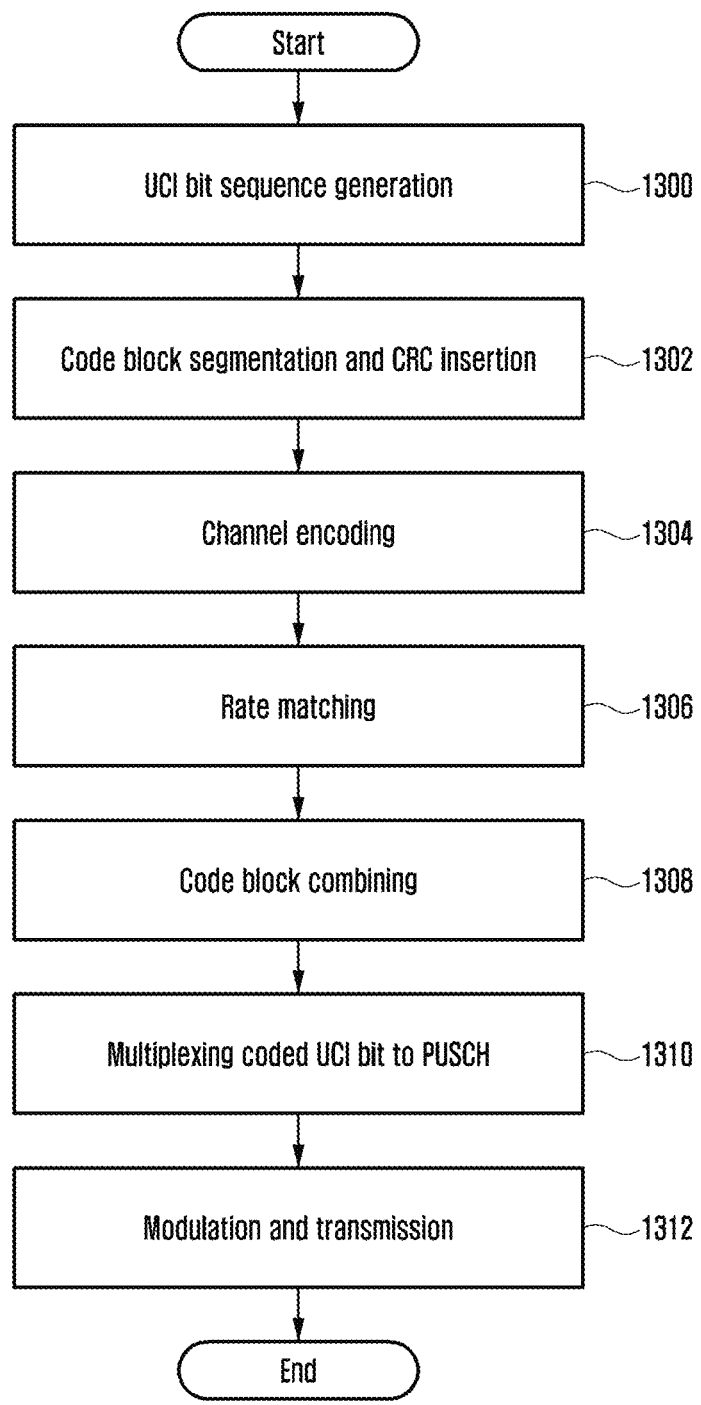
FIG. 13 is a flowchart illustrating a method of a terminal for multiplexing UCI information to a PUSCH and transmitting multiplexed UCI information according to an embodiment of the present disclosure.

FIG. 13 is a flowchart illustrating a method of a terminal for multiplexing UCI information to a PUSCH and transmitting multiplexed UCI information according to an embodiment of the present disclosure.

The terminal first determines which UCI information to multiplex to a PUSCH transmission resource. According to terminal capability and base station configuration or indication, in case that multiple pieces of UCI information exist, the terminal may determine which UCI information to multiplex to a PUSCH. By way of example, in case that HP HARQ-ACK, LP HARQ-ACK, CSI part 1, and CSI part 2 exist and the base station indicates only three types of UCI information having higher priorities through a higher-layer signal, the terminal may multiplex only HP HARQ-ACK, LP HARQ-ACK, and CSI part 1 to a PUSCH and drop CSI part 2.

The terminal generates corresponding UCI bit sequence (1300) and in case that information has a size of a predetermined threshold value or greater, segments code blocks and inserts CRC (1302). The terminal performs coding by applying different channel encoding methods according to the size of information (1304). The terminal performs rate matching for coded bits (1306). The terminal combines coded code blocks (1308) and performs multiplexing to a PUSCH (1310). Thereafter, the terminal modulates together with the PUSCH and performs transmission to the base station (1312).

According to FIG. 13, it may be possible that the terminal performs parallel processing for HARQ-ACK or CSI part 1 or CSI part 2. In this case, the terminal may include multiple processing blocks according to the maximum processable size of UCI information. For example, in case that maximum three pieces of UCI information may be concurrently processed, the terminal may configure three channel encoding and rate matching blocks. In this case, it is possible that the terminal includes three blocks for performing 1300 to 1310 excluding 1312 for each UCI information type. Alternatively, it is possible that the terminal includes different numbers of (multiple) blocks for performing partial operations from among operations 1300 to 1310.

Alternatively, the terminal may sequentially process HARQ-ACK, CSI part 1, and CSI part 2 with one block. For example, in case that having one channel encoding and rate matching block, the terminal may encode HARQ-ACK information and then sequentially perform channel encoding in the order of CSI part 1 and CSI part 2. Here, the terminal may process the UCI information in a pipe-lining scheme. In addition thereto, according to at least one or a combination of tables shown in FIG. 7 to FIG. 10, the terminal may multiplex coded UCI information to a PUSCH. Each operation of FIG. 13 is merely an example and each operation may be omitted or added and performed in a changed order.

Figure 14:
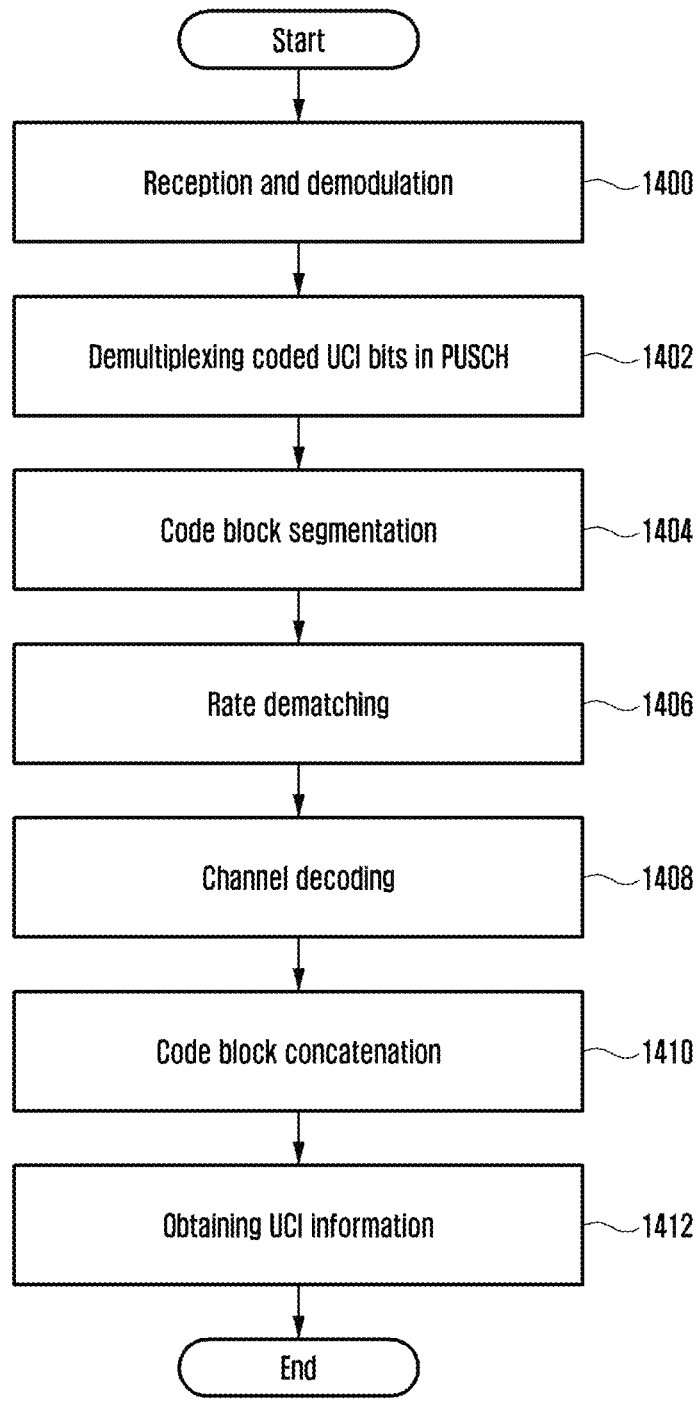
FIG. 14 is a flowchart illustrating a method for demultiplexing UCI information included in a PUSCH and receiving demultiplexed UCI information by a base station according to an embodiment of the present disclosure.

FIG. 14 is a flowchart illustrating a method for demultiplexing UCI information included in a PUSCH and receiving demultiplexed UCI information by a base station according to an embodiment of the present disclosure.

The base station receives the PUSCH transmitted by the terminal and performs demodulation (1400). The base station demultiplexes UCI bits included in the PUSCH to separate coded UCI information (1402). In case that the size of the UCI information is larger than a predetermined threshold value, the base station segments the UCI information into code blocks (1404) and performs rate de-matching (1406) (or reverse rate matching). The base station performs channel decoding (1408) to produce decoded UCI information and in case that UCI information is segmented into code blocks in 1104, performs combining (1410). The base station determines UCI information transmitted by the terminal (1412).

The flowchart of FIG. 14 is merely an example, and it may be possible that the base station performs parallel processing for HARQ-ACK or CSI part 1 or CSI part 2 as shown in FIG. 13. In this case, the base station may include multiple processing blocks according to the maximum processable size of UCI information. For example, in case that maximum three pieces of UCI information may be concurrently processed, the base station configures three channel decoding and rate de-matching blocks. In this case, it may be possible that three blocks for performing 1102 to 1112 excluding 1110 may exist in the base station for each UCI information type. Alternatively, the base station may sequentially process HARQ-ACK, CSI part 1, and CSI part 2 with one block. For example, in case that having one channel decoding and rate de-matching block, the base station may decode HARQ-ACK information and then sequentially perform channel decoding in the order of CSI part 1 and CSI part 2. Here, the base station may process the UCI information in a pipe-lining scheme. In addition thereto, in consideration of at least one or a combination of tables shown in FIG. 7 to FIG. 10, the base station may demultiplex coded UCI information in a PUSCH. Each operation of FIG. 14 is merely an example and each operation may be omitted or added and performed in a changed order.

Figure 15:
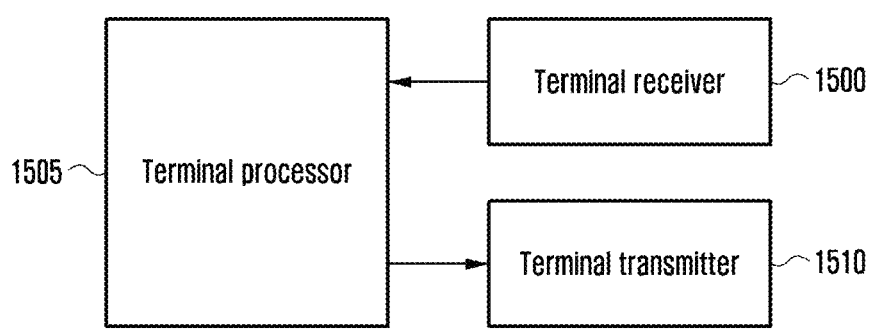
FIG. 15 illustrates a structure of a terminal in a wireless communication system according to an embodiment of the present disclosure.

FIG. 15 illustrates a structure of a terminal in a wireless communication system according to an embodiment of the present disclosure.

Referring to FIG. 15, the terminal may include a transceiver indicating a terminal receiver 1500 and a terminal transmitter 1510, a memory (not shown), and a terminal processor 1505 (or a terminal controller or processor). The transceiver 1500 and 1510, the memory, and the terminal processor 1505 of the terminal may operate according to the above-described terminal communication method. However, the components of the terminal are not limited to the examples described above. For example, the terminal may include more or fewer components than the above-described components. In addition, the transceiver, the memory, and the processor may be implemented in the form of a single chip.

The transceiver may transmit or receive a signal to or from a base station. Here, the signal may include control information and data. To this end, the transceiver may include an RF transmitter configured to up-convert and amplify the frequency of the transmitted signal, an RF receiver configured to amplify the received signal with low noise and down-convert the frequency, and the like. However, this is only an embodiment of the transceiver, and the components of the transceiver are not limited to the RF transmitter and the RF receiver.

In addition, the transceiver may receive a signal through a wireless channel, output the signal to the processor, and transmit a signal output from the processor through the wireless channel.

The memory may store programs and data necessary for the operation of the terminal. In addition, the memory may store control information or data included in signals transmitted and received by the terminal. The memory may include a storage medium such as a ROM, a RAM, a hard disk, a CD-ROM, and a DVD, or a combination of storage media. In addition, there may be multiple memories.

In addition, the processor may control a series of processes so that the terminal operates according to the embodiments described above. For example, the processor may control a component of the terminal to simultaneously receive multiple PDSCHs by receiving DCI including two layers. There may be multiple processors, and the processor may perform an operation of controlling components of the terminal by executing a program stored in the memory.

Figure 16:
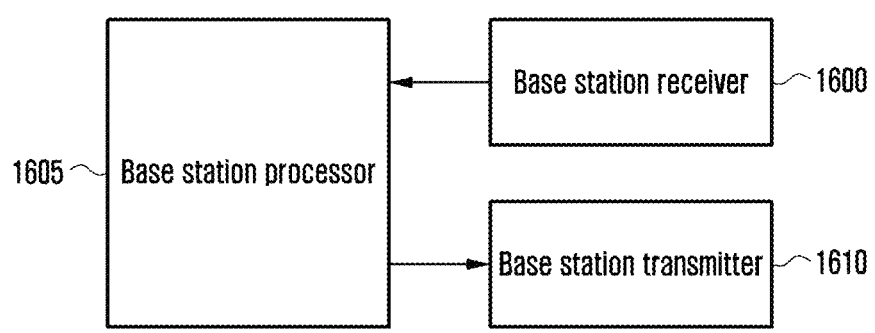
FIG. 16 illustrates a structure of a base station in a wireless communication system according to an embodiment of the present disclosure.

FIG. 16 illustrates a structure of a base station in a wireless communication system according to an embodiment of the present disclosure.

Referring to FIG. 16, the base station may include a transceiver indicating a base station receiver 1600 and a base station transmitter 1610, a memory (not shown), and a base station processor 1605 (or a base station controller or processor). The transceiver 1600 and 1610, the memory, and the base station processor 1605 of the base station may operate according to the above-described base station communication method. However, the components of the base station are not limited to the examples described above. For example, the base station may include more or fewer components than the above-described components. In addition, the transceiver, the memory, and the processor may be implemented in the form of a single chip.

The transceiver may transmit or receive a signal to or from a terminal. Here, the signal may include control information and data. To this end, the transceiver may include an RF transmitter configured to up-convert and amplify the frequency of the transmitted signal, an RF receiver configured to amplify the received signal with low noise and down-convert the frequency, and the like. However, this is only an embodiment of the transceiver, and the components of the transceiver are not limited to the RF transmitter and the RF receiver.

In addition, the transceiver may receive a signal through a wireless channel, output the signal to the processor, and transmit a signal output from the processor through the wireless channel.

The memory may store programs and data necessary for the operation of the base station. In addition, the memory may store control information or data included in signals transmitted and received by the base station. The memory may include a storage medium such as a ROM, a RAM, a hard disk, a CD-ROM, and a DVD, or a combination of storage media. In addition, there may be multiple memories.

The processor may control a series of processes so that the base station operates according to an embodiment of the disclosure. For example, the processor configure DCI of two layers including allocation information of multiple PDSCHs and control each component of the base station in order to transmit the same. There may be multiple processors, and the processor may perform an operation of controlling components of the base station by executing a program stored in the memory.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, one embodiment of the disclosure may be partially combined with another embodiment to operate a base station and a terminal. As an example, embodiments 1 and 2 of the disclosure may be partially combined to operate a base station and a terminal. Further, although the above embodiments have been described by way of the FDD LTE system, other variants based on the technical idea of the embodiments may be implemented in other systems such as TDD LTE and 5G or NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be implemented in combination without departing from the essential spirit and scope of the disclosure.

Various embodiments of the disclosure have been described. The above description of the disclosure is merely for the purpose of illustration, and is not intended to limit embodiments of the disclosure to the embodiments set forth herein. Those skilled in the art will appreciate that other specific modifications and changes may be easily made thereto without changing the technical idea or essential features of the disclosure. The scope of the disclosure should be determined not by the above description but by the appended claims, and all changes and modifications derived from the meaning and scope of the claims and equivalent concepts thereof shall be construed as falling within the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:
receiving, from a base station, configuration information for an uplink control information (UCI) multiplexing operation with different priorities on a physical uplink shared channel (PUSCH);
obtaining UCI sequences including a high priority hybrid automatic repeat request acknowledgement (HP HARQ-ACK), a low priority HARQ-ACK (LP HARQ-ACK), and channel state information (CSI) part 1, respectively;
performing an encoding of the UCI sequences;
performing a rate matching of the encoded UCI sequences;
multiplexing the rate-matched UCI sequences to the PUSCH; and
transmitting, to the base station, uplink data with the multiplexed HP HARQ-ACK, LP HARQ-ACK, and CSI part 1 on the PUSCH,
wherein a rate matching of the LP HARQ-ACK is performed based on following equation:

$$Q'_{LP_{ACK}} = \min\left\{\left\lceil\frac{(O_{LP\_ACK} + L_{LP\_ACK}) \cdot \beta_{offset}^{LP\_ACK} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left.\left\lceil\alpha \cdot \sum_{l=0}^{N_{symb,all}^{PUSCH}-1} M_{sc}^{UCI}(l)\right\rceil - Q'_{\frac{ACK}{CG}-UCI}\right\},$$

where $O_{LP\_ACK}$ is a number of LP HARQ-ACK bits, $L_{LP\_ACK}$ is a number of cyclic redundancy check (CRC) bits, $\beta_{offset}^{LP\_ACK}$ is a beta offset for the LP HARQ-ACK, $N_{symb,all}^{PUSCH}$ is a number of symbols for the PUSCH, $M_{sc}^{UCI}$ a number of subcarriers for the symbols for the PUSCH, $K_r$ is a size of code block r, α is configured value from the base station, and $Q'_{ACK/CG-UCI}$ is a number of symbols for other HARQ-ACK.

2. The method of claim 1, wherein a rate matching of the HP HARQ-ACK is performed based on a beta offset for the HP HARQ-ACK.

3. The method of claim 1, wherein a rate-matched HP HARQ-ACK is mapped to one or more resource elements (REs) from an RE of a lowest RE index in a first orthogonal frequency division multiplexing (OFDM) symbol not including a demodulation reference signal (DMRS) after an OFDM symbol with a first DMRS in resources for the PUSCH by a frequency-first manner.

4. The method of claim 1, wherein a rate-matched LP HARQ-ACK is mapped to REs from a first OFDM symbol in resources for the PUSCH by a frequency-first manner.

5. The method of claim 1, wherein a rate-matched CSI part 1 is mapped to REs from a first OFDM symbol not including a DMRS after an OFDM symbol with a first DMRS in resources for the PUSCH by a frequency-first manner.

6. A method performed by a base station in a communication system, the method comprising:
transmitting, to a terminal, configuration information for an uplink control information (UCI) multiplexing operation with different priorities on a physical uplink shared channel (PUSCH);
receiving, from the terminal, uplink data with UCI bits on the;
performing a demultiplexing for separating the UCI bits;
performing a rate de-matching of the UCI bits; and
decoding the rate de-matched UCI bits to obtain the UCI received from the terminal,
wherein the obtained UCI includes a high priority hybrid automatic repeat request acknowledgement (HP HARQ-ACK), a low priority HARQ-ACK (LP HARQ-ACK), and channel state information (CSI) part 1, and
wherein a number of symbols of the LP HARQ-ACK is performed based on following equation:

$$Q'_{LP_{ACK}} = \min\left\{\left\lceil\frac{(O_{LP\_ACK} + L_{LP\_ACK}) \cdot \beta_{offset}^{LP\_ACK} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left.\left\lceil\alpha \cdot \sum_{l=0}^{N_{symb,all}^{PUSCH}-1} M_{sc}^{UCI}(l)\right\rceil - Q'_{\frac{ACK}{CG}-UCI}\right\},$$

where $O_{LP\_ACK}$ is a number of LP HARQ-ACK bits, $L_{LP\_ACK}$ is a number of cyclic redundancy check (CRC) bits, $\beta_{offset}^{LP\_ACK}$ is a beta offset for the LP HARQ-ACK, $N_{symb,all}^{PUSCH}$ is a number of symbols for the PUSCH, $M_{sc}^{UCI}$ a number of subcarriers for the symbols for the PUSCH, $K_r$ is a size of code block r, α is configured value from the base station, and $Q'_{ACK/CG-UCI}$ is a number of symbols for other HARQ-ACK.

7. The method of claim 6, wherein a rate de-matching of the HP HARQ-ACK is performed based on a beta offset for the HP HARQ-ACK.

8. The method of claim 6, wherein the HP HARQ-ACK is mapped to one or more resource elements (REs) from an RE of a lowest RE index in a first orthogonal frequency division multiplexing (OFDM) symbol not including a demodulation reference signal (DMRS) after an OFDM symbol with a first DMRS in resource for the PUSCH by frequency-first manner.

9. The method of claim 6, wherein the LP HARQ-ACK is mapped to REs from a first OFDM symbol in resources for the PUSCH by a frequency-first manner.

10. The method of claim 6, wherein the CSI part 1 is mapped to REs from a first OFDM symbol not including a DMRS after an OFDM symbol with a first DMRS in resources for the PUSCH by a frequency-first manner.

11. A terminal in a communication system, the terminal comprising:
a transceiver; and
a controller coupled with the transceiver and configured to:
receive, from a base station, configuration information for an uplink control information (UCI) multiplexing operation with different priorities on a physical uplink shared channel (PUSCH),
obtain UCI sequences including a high priority hybrid automatic repeat request acknowledgement (HP HARQ-ACK), a low priority HARQ-ACK (LP HARQ-ACK), and channel state information (CSI) part 1, respectively,
perform an encoding of the UCI sequences,
perform a rate matching of the encoded UCI sequences,
multiplexing the rate-matched UCI sequences to the PUSCH, and transmit, to the base station, uplink data with the multiplexed HP HARQ-ACK, LP HARQ-ACK, and CSI part 1 on the PUSCH, wherein a rate matching of the LP HARQ-ACK is performed based on following equation:

$$Q'_{LP_{ACK}} = \min\left\{\left\lceil \frac{(O_{LP\_ACK} + L_{LP\_ACK}) \cdot \beta_{offset}^{LP\_ACK} \cdot \sum_{l=0}^{N_{symb,all}^{PUSCH}-1} M_{sc}^{UCI}(l)}{\sum_{r=0}^{C_{UL-SCH}-1} K_r} \right\rceil,\right.$$

$$\left.\left\lceil \alpha \cdot \sum_{l=0}^{N_{symb,all}^{PUSCH}-1} M_{sc}^{UCI}(l) \right\rceil - Q'_{\frac{ACK}{CG}\_UCI}\right\},$$

where $O_{LP\_ACK}$ is a number of LP HARQ-ACK bits, $L_{LP\_ACK}$ is a number of cyclic redundancy check (CRC) bits, $\beta_{offset}^{LP\_ACK}$ is a beta offset for the LP HARQ-ACK, $N_{symb,all}^{PUSCH}$ is a number of symbols for the PUSCH, $M_{sc}^{UCI}$ a number of subcarriers for the symbols for the PUSCH, $K_r$ is a size of code block r, $\alpha$ is configured value from the base station, and $Q'_{ACK/CG\_UCI}$ is a number of symbols for other HARQ-ACK.

12. The terminal of claim 11, wherein a rate matching of the HP HARQ-ACK is performed based on a beta offset for the HP HARQ-ACK.

13. The terminal of claim 11, wherein a rate-matched HP HARQ-ACK is mapped to one or more resource elements (REs) from an RE of a lowest RE index in a first orthogonal frequency division multiplexing (OFDM) symbol not including a demodulation reference signal (DMRS) after an OFDM symbol with a first DMRS in resources for the PUSCH by a frequency-first manner.

14. The terminal of claim 11, wherein a rate-matched LP HARQ-ACK is mapped to REs from a first OFDM symbol in resources for the PUSCH by a frequency-first manner.

15. The terminal of claim 11, wherein a rate-matched CSI part 1 is mapped to REs from a first OFDM symbol not including a DMRS after an OFDM symbol with a first DMRS in resources for the PUSCH by a frequency-first manner.

16. A base station in a communication system, the base station comprising:
a transceiver; and
a controller coupled with the transceiver and configured to:
  transmit, to a terminal, configuration information for an uplink control information (UCI) multiplexing operation with different priorities on a physical uplink shared channel (PUSCH),
  receive, from the terminal, uplink data with UCI bits on the,
  perform a demultiplexing for separating the UCI bits,
  perform a rate de-matching of the UCI bits, and
  decode the rate de-matched UCI bits to obtain the UCI received from the terminal,
wherein the obtained UCI includes a high priority hybrid automatic repeat request acknowledgement (HP HARQ-ACK), a low priority HARQ-ACK (LP HARQ-ACK), and channel state information (CSI) part 1, and
wherein a number of symbols of the LP HARQ-ACK is performed based on following equation:

$$Q'_{LP_{ACK}} = \min\left\{\left\lceil \frac{(O_{LP\_ACK} + L_{LP\_ACK}) \cdot \beta_{offset}^{LP\_ACK} \cdot \sum_{l=0}^{N_{symb,all}^{PUSCH}-1} M_{sc}^{UCI}(l)}{\sum_{r=0}^{C_{UL-SCH}-1} K_r} \right\rceil,\right.$$

$$\left.\left\lceil \alpha \cdot \sum_{l=0}^{N_{symb,all}^{PUSCH}-1} M_{sc}^{UCI}(l) \right\rceil - Q'_{\frac{ACK}{CG}\_UCI}\right\},$$

where $O_{LP\_ACK}$ is a number of LP HARQ-ACK bits, $L_{LP\_ACK}$ is a number of cyclic redundancy check (CRC) bits, $\beta_{offset}^{LP\_ACK}$ is a beta offset for the LP HARQ-ACK, $N_{symb,all}^{PUSCH}$ is a number of symbols for the PUSCH, $M_{sc}^{UCI}$ a number of subcarriers for the symbols for the PUSCH, $K_r$ is a size of code block r, $\alpha$ is configured value from the base station, and $Q'_{ACK/CG\_UCI}$ is a number of symbols for other HARQ-ACK.

17. The base station of claim 16, wherein a rate de-matching of the HP HARQ-ACK is performed based on a beta offset for the HP HARQ-ACK.

18. The base station of claim 16, wherein the HP HARQ-ACK is mapped to one or more resource elements (REs) from an RE of a lowest RE index in a first orthogonal frequency division multiplexing (OFDM) symbol not including a demodulation reference signal (DMRS) after an OFDM symbol with a first DMRS in resource for the PUSCH by frequency-first manner.

19. The base station of claim 16, wherein the LP HARQ-ACK is mapped to REs from a first OFDM symbol in resources for the PUSCH by a frequency-first manner.

20. The base station of claim 16, wherein the CSI part 1 is mapped to REs from a first OFDM symbol not including a DMRS after an OFDM symbol with a first DMRS in resources for the PUSCH by a frequency-first manner.

* * * * *